United States Patent
Filippov et al.

(10) Patent No.: US 12,495,139 B2
(45) Date of Patent: Dec. 9, 2025

(54) BLOCK VECTOR PREDICTOR ADJUSTMENT FOR RECONSTRUCTION-REORDERED INTRA BLOCK COPY

(71) Applicant: Comcast Cable Communications, LLC, Philadelphia, PA (US)

(72) Inventors: Alexey Konstantinovich Filippov, Khimki (RU); Vasily Alexeevich Rufitskiy, Madimir (RU); Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 46 days.

(21) Appl. No.: 18/486,775

(22) Filed: Oct. 13, 2023

(65) Prior Publication Data
US 2024/0137492 A1  Apr. 25, 2024

Related U.S. Application Data

(60) Provisional application No. 63/415,984, filed on Oct. 13, 2022.

(51) Int. Cl.
| | |
|---|---|
| *H04N 19/105* | (2014.01) |
| *H04N 19/139* | (2014.01) |
| *H04N 19/159* | (2014.01) |
| *H04N 19/176* | (2014.01) |
| *H04N 19/513* | (2014.01) |

(52) U.S. Cl.
CPC ......... *H04N 19/105* (2014.11); *H04N 19/139* (2014.11); *H04N 19/159* (2014.11); *H04N 19/176* (2014.11); *H04N 19/521* (2014.11)

(58) Field of Classification Search
CPC .. H04N 19/105; H04N 19/139; H04N 19/159; H04N 19/176; H04N 19/52; H04N 19/521; H04N 19/593
See application file for complete search history.

(56) References Cited

U.S. PATENT DOCUMENTS

| | | | |
|---|---|---|---|
| 2015/0264396 A1* | 9/2015 | Zhang | H04N 19/593 375/240.16 |
| 2021/0235076 A1 | 7/2021 | Xu et al. | |
| 2021/0385464 A1* | 12/2021 | Xu | H04N 19/517 |
| 2022/0182664 A1* | 6/2022 | Xu | H04N 19/61 |

(Continued)

OTHER PUBLICATIONS

JVET-AB2025, Joint Video Experts Team (JVET) of ITU-T SG 16 WP 3 and ISO/IEC JTC 1/SC 29 28th Meeting, Mainz, DE, Oct. 20-28, 2022, Source: Editors, Title: Algorithm Description of Enhanced Compression Model 7 (ECM 7).

(Continued)

*Primary Examiner* — Anner Holder
(74) *Attorney, Agent, or Firm* — Banner & Witcoff, Ltd.

(57) ABSTRACT

A block vector predictor (BVP) may be adjusted to provide a more accurate prediction of a block vector (BV). A reference region may be determined corresponding to a direction for flipping, for example, based on a reconstruction-reordered intra block copy (RRIBC) mode being indicated in a direction for flipping a reference block relative to a current block. The reference region corresponding to the flipping direction may be used with respect to a BVP to determine whether the BVP should be replaced with an adjusted BVP.

20 Claims, 23 Drawing Sheets

(56) References Cited

U.S. PATENT DOCUMENTS

| | | | |
|---|---|---|---|
| 2022/0217399 A1* | 7/2022 | Liang .................. | H04N 19/176 |
| 2022/0353498 A1* | 11/2022 | Sundaram ............ | H04N 19/182 |
| 2023/0100297 A1* | 3/2023 | Ruiz Coll ............ | H04N 19/521 |
| | | | 375/240.16 |
| 2023/0102958 A1* | 3/2023 | Ruiz Coll ............ | H04N 19/176 |
| | | | 375/240.02 |

OTHER PUBLICATIONS

JVET-AA0070-v1, Joint Video Experts Team (JVET) of ITU-T SG 16 WP 3 and ISO/IEC JTC 1/SC 29 27th Meeting, by teleconference, Jul. 13-22, 2022, Source: Bytedance Inc., Title: EE2-3.2: Reconstruction-Reordered IBC for screen content coding.

JVET-Z0159-v1, JVET of ITU-T SG 16 WP3, 26th Meeting, by teleconference, Apr. 20-29, 2022, Source: Bytedance Inc., Title: Non-EE2: Reconstruction-Reordered IBC for screen content coding.

JVET-AA0070-v3 JVET of ITU-T SG 16 WP3, 27th Meeting, by teleconference, Jul. 13-22, 2022, Source: Bytedance Inc., Title: EE2-3.2: Reconstruction-Reordered IBC for screen content coding.

Jan. 30, 2024—European Search Report—EP App. No. 23203454.6.

* cited by examiner

The quick brown fox jumps over the lazy dog. The quick brown fox jumps over the lazy dog. The quick brown fox jumps over the lazy dog.

*FIG. 16*

BLOCK VECTOR PREDICTOR ADJUSTMENT FOR RECONSTRUCTION-REORDERED INTRA BLOCK COPY

CROSS-REFERENCE TO RELATED APPLICATIONS

This application claims the benefit of U.S. Provisional Application No. 63/415,984 filed on Oct. 13, 2022. The above referenced application is hereby incorporated by reference in its entirety.

BACKGROUND

A computing device processes video for storage, transmission, reception, and/or display. Processing a video comprises encoding and decoding, for example, to reduce a data size associated with the video.

SUMMARY

The following summary presents a simplified summary of certain features. The summary is not an extensive overview and is not intended to identify key or critical elements.

A video may comprise a sequence of frames displayed consecutively. A block vector predictor (BVP) may be adjusted to provide a more accurate prediction of a block vector (BV). The BV may be determined, for example, using a reconstruction-reordered intra block copy (RRIBC) mode. A reference region may be determined (e.g., an RRIBC reference region) that corresponds to the direction for flipping. The reference region may be determined, for example, based on the RRIBC mode being indicated in a direction for flipping a reference block relative to a current block. The reference region may be a region within a picture frame from which the reference block may be selected. The reference region corresponding to the flipping direction may be used with respect to a BVP to determine whether the BVP should be replaced with an adjusted BVP. The BVP may be replaced with the adjusted BVP, for example, if the BVP is determined to indicate a position that is outside of the reference region.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 16 shows an example of intra block copy (IBC) for encoding.

DETAILED DESCRIPTION

Figure 1:
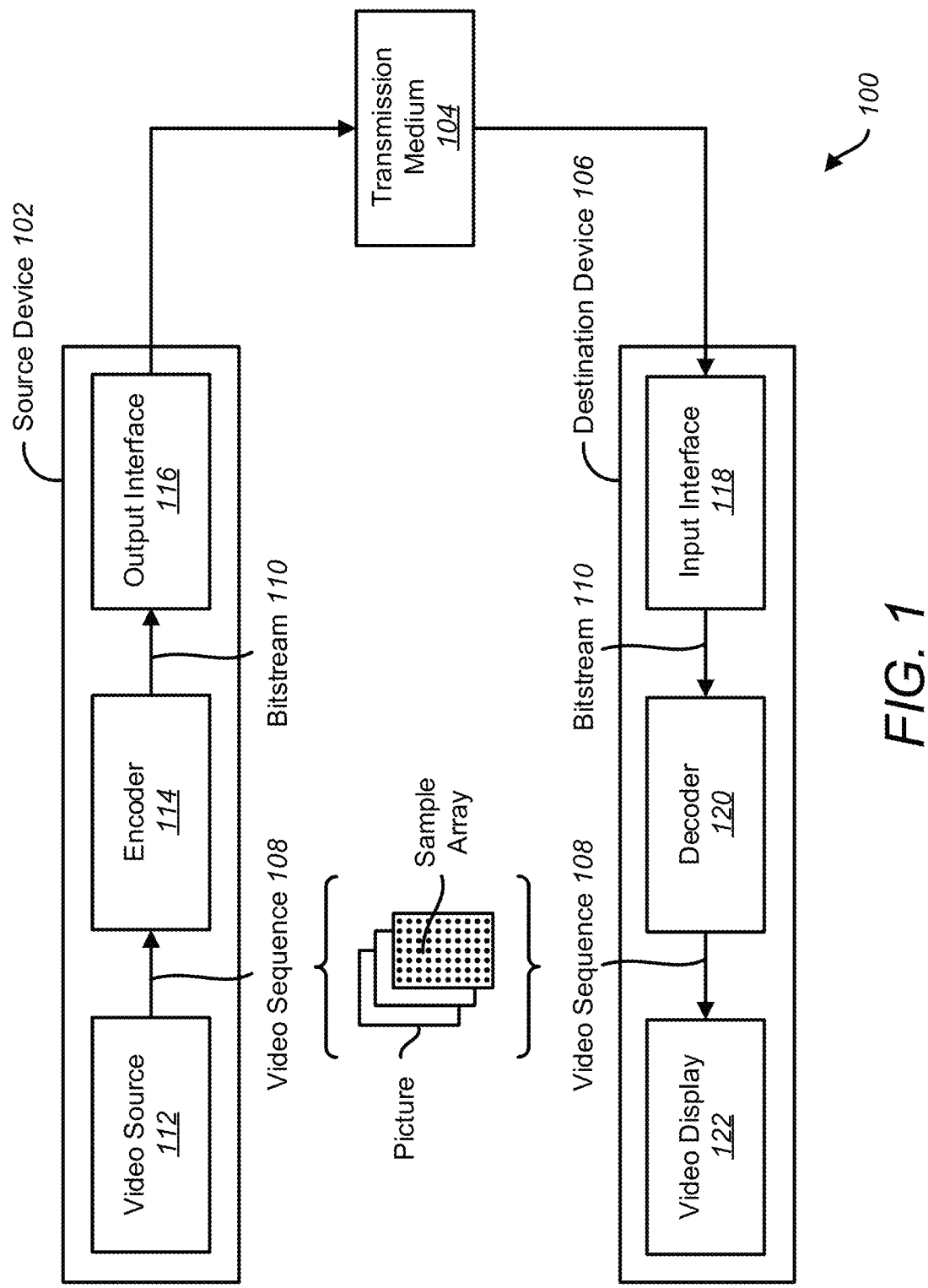
FIG. 1 shows an example video coding/decoding system.

The accompanying drawings and descriptions provide examples. It is to be understood that the examples shown in the drawings and/or described are non-exclusive, and that features shown and described may be practiced in other examples. Examples are provided for operation of video encoding and decoding systems, which may be used in the technical field of video data storage and/or transmission/reception. More particularly, the technology disclosed herein may relate to video compression as used in encoding and/or decoding devices and/or systems.

A video sequence, comprising multiple pictures/frames, may be represented in digital form for storage and/or transmission. Representing a video sequence in digital form may require a large quantity of bits. Large data sizes that may be associated with video sequences may require significant resources for storage and/or transmission. Video encoding may be used to compress a size of a video sequence for more efficient storage and/or transmission. Video decoding may be used to decompress a compressed video sequence for display and/or other forms of consumption.

FIG. 1 shows an example video coding/decoding system. Video coding/decoding system 100 may comprise a source device 102, a transmission medium 104, and a destination device 106. The source device 102 may encode a video sequence 108 into a bitstream 110 for more efficient storage and/or transmission. The source device 102 may store and/or send/transmit the bitstream 110 to the destination device 106 via the transmission medium 104. The destination device 106 may decode the bitstream 110 to display the video sequence 108. The destination device 106 may receive the bitstream 110 from the source device 102 via the transmission medium 104. The source device 102 and/or the destination device 106 may be any of a plurality of different devices (e.g., a desktop computer, laptop computer, tablet computer, smart phone, wearable device, television, camera, video gaming console, set-top box, video streaming device, etc.).

The source device 102 may comprise (e.g., for encoding the video sequence 108 into the bitstream 110) one or more of a video source 112, an encoder 114, and/or an output interface 116. The video source 112 may provide and/or generate the video sequence 108 based on a capture of a natural scene and/or a synthetically generated scene. A synthetically generated scene may be a scene comprising computer generated graphics and/or screen content. The video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A video sequence, such as video sequence 108, may comprise a series of pictures (also referred to as frames). A video sequence may achieve an impression of motion based on successive presentation of pictures of the video sequence using a constant time interval or variable time intervals between the pictures. A picture may comprise one or more sample arrays of intensity values. The intensity values may be taken (e.g., measured, determined, provided) at a series of regularly spaced locations within a picture. A color picture may comprise (e.g., typically comprises) a luminance sample array and two chrominance sample arrays. The luminance sample array may comprise intensity values representing the brightness (e.g., luma component, Y) of a picture. The chrominance sample arrays may comprise intensity values that respectively represent the blue and red components of a picture (e.g., chroma components, Cb and Cr) separate from the brightness. Other color picture sample arrays may be possible based on different color schemes (e.g., a red, green, blue (RGB) color scheme). A pixel, in a color picture, may refer to/comprise/be associated with all intensity values (e.g., luma component, chroma components), for a given location, in the sample arrays used to represent color pictures. A monochrome picture may comprise a single, luminance sample array. A pixel, in a monochrome picture, may refer to/comprise/be associated with the intensity value (e.g., luma component) at a given location in the single, luminance sample array used to represent monochrome pictures.

The encoder 114 may encode the video sequence 108 into the bitstream 110. The encoder 114 may apply/use (e.g., to encode the video sequence 108) one or more prediction techniques to reduce redundant information in the video sequence 108. Redundant information may comprise information that may be predicted at a decoder and need not be transmitted to the decoder for accurate decoding of the video sequence 108. For example, the encoder 114 may apply spatial prediction (e.g., intra-frame or intra prediction), temporal prediction (e.g., inter-frame prediction or inter prediction), inter-layer prediction, and/or other prediction techniques to reduce redundant information in the video sequence 108. The encoder 114 may partition pictures comprising the video sequence 108 into rectangular regions referred to as blocks, for example, prior to applying one or more prediction techniques. The encoder 114 may then encode a block using the one or more of the prediction techniques.

The encoder 114 may search for a block similar to the block being encoded in another picture (e.g., a reference picture) of the video sequence 108, for example, for temporal prediction. The block determined during the search (e.g., a prediction block) may then be used to predict the block being encoded. The encoder 114 may form a prediction block based on data from reconstructed neighboring samples of the block to be encoded within the same picture of the video sequence 108, for example, for spatial prediction. A reconstructed sample may be a sample that was encoded and then decoded. The encoder 114 may determine a prediction error (e.g., a residual) based on the difference between a block being encoded and a prediction block. The prediction error may represent non-redundant information that may be sent/transmitted to a decoder for accurate decoding of the video sequence 108.

The encoder 114 may apply a transform to the prediction error (e.g. using a discrete cosine transform (DCT), or any other transform) to generate transform coefficients. The encoder 114 may form the bitstream 110 based on the transform coefficients and other information used to determine prediction blocks using/based on prediction types, motion vectors, and prediction modes. The encoder 114 may perform one or more of quantization and entropy coding of the transform coefficients and/or the other information used to determine the prediction blocks, for example, prior to forming the bitstream 110. The quantization and/or the entropy coding may further reduce the quantity of bits needed to store and/or transmit the video sequence 108.

The output interface 116 may be configured to write and/or store the bitstream 110 onto the transmission medium 104 for transmission to the destination device 106. The output interface 116 may be configured to send/transmit, upload, and/or stream the bitstream 110 to the destination device 106 via the transmission medium 104. The output interface 116 may comprise a wired and/or a wireless transmitter configured to send/transmit, upload, and/or stream the bitstream 110 in accordance with one or more proprietary, open-source, and/or standardized communication protocols (e.g., Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, Wireless Application Protocol (WAP) standards, and/or any other communication protocol).

The transmission medium 104 may comprise wireless, wired, and/or computer readable medium. For example, the transmission medium 104 may comprise one or more wires, cables, air interfaces, optical discs, flash memory, and/or magnetic memory. The transmission medium 104 may comprise one or more networks (e.g., the internet) or file servers configured to store and/or send/transmit encoded video data.

The destination device 106 may decode the bitstream 110 into the video sequence 108 for display. The destination device 106 may comprise one or more of an input interface 118, a decoder 120, and/or a video display 122. The input interface 118 may be configured to read the bitstream 110 stored on the transmission medium 104 by the source device 102. The input interface 118 may be configured to receive, download, and/or stream the bitstream 110 from the source device 102 via the transmission medium 104. The input interface 118 may comprise a wired and/or a wireless receiver configured to receive, download, and/or stream the bitstream 110 in accordance with one or more proprietary, open-source, standardized communication protocols, and/or any other communication protocol (e.g., such as referenced herein).

The decoder 120 may decode the video sequence 108 from the encoded bitstream 110. The decoder 120 may generate prediction blocks for pictures of the video sequence 108 in a similar manner as the encoder 114 and determine the prediction errors for the blocks, for example, to decode the video sequence 108. The decoder 120 may generate the prediction blocks using/based on prediction types, prediction modes, and/or motion vectors received in the bitstream 110. The decoder 120 may determine the prediction errors using the transform coefficients received in the bitstream 110. The decoder 120 may determine the prediction errors by weighting transform basis functions using the transform coefficients. The decoder 120 may combine the prediction blocks and the prediction errors to decode the video sequence 108. The video sequence 108 at the destination device 106 may be, or may not necessarily be, the same video sequence sent, such as the video sequence 108 as sent by the source device 102. The decoder 120 may decode a video sequence that approximates the video sequence 108, for example, because of lossy compression of the video sequence 108 by the encoder 114 and/or errors introduced into the encoded bitstream 110 during transmission to the destination device 106.

The video display 122 may display the video sequence 108 to a user. The video display 122 may comprise a cathode rate tube (CRT) display, a liquid crystal display (LCD), a plasma display, a light emitting diode (LED) display, and/or any other display device suitable for displaying the video sequence 108.

The video encoding/decoding system 100 is merely an example and video encoding/decoding systems different from the video encoding/decoding system 100 and/or modified versions of the video encoding/decoding system 100 may perform the methods and processes as described herein. For example, the video encoding/decoding system 100 may comprise other components and/or arrangements. The video source 112 may be external to the source device 102. The video display device 122 may be external to the destination device 106 or omitted altogether (e.g., if the video sequence 108 is intended for consumption by a machine and/or storage device). The source device 102 may further comprise a video decoder and the destination device 104 may further comprise a video encoder. For example, the source device 102 may be configured to further receive an encoded bit stream from the destination device 106 to support two-way video transmission between the devices.

The encoder 114 and/or the decoder 120 may operate according to one or more proprietary or industry video coding standards. For example, the encoder 114 and/or the decoder 120 may operate in accordance with one or more proprietary, open-source, and/or standardized protocols (e.g., International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC)), ITU-T H.265 and MPEG-I Part 3 (also known as Versatile Video Coding (VVC)), the WebM VP8 and VP9 codecs, and/or AOMedia Video 1 (AV1), and/or any other video coding protocol).

Figure 2:
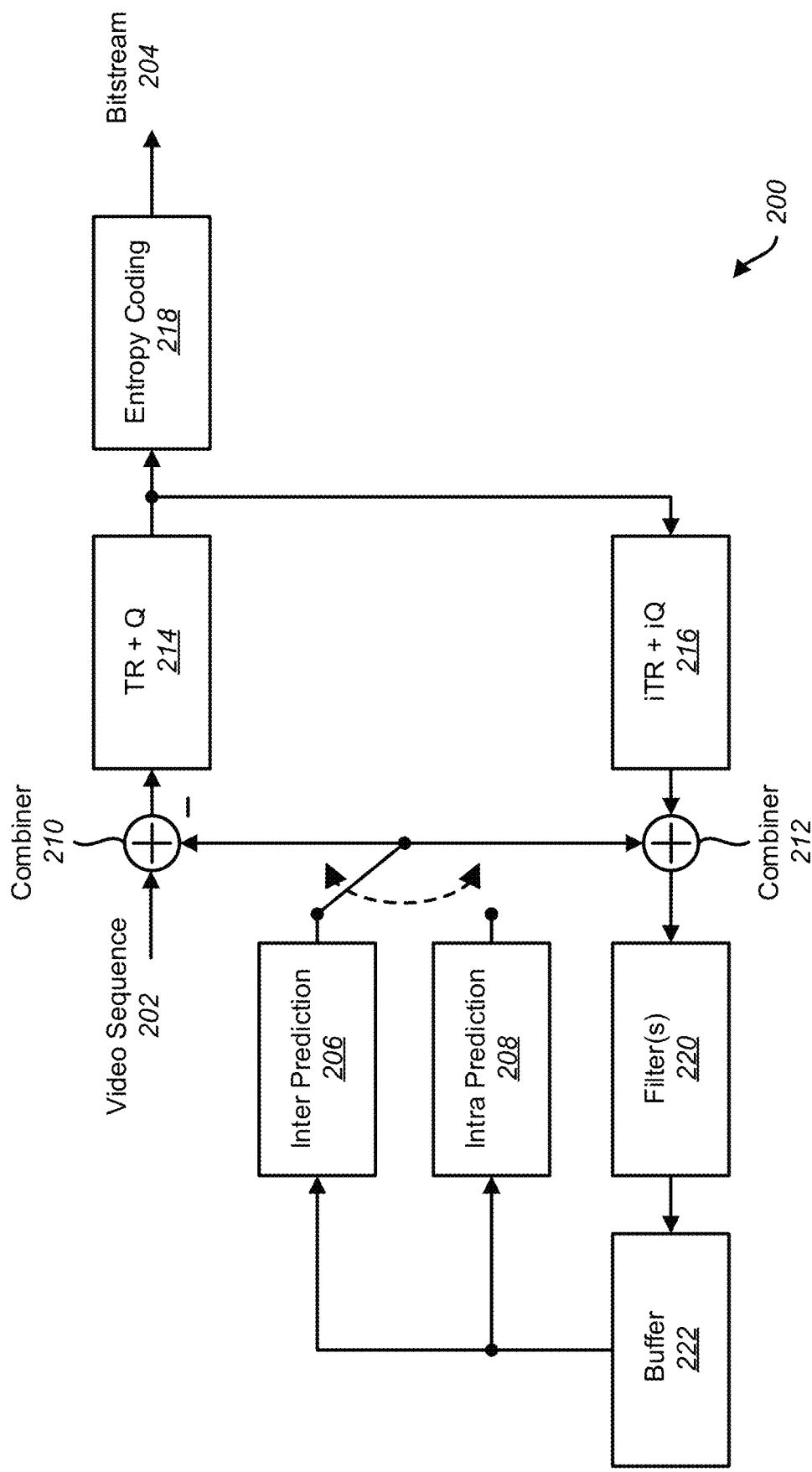
FIG. 2 shows an example encoder.

FIG. 2 shows an example encoder. The encoder 200 as shown in FIG. 2 may implement one or more processes described herein. The encoder 200 may encode a video sequence 202 into a bitstream 204 for more efficient storage and/or transmission. The encoder 200 may be implemented in the video coding/decoding system 100 as shown in FIG. 1 (e.g., as the encoder 114) or in any computing, communication, or electronic device (e.g., desktop computer, laptop computer, tablet computer, smart phone, wearable device, television, camera, video gaming console, set-top box, video streaming device, etc.). The encoder 200 may comprise one or more of an inter prediction unit 206, an intra prediction unit 208, combiners 210 and 212, a transform and quantization unit (TR+Q) 214, an inverse transform and quantization unit (iTR+iQ) 216, an entropy coding unit 218, one or more filters 220, and/or a buffer 222.

The encoder 200 may partition pictures (e.g., frames) of (e.g., comprising) the video sequence 202 into blocks and encode the video sequence 202 on a block-by-block basis. The encoder 200 may perform/apply a prediction technique on a block being encoded using either the inter prediction unit 206 or the intra prediction unit 208. The inter prediction unit 206 may perform inter prediction by searching for a block similar to the block being encoded in another, reconstructed picture (e.g., a reference picture) of the video sequence 202. The reconstructed picture may be a picture that was encoded and then decoded. The block determined during the search (e.g., a prediction block) may then be used to predict the block being encoded to remove redundant information. The inter prediction unit 206 may exploit temporal redundancy or similarities in scene content from picture to picture in the video sequence 202 to determine the prediction block. For example, scene content between pictures of the video sequence 202 may be similar except for differences due to motion and/or affine transformation of the screen content over time.

The intra prediction unit 208 may perform intra prediction by forming a prediction block based on data from reconstructed neighboring samples of the block to be encoded within the same picture of the video sequence 202. The reconstructed sample may be a sample that was encoded and then decoded. The intra prediction unit 208 may exploit spatial redundancy or similarities in scene content within a picture of the video sequence 202 to determine the prediction block. For example, the texture of a region of scene content in a picture may be similar to the texture in the immediate surrounding area of the region of the scene content in the same picture.

The combiner 210 may determine a prediction error (e.g., a residual) based on the difference between the block being encoded and the prediction block. The prediction error may represent non-redundant information that may be sent/transmitted to a decoder for accurate decoding of the video sequence 202.

The transform and quantization unit (TR+Q) 214 may transform and quantize the prediction error. The transform and quantization unit 214 may transform the prediction error into transform coefficients by applying, for example, a DCT to reduce correlated information in the prediction error. The transform and quantization unit 214 may quantize the coefficients by mapping data of the transform coefficients to a predefined set of representative values. The transform and quantization unit 214 may quantize the coefficients to reduce irrelevant information in the bitstream 204. The Irrelevant information may be information that may be removed from the coefficients without producing visible and/or perceptible distortion in the video sequence 202 after decoding (e.g., at a receiving device).

The entropy coding unit 218 may apply one or more entropy coding methods to the quantized transform coefficients to further reduce the bit rate. For example, the entropy coding unit 218 may apply context adaptive variable length coding (CAVLC), context adaptive binary arithmetic coding (CABAC), and/or syntax-based context-based binary arithmetic coding (SBAC). The entropy coded coefficients may be packed to form the bitstream 204.

The inverse transform and quantization unit (iTR+iQ) 216 may inverse quantize and inverse transform the quantized transform coefficients to determine a reconstructed prediction error. The combiner 212 may combine the reconstructed prediction error with the prediction block to form a reconstructed block. The filter(s) 220 may filter the reconstructed block, for example, using a deblocking filter and/or a sample-adaptive offset (SAO) filter. The buffer 222 may store the reconstructed block for prediction of one or more other blocks in the same and/or different picture of the video sequence 202.

The encoder 200 may further comprise an encoder control unit. The encoder control unit may be configured to control one or more units of the encoder 200 as shown in FIG. 2. The encoder control unit may control the one or more units of the encoder 200 such that the bitstream 204 may be generated in conformance with the requirements of one or more proprietary coding protocols, industry video coding standards, and/or any other video cording protocol. For example, the encoder control unit may control the one or more units of the encoder 200 such that bitstream 204 may be generated in conformance with one or more of ITU-T H.263, AVC, HEVC, VVC, VP8, VP9, AV1, and/or any other video coding standard/format.

The encoder control unit may attempt to minimize (or reduce) the bitrate of bitstream 204 and/or maximize (or increase) the reconstructed video quality (e.g., within the constraints of a proprietary coding protocol, industry video coding standard, and/or any other video cording protocol). For example, the encoder control unit may attempt to minimize or reduce the bitrate of bitstream 204 such that the reconstructed video quality may not fall below a certain level/threshold, and/or may attempt to maximize or increase the reconstructed video quality such that the bit rate of bitstream 204 may not exceed a certain level/threshold. The encoder control unit may determine/control one or more of: partitioning of the pictures of the video sequence 202 into blocks, whether a block is inter predicted by the inter prediction unit 206 or intra predicted by the intra prediction unit 208, a motion vector for inter prediction of a block, an intra prediction mode among a plurality of intra prediction modes for intra prediction of a block, filtering performed by the filter(s) 220, and/or one or more transform types and/or quantization parameters applied by the transform and quantization unit 214. The encoder control unit may determine/control one or more of the above based on a rate-distortion measure for a block or picture being encoded. The encoder control unit may determine/control one or more of the above to reduce the rate-distortion measure for a block or picture being encoded.

The prediction type used to encode a block (intra or inter prediction), prediction information of the block (intra prediction mode if intra predicted, motion vector, etc.), and/or transform and/or quantization parameters, may be sent to the entropy coding unit 218 to be further compressed (e.g., to reduce the bit rate). The prediction type, prediction information, and/or transform and/or quantization parameters may be packed with the prediction error to form the bitstream 204.

The encoder 200 is merely an example and encoders different from the encoder 200 and/or modified versions of the encoder 200 may perform the methods and processes as described herein. For example, the encoder 200 may comprise other components and/or arrangements. One or more of the components shown in FIG. 2 may be optionally included in the encoder 200 (e.g., the entropy coding unit 218 and/or the filters(s) 220).

Figure 3:
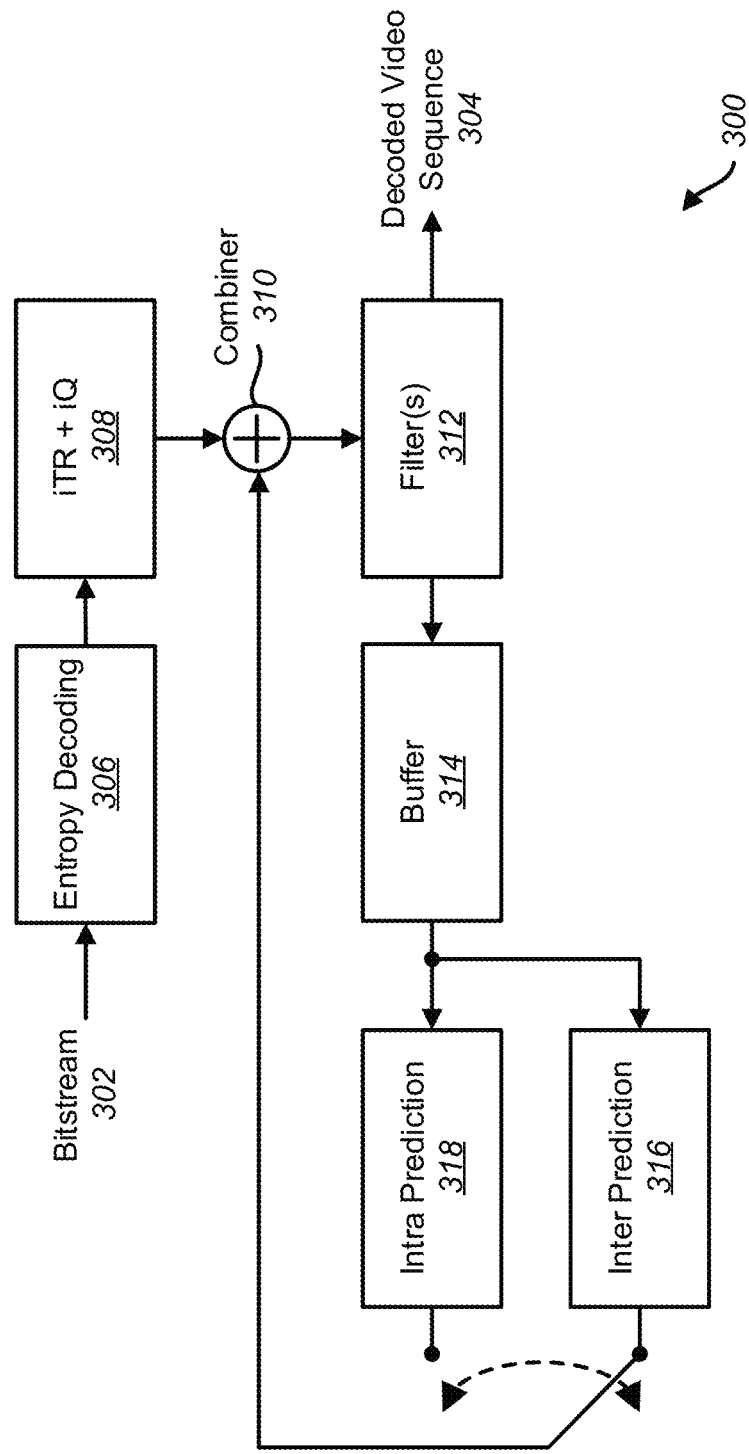
FIG. 3 shows an example decoder.

FIG. 3 shows an example decoder. A decoder 300 as shown in FIG. 3 may implement one or more processes described herein. The decoder 300 may decode a bitstream 302 into a decoded video sequence 304 for display and/or some other form of consumption. The decoder 300 may be implemented in the video encoding/decoding system 100 in FIG. 1 and/or in a computing, communication, or electronic device (e.g., desktop computer, laptop computer, tablet computer, smart phone, wearable device, television, camera, video gaming console, set-top box, and/or video streaming device). The decoder 300 may comprise an entropy decoding unit 306, an inverse transform and quantization (iTR+iQ) unit 308, a combiner 310, one or more filters 312, a buffer 314, an inter prediction unit 316, and/or an intra prediction unit 318.

The decoder 300 may comprise a decoder control unit configured to control one or more units of decoder 300. The decoder control unit may control the one or more units of decoder 300 such that the bitstream 302 is decoded in conformance with the requirements of one or more proprietary coding protocols, industry video coding standards, and/or any other communication protocol. For example, the decoder control unit may control the one or more units of decoder 300 such that the bitstream 302 is decoded in conformance with one or more of ITU-T H.263, AVC, HEVC, VVC, VP8, VP9, AV1, and/or any other video coding standard/format.

The decoder control unit may determine/control one or more of: whether a block is inter predicted by the inter prediction unit 316 or intra predicted by the intra prediction unit 318, a motion vector for inter prediction of a block, an intra prediction mode among a plurality of intra prediction modes for intra prediction of a block, filtering performed by the filter(s) 312, and/or one or more inverse transform types and/or inverse quantization parameters to be applied by the inverse transform and quantization unit 308. One or more of the control parameters used by the decoder control unit may be packed in bitstream 302.

The Entropy decoding unit 306 may entropy decode the bitstream 302. The inverse transform and quantization unit 308 may inverse quantize and/or inverse transform the quantized transform coefficients to determine a decoded prediction error. The combiner 310 may combine the decoded prediction error with a prediction block to form a decoded block. The prediction block may be generated by the intra prediction unit 318 or the inter prediction unit 316 (e.g., as described above with respect to encoder 200 in FIG. 2). The filter(s) 312 may filter the decoded block, for example, using a deblocking filter and/or a sample-adaptive offset (SAO) filter. The buffer 314 may store the decoded block for prediction of one or more other blocks in the same and/or different picture of the video sequence in the bitstream 302. The decoded video sequence 304 may be output from the filter(s) 312 as shown in FIG. 3.

The decoder 300 is merely an example and decoders different from the decoder 300 and/or modified versions of the decoder 300 may perform the methods and processes as described herein. For example, the decoder 300 may have other components and/or arrangements. One or more of the components shown in FIG. 3 may be optionally included in the decoder 300 (e.g., the entropy decoding unit 306 and/or the filters(s) 312).

Although not shown in FIGS. 2 and 3, each of the encoder 200 and the decoder 300 may further comprise an intra block copy unit in addition to inter prediction and intra prediction units. The intra block copy unit may perform/operate similar to an inter prediction unit but may predict blocks within the same picture. For example, the intra block copy unit may exploit repeated patterns that appear in screen content. The screen content may include computer generated text, graphics, animation, etc.

Video encoding and/or decoding may be performed on a block-by-block basis. The process of partitioning a picture into blocks may be adaptive based on the content of the picture. For example, larger block partitions may be used in areas of a picture with higher levels of homogeneity to improve coding efficiency.

A picture (e.g., in HEVC, or any other coding standard/format) may be partitioned into non-overlapping square blocks, which may be referred to as coding tree blocks (CTBs). The CTBs may comprise samples of a sample array. A CTB may have a size of $2^n \times 2^n$ samples, where n may be specified by a parameter of the encoding system. For example, n may be 4, 5, 6, or any other value. A CTB may have any other size. A CTB may be further partitioned by a recursive quadtree partitioning into coding blocks (CBs) of half vertical and half horizontal size. The CTB may form the root of the quadtree. A CB that is not split further as part of the recursive quadtree partitioning may be referred to as a leaf CB of the quadtree, and otherwise may be referred to as a non-leaf CB of the quadtree. A CB may have a minimum size specified by a parameter of the encoding system. For example, a CB may have a minimum size of 4×4, 8×8, 16×16, 32×32, 64×64 samples, or any other minimum size. A CB may be further partitioned into one or more prediction blocks (PBs) for performing inter and/or intra prediction. A PB may be a rectangular block of samples on which the same prediction type/mode may be applied. For transformations, a CB may be partitioned into one or more transform blocks (TBs). A TB may be a rectangular block of samples that may determine/indicate an applied transform size.

Figure 4:
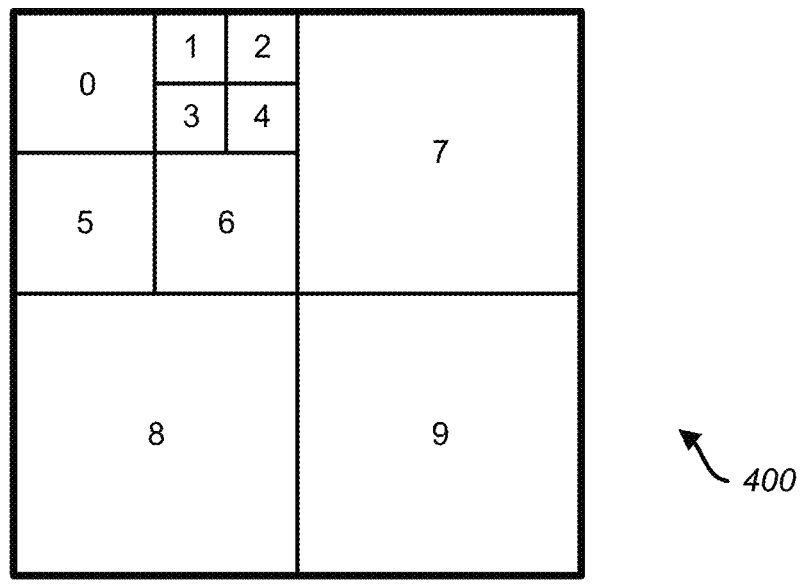
FIG. 4 shows an example quadtree partitioning of a coding tree block (CTB).
Figure 5:
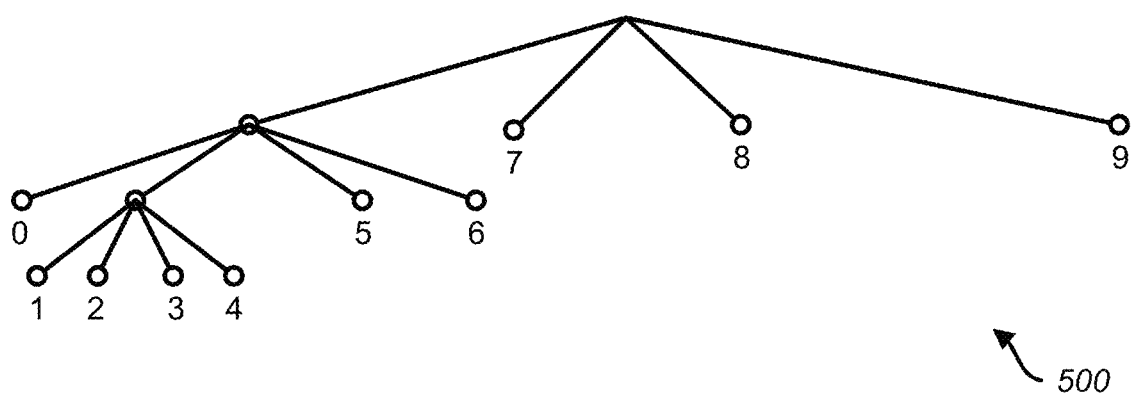
FIG. 5 shows an example quadtree corresponding to the example quadtree partitioning of the CTB in FIG. 4.

FIG. 4 shows an example quadtree partitioning of a CTB. FIG. 5 shows a quadtree corresponding to the example quadtree partitioning of the CTB 400 in FIG. 4. As shown in FIGS. 4 and 5, the CTB 400 may first be partitioned into four CBs of half vertical and half horizontal size. Three of the resulting CBs of the first level partitioning of CTB 400 may be leaf CBs. The three leaf CBs of the first level partitioning of CTB 400 are respectively labeled 7, 8, and 9 in FIGS. 4 and 5. The non-leaf CB of the first level partitioning of CTB 400 may be partitioned into four sub-CBs of half vertical and half horizontal size. Three of the resulting sub-CBs of the second level partitioning of CTB 400 may be leaf CBs. The three leaf CBs of the second level partitioning of CTB 400 are respectively labeled 0, 5, and 6 in FIGS. 4 and 5. The non-leaf CB of the second level partitioning of CTB 400 may be partitioned into four leaf CBs of half vertical and half horizontal size. The four leaf CBs may be respectively labeled 1, 2, 3, and 4 in FIGS. 4 and 5.

The CTB 400 of FIG. 4 may be partitioned into 10 leaf CBs respectively labeled 0-9, and/or any other quantity of leaf CBs. The 10 leaf CBs may correspond to 10 CB leaf nodes (e.g., 10 CB leaf nodes of the quadtree 500 as shown in FIG. 5). In other examples, a CTB may be partitioned into a different number of leaf CBs. The resulting quadtree partitioning of the CTB 400 may be scanned using a z-scan (e.g., left-to-right, top-to-bottom) to form the sequence order for encoding/decoding the CB leaf nodes. A numeric label (e.g., indicator, index) of each CB leaf node in FIGS. 4 and 5 may correspond to the sequence order for encoding/decoding. For example, CB leaf node 0 may be encoded/decoded first and CB leaf node 9 may be encoded/decoded last. Although not shown in FIGS. 4 and 5, each CB leaf node may comprise one or more PBs and/or TBs.

A picture, in VVC (or in any other coding standard/format), may be partitioned in a similar manner (such as in HEVC). A picture may be first partitioned into non-overlapping square CTBs. The CTBs may then be partitioned, using a recursive quadtree partitioning, into CBs of half vertical and half horizontal size. A quadtree leaf node (e.g., in VVC) may be further partitioned by a binary tree or ternary tree partitioning (or any other partitioning) into CBs of unequal sizes.

Figure 6:
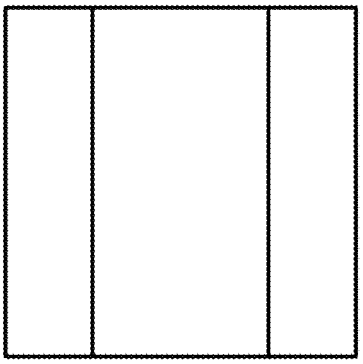
FIG. 6 shows example binary tree and ternary tree partitions.
Figure 6:
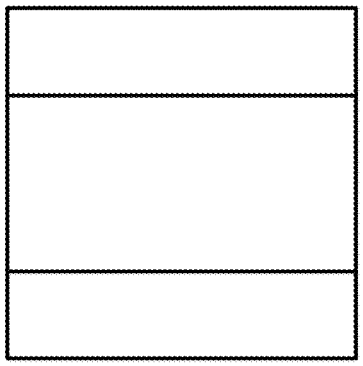
Figure 6:
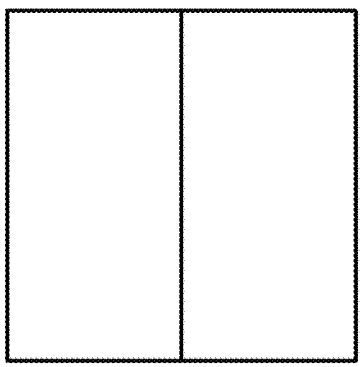
Figure 6:
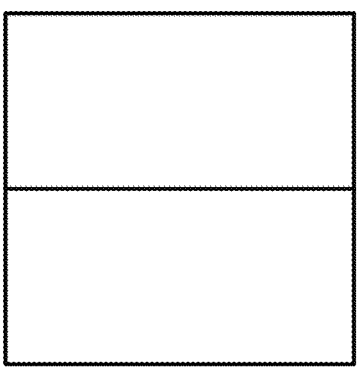

FIG. 6 shows example binary tree and ternary tree partitions. A binary tree partition may divide a parent block in half in either a vertical direction 602 or a horizontal direction 604. The resulting partitions may be half in size as compared to the parent block. The resulting partitions may correspond to sizes that are less than and/or greater than half of the parent block size. A ternary tree partition may divide a parent block into three parts in either a vertical direction 606 or a horizontal direction 608. FIG. 6 shows an example in which the middle partition may be twice as large as the other two end partitions in the ternary tree partitions. In other examples, partitions may be of other sizes relative to each other and to the parent block. Binary and ternary tree partitions are examples of multi-type tree partitioning. Multi-type tree partitions may comprise partitioning a parent block into other quantities of smaller blocks. The block partitioning strategy (e.g., in VVC) may be referred to as a combination of quadtree and multi-type tree partitioning (quadtree+multi-type tree partitioning) because of the addition of binary and/or ternary tree partitioning to quadtree partitioning.

Figure 7:
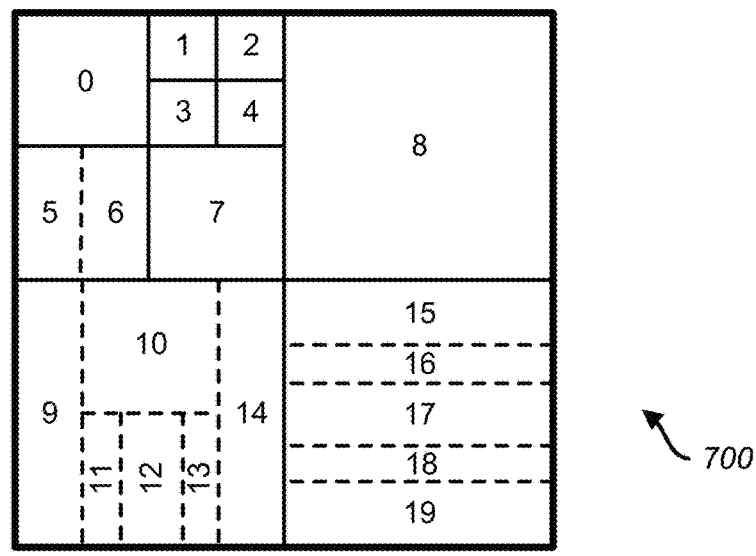
FIG. 7 shows an example of combined quadtree and multi-type tree partitioning of a CTB.
Figure 8:
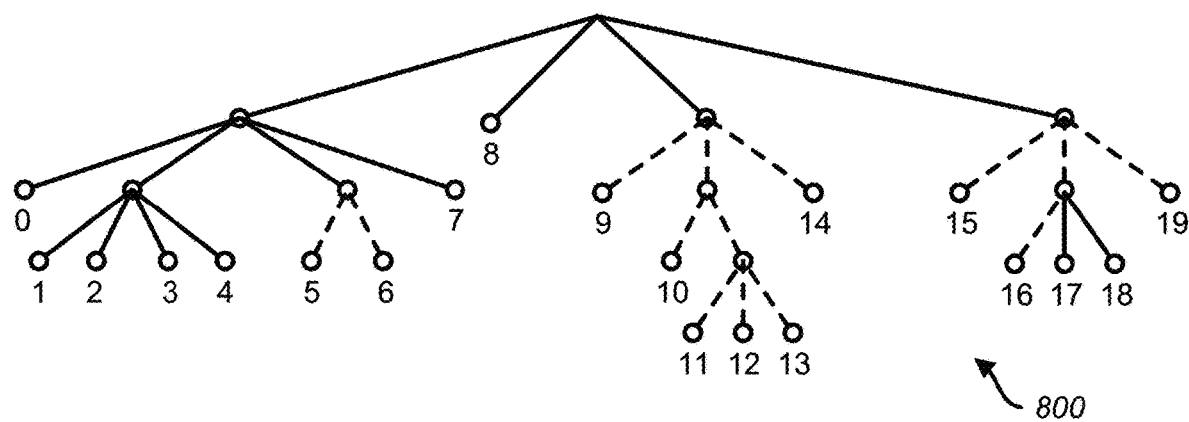
FIG. 8 shows a tree corresponding to the combined quadtree and multi-type tree partitioning of the CTB shown in FIG. 7.

FIG. 7 shows an example of combined quadtree and multi-type tree partitioning of a CTB. FIG. 8 shows a tree corresponding to the combined quadtree and multi-type tree partitioning of the CTB 700 shown in FIG. 7. In both FIGS. 7 and 8, quadtree splits are shown in solid lines and multi-type tree splits are shown in dashed lines. The CTB 700 is shown with the same quadtree partitioning as the CTB 400 described in FIG. 4, and a description of the quadtree partitioning of the CTB 700 is omitted. The quadtree partitioning of the CTB 700 is merely an example and a CTB may be quadtree partitioned in a manner different from the CTB 700. Additional multi-type tree partitions of the CTB 700 may be made relative to three leaf CBs shown in FIG. 4. The three leaf CBs in FIG. 4 that are shown in FIG. 7 as being further partitioned may be leaf CBs 5, 8, and 9. The three leaf CBs may be further partitioned using one or more binary and/or ternary tree partitions.

The leaf CB 5 of FIG. 4 may be partitioned into two CBs based on a vertical binary tree partitioning. The two resulting CBs may be leaf CBs respectively labeled 5 and 6 in FIGS. 7 and 8. The leaf CB 8 of FIG. 4 may be partitioned into three CBs based on a vertical ternary tree partition. Two of the three resulting CBs may be leaf CBs respectively labeled 9 and 14 in FIGS. 7 and 8. The remaining, non-leaf CB may be partitioned first into two CBs based on a horizontal binary tree partition. One of the two CBs may be a leaf CB labeled 10. The other of the two CBs may be further partitioned into three CBs based on a vertical ternary tree partition. The resulting three CBs may be leaf CBs respectively labeled 11, 12, and 13 in FIGS. 7 and 8. The leaf CB 9 of FIG. 4 may be partitioned into three CBs based on a horizontal ternary tree partition. Two of the three CBs may be leaf CBs respectively labeled 15 and 19 in FIGS. 7 and 8. The remaining, non-leaf CB may be partitioned into three CBs based on another horizontal ternary tree partition. The resulting three CBs may all be leaf CBs respectively labeled 16, 17, and 18 in FIGS. 7 and 8.

Altogether, the CTB 700 may be partitioned into 20 leaf CBs respectively labeled 0-19. The 20 leaf CBs may correspond to 20 leaf nodes (e.g., 20 leaf nodes of the tree 800 shown in FIG. 8). The resulting combination of quadtree and multi-type tree partitioning of the CTB 700 may be scanned using a z-scan (left-to-right, top-to-bottom) to form the sequence order for encoding/decoding the CB leaf nodes. A numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and/or TBs.

A coding standard/format (e.g., HEVC, VVC, or any other coding standard/format) may define various units (e.g., in addition to specifying various blocks (e.g., CTBs, CBs, PBs, TBs)). Blocks may comprise a rectangular area of samples in a sample array. Units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

A block may refer to any of a CTB, CB, PB, TB, CTU, CU, PU, and/or TU (e.g., in the context of HEVC, VVC, or any other coding format/standard). A block may be used to refer to similar data structures in the context of any video coding format/standard/protocol. For example, a block may refer to a macroblock in the AVC standard, a macroblock or a sub-block in the VP8 coding format, a superblock or a sub-block in the VP9 coding format, and/or a superblock or a sub-block in the AV1 coding format.

Samples of a block to be encoded (e.g., a current block) may be predicted from samples of the column immediately adjacent to the left-most column of the current block and samples of the row immediately adjacent to the top-most row of the current block, such as in intra prediction. The samples from the immediately adjacent column and row may be jointly referred to as reference samples. Each sample of the current block may be predicted (e.g., in an intra prediction mode) by projecting the position of the sample in the current block in a given direction to a point along the reference samples. The sample may be predicted by interpolating between the two closest reference samples of the projection point if the projection does not fall directly on a reference sample. A prediction error (e.g., a residual) may be determined for the current block based on differences between the predicted sample values and the original sample values of the current block.

Predicting samples and determining a prediction error based on a difference between the predicted samples and original samples may be performed (e.g., at an encoder) for a plurality of different intra prediction modes (e.g., including non-directional intra prediction modes). The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block, using the intra prediction mode indicated by the encoder, and/or combining the predicted samples with the prediction error.

Figure 9:
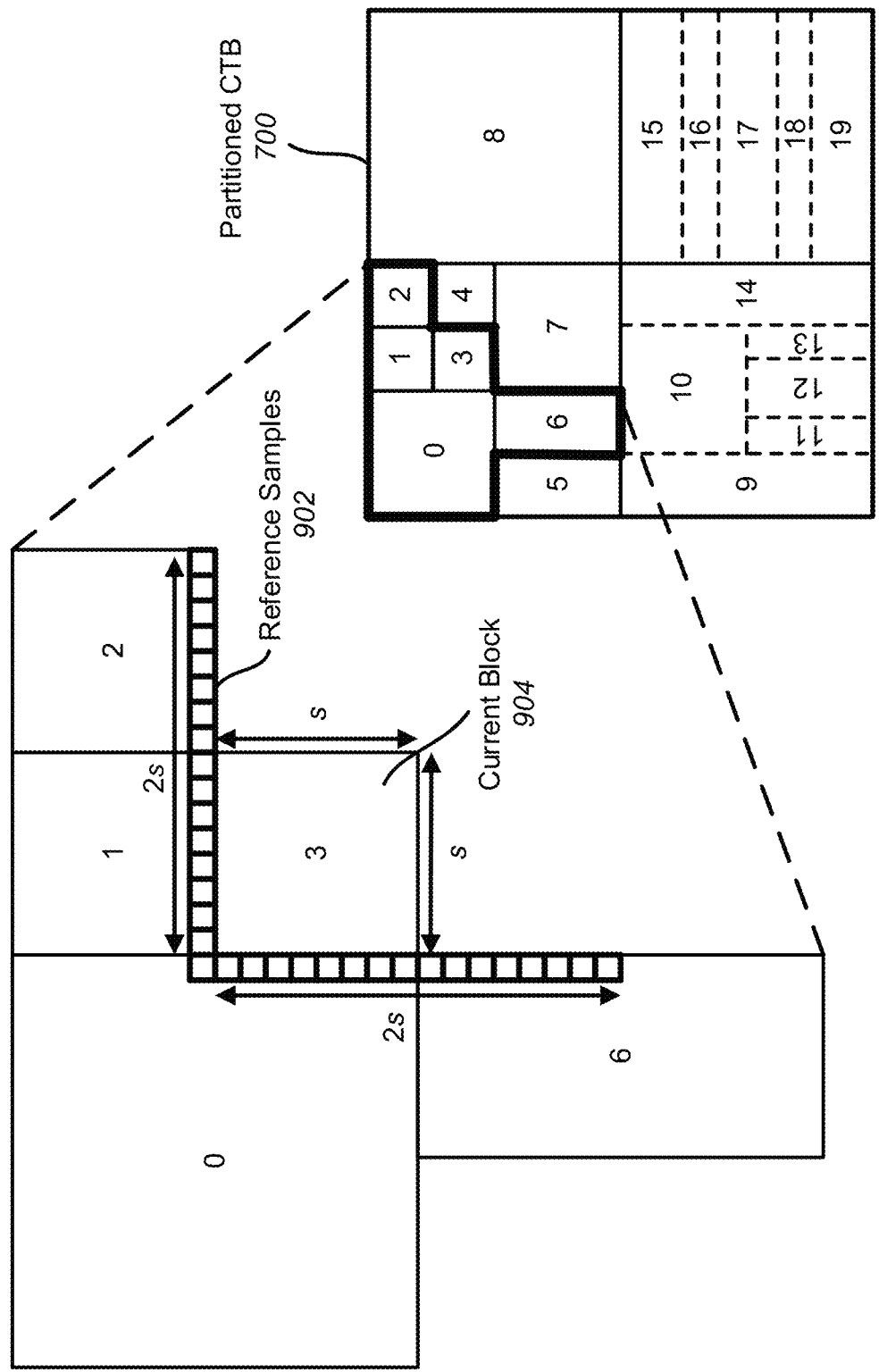
FIG. 9 shows an example set of reference samples determined for intra prediction of a current block.

FIG. 9 shows an example set of reference samples determined for intra prediction of a current block. The current block 904 may correspond to a block being encoded and/or decoded. The current block 904 may correspond to block 3 of the partitioned CTB 700 as shown in FIG. 7. As described herein, the numeric labels 0-19 of the blocks of partitioned CTB 700 may correspond to the sequence order for encoding/decoding the blocks and may be used as such in the example of FIG. 9.

The current block 904 may be w×h samples in size. The reference samples 902 may comprise: 2w samples (or any other quantity of samples) of the row immediately adjacent to the top-most row of the current block 904, 2h samples (or any other quantity of samples) of the column immediately adjacent to the left-most column of the current block 904, and the top left neighboring corner sample to the current block 904. The current block 904 may be square, such that w=h=s. In other examples, a current block need not be square, such that w≠h. Available samples from neighboring blocks of the current block 904 may be used for constructing the set of reference samples 902. Samples may not be available for constructing the set of reference samples 902, for example, if the samples lie outside the picture of the current block, the samples are part of a different slice of the current block (e.g., if the concept of slices is used), and/or the samples belong to blocks that have been inter coded and constrained intra prediction is indicated. Intra prediction may not be dependent on inter predicted blocks, for example, if constrained intra prediction is indicated.

Samples that may not be available for constructing the set of reference samples 902 may comprise samples in blocks that have not already been encoded and reconstructed at an encoder and/or decoded at a decoder based on the sequence order for encoding/decoding. Restriction of such samples from inclusion in the set of reference samples 902 may allow identical prediction results to be determined at both the encoder and decoder. Samples from neighboring blocks 0, 1, and 2 may be available to construct the reference samples 902 given that these blocks are encoded and reconstructed at an encoder and decoded at a decoder prior to coding of the current block 904. The samples from neighboring blocks 0, 1, and 2 may be available to construct reference samples 902, for example, if there are no other issues (e.g., as mentioned above) preventing the availability of the samples from the neighboring blocks 0, 1, and 2. The portion of reference samples 902 from neighboring block 6 may not be available due to the sequence order for encoding/decoding (e.g., because the block 6 may not have already been encoded and reconstructed at the encoder and/or decoded at the decoder based on the sequence order for encoding/decoding).

Unavailable samples from the reference samples 902 may be filled with one or more of the available reference samples 902. For example, an unavailable reference sample may be filled with a nearest available reference sample. The nearest available reference sample may be determined by moving in a clock-wise direction through the reference samples 902 from the position of the unavailable reference. The reference samples 902 may be filled with the mid-value of the dynamic range of the picture being coded, for example, if no reference samples are available.

The reference samples 902 may be filtered based on the size of current block 904 being coded and an applied intra prediction mode. FIG. 9 shows an exemplary determination of reference samples for intra prediction of a block. Reference samples may be determined in a different manner than described above. For example, multiple reference lines may be used in other instances (e.g., in VVC).

Samples of the current block 904 may be intra predicted based on the reference samples 902, for example, based on (e.g., after) determination and (optionally) filtration of the reference samples. At least some (e.g., most) encoders/decoders may support a plurality of intra prediction modes in accordance with one or more video coding standards. For example, HEVC supports 35 intra prediction modes, including a planar mode, a direct current (DC) mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture. Any quantity of intra prediction modes may be supported.

Figure 10A:
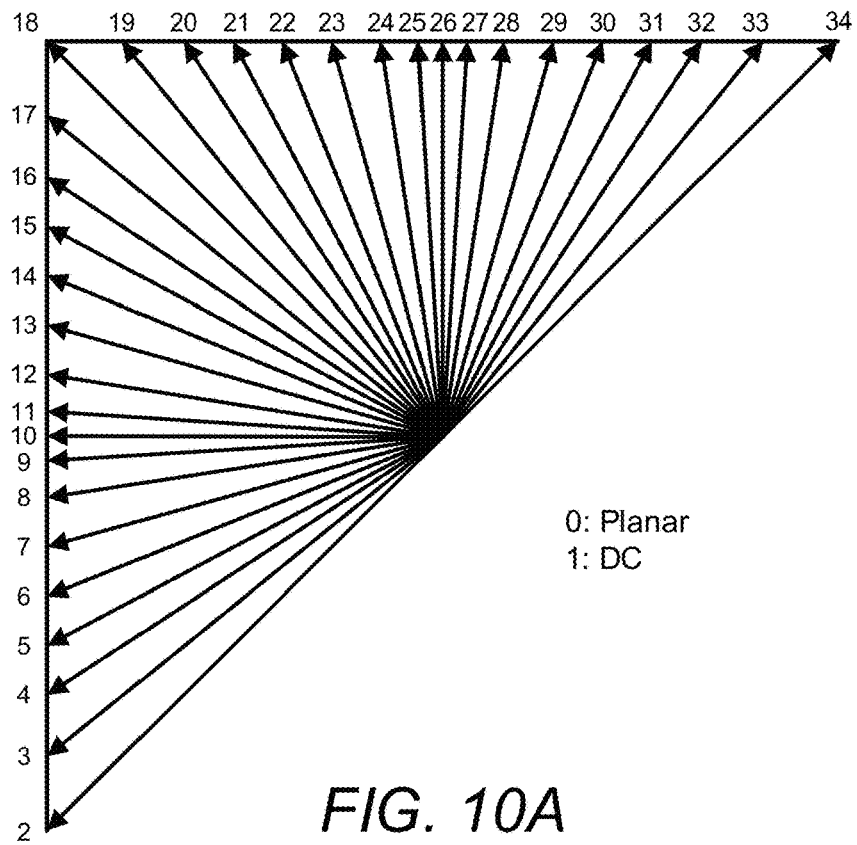
FIGS. 10A and 10B show example intra prediction modes.
Figure 10B:
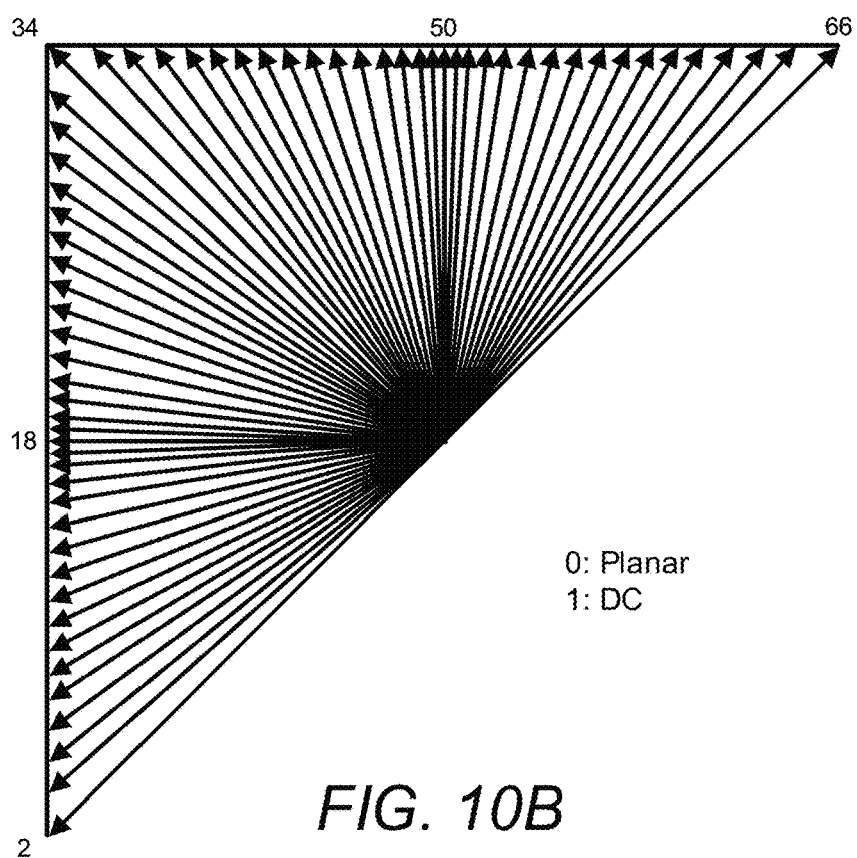

FIGS. 10A and 10B show example intra prediction modes. FIG. 10A shows 35 intra prediction modes, such as supported by HEVC. The 35 intra prediction modes may be indicated/identified by indices 0 to 34. Prediction mode 0 may correspond to planar mode. Prediction mode 1 may correspond to DC mode. Prediction modes 2-34 may correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

FIG. 10B shows 67 intra prediction modes, such as supported by VVC. The 67 intra prediction modes may be indicated/identified by indices 0 to 66. Prediction mode 0 may correspond to planar mode. Prediction mode 1 corresponds to DC mode. Prediction modes 2-66 may correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Some of the intra prediction modes illustrated in FIG. 10B may be adaptively replaced by wide-angle directions because blocks in VVC need not be squares.

Figure 11:
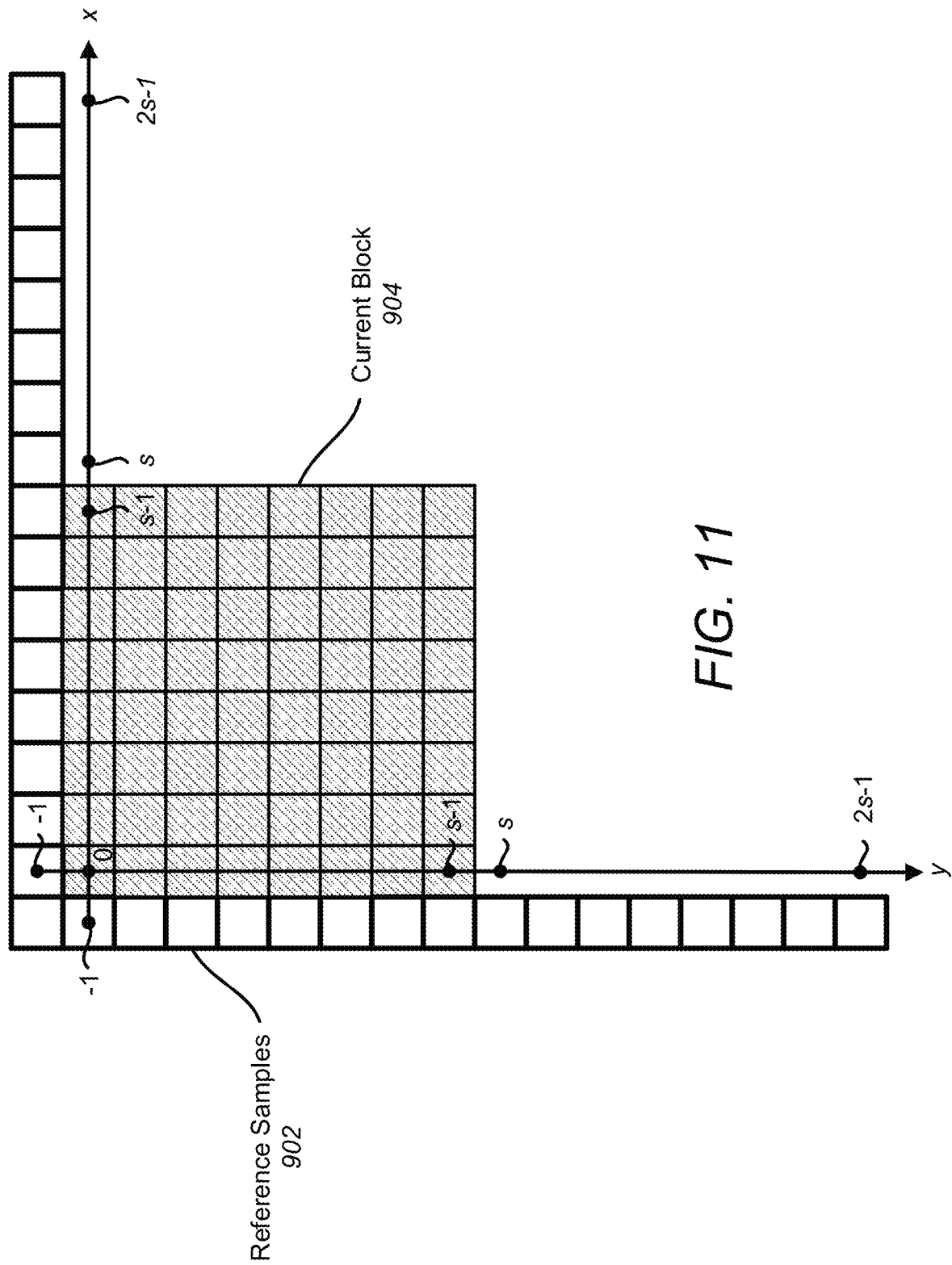
FIG. 11 shows a current block and corresponding reference samples.

FIG. 11 shows a current block and corresponding reference samples. In FIG. 11, the current block 904 and the reference samples 902 from FIG. 9 are shown in a two-dimensional x, y plane, where a sample may be referenced as p[x][y]. In order to simplify the prediction process, the reference samples 902 may be placed in two, one-dimensional arrays. The reference samples 902, above the current block 904, may be placed in the one-dimensional array $ref_1[x]$:

$$ref_1[x]=p[-1+x][-1], (x \geq 0). \quad (1)$$

The reference samples 902 to the left of the current block 904 may be placed in the one-dimensional array $ref_2[y]$:

$$ref_2[x]=p[-1][-1+y], (y \geq 0). \quad (2)$$

The prediction process may comprise determination of a predicted sample p [x][y] (e.g., a predicted value) at a location [x][y] in the current block 904. For planar mode, a sample at the location [x][y] in the current block 904 may be predicted by determining/calculating the mean of two interpolated values. The first of the two interpolated values may be based on a horizontal linear interpolation at the location [x][y] in the current block 904. The second of the two interpolated values may be based on a vertical linear interpolation at the location [x][y] in the current block 904. The predicted sample p [x][y] in the current block 904 may be determined/calculated as:

$$p[x][y] = \frac{1}{2 \cdot s}(h[x][y] + v[x][y] + s), \text{ where} \quad (3)$$

$$h[x][y] = (s - x - 1) \cdot ref_2[y] + (x+1) \cdot ref_1[s] \quad (4)$$

may be the horizonal linear interpolation at the location [x][y] in the current block 904 and $$v[x][y]=(s-y-1) \cdot ref_1[x]+(y+1) \cdot ref_2[s] \quad (5)$$

may be the vertical linear interpolation at the location [x][y] in the current block 904. s may be equal to a length of a side (e.g., a number of samples on a side) of the current block 904.

A sample at a location [x][y] in the current block 904 may be predicted by the mean of the reference samples 902, such as for a DC mode. The predicted sample p [x][y] in the current block 904 may be determined/calculated as:

$$p[x][y] = \frac{1}{2 \cdot s}\left(\sum_{x=0}^{s-1} ref_1[x] + \sum_{y=0}^{s-1} ref_2[y]\right). \quad (6)$$

A sample at a location [x][y] in the current block 904 may be predicted by projecting the location [x][y] in a direction specified by a given angular mode to a point on the horizontal or vertical line of samples comprising the reference samples 902, such as for an angular mode. The sample at the location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC). The direction specified by the angular mode may be given by an angle φ defined relative to the x-axis for horizontal prediction modes (e.g., modes 2-18 in HEVC and modes 2-34 in VVC).

Figure 12:
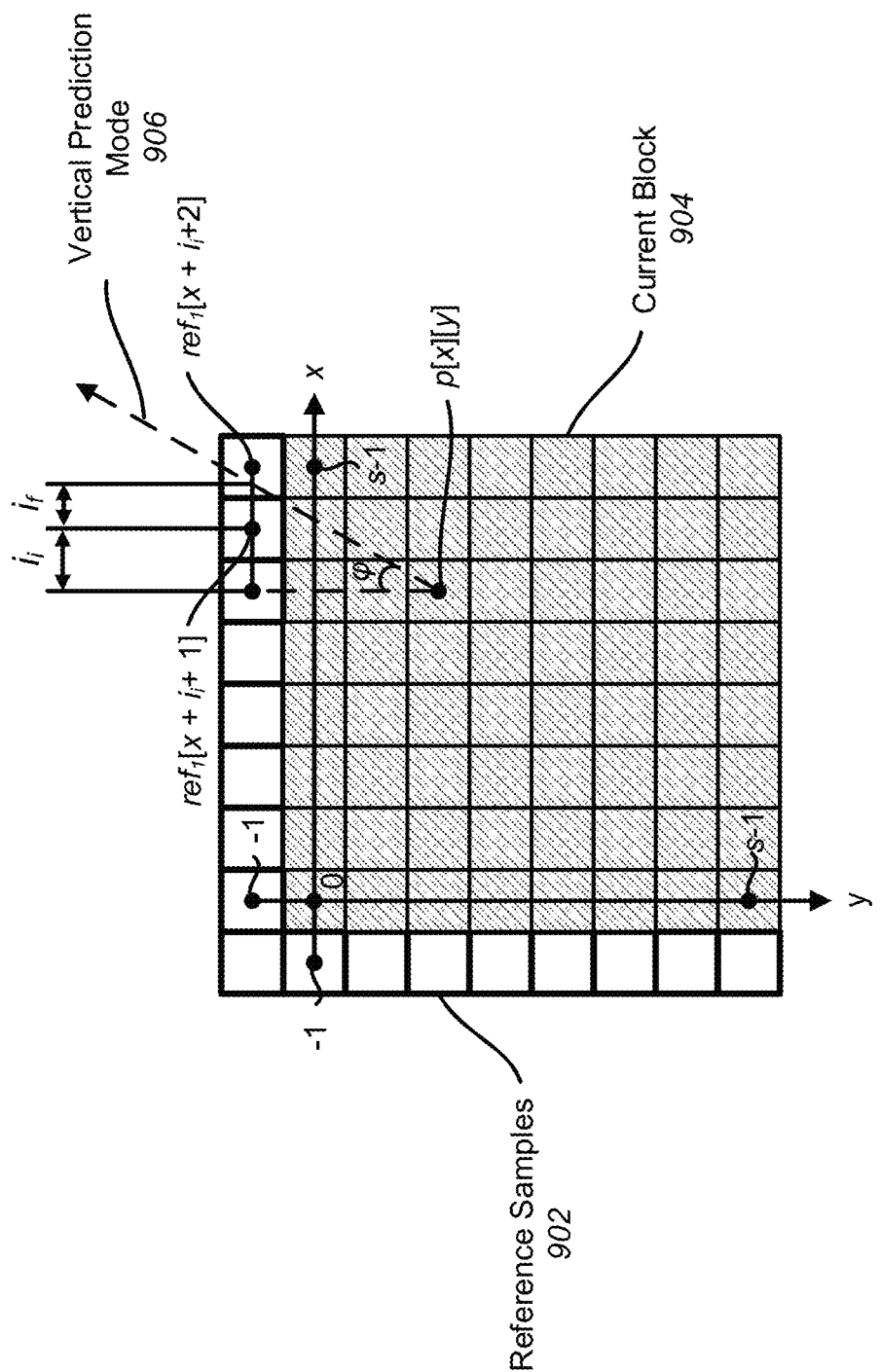
FIG. 12 shows an example application of an intra prediction mode for prediction of a current block.

FIG. 12 shows an example application of an intra prediction mode for prediction of a current block. FIG. 12 specifically shows prediction of a sample at a location [x][y] in the current block 904 for a vertical prediction mode 906. The vertical prediction mode 906 may be given by an angle φ with respect to the vertical axis. The location [x][y] in the current block 904, in vertical prediction modes, may be projected to a point (e.g., a projection point) on the horizontal line of reference samples $ref_1[x]$. The reference samples 902 are only partially shown in FIG. 12 for ease of illustration. As shown in FIG. 12, the projection point on the horizontal line of reference samples $ref_1[x]$ may not be exactly on a reference sample. A predicted sample p[x][y] in the current block 904 may be determined/calculated by linearly interpolating between the two reference samples, for example, if the projection point falls at a fractional sample position between two reference samples. The predicted sample p[x][y] may be determined/calculated as:

$$p[x][y]=(1-i_f)\cdot ref_1[x+i_i+1]+i_f\cdot ref_1[x+i_i+2]. \quad (7)$$

$i_i$ may be the integer part of the horizontal displacement of the projection point relative to the location [x][y]. $i_i$ may be determined/calculated as a function of the tangent of the angle φ of the vertical prediction mode 906 as:

$$i_i=\lfloor (y+1)\cdot \tan\varphi\rfloor. \quad (8)$$

$i_f$ may be the fractional part of the horizontal displacement of the projection point relative to the location [x][y] and may be determined/calculated as:

$$i_f=((y+1)\cdot \tan\varphi)-\lfloor (y+1)\cdot \tan\varphi\rfloor, \quad (9)$$

where $\lfloor \cdot \rfloor$ is the integer floor function.

A location [x][y] of a sample in the current block 904 may be projected onto the vertical line of reference samples $ref_2[y]$, such as for horizontal prediction modes. A predicted sample p[x][y] for horizontal prediction modes may be determined/calculated as:

$$p[x][y]=(1-i_f)\cdot ref_2[y+i_i+1]+i_f\cdot ref_2[y+i_i+2]. \quad (10)$$

$i_i$ may be the integer part of the vertical displacement of the projection point relative to the location [x][y]. $i_i$ may be determined/calculated as a function of the tangent of the angle φ of the horizontal prediction mode as:

$$i_i=\lfloor (x+1)\cdot \tan\varphi\rfloor. \quad (11)$$

$i_f$ may be the fractional part of the vertical displacement of the projection point relative to the location [x][y]. $i_f$ may be determined/calculated as:

$$i_f=((x+1)\cdot \tan\varphi)-\lfloor (x+1)\cdot \tan\varphi\rfloor, \quad (12)$$

where $\lfloor \cdot \rfloor$ is the integer floor function.

The interpolation functions given by Equations (7) and (10) may be implemented by an encoder and/or a decoder (e.g., the encoder 200 in FIG. 2 and/or the decoder 300 in FIG. 3). The interpolation functions may be implemented by finite impulse response (FIR) filters. For example, the interpolation functions may be implemented as a set of two-tap FIR filters. The coefficients of the two-tap FIR filters may be respectively given by $(1-i_f)$ and $i_f$. The predicted sample p[x][y], in angular intra prediction, may be calculated with some predefined level of sample accuracy (e.g., 1/32 sample accuracy, or accuracy defined by any other metric). For 1/32 sample accuracy, the set of two-tap FIR interpolation filters may comprise up to 32 different two-tap FIR interpolation filters—one for each of the 32 possible values of the fractional part of the projected displacement $i_f$. In other examples, different levels of sample accuracy may be used.

The FIR filters may be used for predicting chroma samples and/or luma samples. For example, the two-tap interpolation FIR filter may be used for predicting chroma samples and a same and/or a different interpolation technique/filter may be used for luma samples. For example, a four-tap FIR filter may be used to determine a predicted value of a luma sample. Coefficients of the four tap FIR filter may be determined based on $i_f$ (e.g., similar to the two-tap FIR filter). For 1/32 sample accuracy, a set of 32 different four-tap FIR filters may comprise up to 32 different four-tap FIR filters—one for each of the 32 possible values of the fractional part of the projected displacement $i_f$. In other examples, different levels of sample accuracy may be used. The set of four-tap FIR filters may be stored in a look-up table (LUT) and referenced based on $i_f$. A predicted sample p[x][y], for vertical prediction modes, may be determined based on the four-tap FIR filter as:

$$p[x][y] = \sum_{i=0}^{3} fT[i]\cdot ref_1[x+iIdx+i], \quad (13)$$

where fT[i], i=0 . . . 3, may be the filter coefficients, and Idx is integer displacement. A predicted sample p[x][y], for horizontal prediction modes, may be determined based on the four-tap FIR filter as:

$$p[x][y] = \sum_{i=0}^{3} fT[i]\cdot ref_2[y+iIdx+i]. \quad (14)$$

Supplementary reference samples may be determined/constructed if the location [x][y] of a sample in the current block 904 to be predicted is projected to a negative x coordinate. The location [x][y] of a sample may be projected to a negative x coordinate, for example, if negative vertical prediction angles φ are used. The supplementary reference samples may be determined/constructed by projecting the reference samples in $ref_2[y]$ in the vertical line of reference samples 902 to the horizontal line of reference samples 902 using the negative vertical prediction angle φ. Supplementary reference samples may be similarly determined/constructed, for example, if the location [x][y] of a sample in the current block 904 to be predicted is projected to a negative y coordinate. The location [x][y] of a sample may be projected to a negative y coordinate, for example, if negative horizontal prediction angles φ are used. The supplementary reference samples may be determined/constructed by projecting the reference samples in $ref_1[x]$ on the horizontal line of reference samples 902 to the vertical line of reference samples 902 using the negative horizontal prediction angle φ.

An encoder may determine/predict samples of a current block being encoded (e.g., the current block 904) for a plurality of intra prediction modes (e.g., using one or more of the functions described herein). For example, an encoder may determine/predict samples of a current block for each of 35 intra prediction modes in HEVC and/or 67 intra prediction modes in VVC. The encoder may determine, for each intra prediction mode applied, a corresponding prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may determine/select one of the intra prediction modes to encode the current block based on the determined prediction errors. For example, the encoder may determine/select one of the intra prediction modes that results in the smallest prediction error for the current block.

The encoder may determine/select the intra prediction mode to encode the current block based on a rate-distortion measure (e.g., Lagrangian rate-distortion cost) determined using the prediction errors. The encoder may send an indication of the determined/selected intra prediction mode and its corresponding prediction error (e.g., residual) to a decoder for decoding of the current block.

A decoder may determine/predict samples of a current block being decoded (e.g., the current block 904) for an intra prediction mode. For example, a decoder may receive an indication of an intra prediction mode (e.g., an angular intra prediction mode) from an encoder for a current block. The decoder may construct a set of reference samples and perform intra prediction based on the intra prediction mode indicated by the encoder for the current block in a similar manner (e.g., as described above for the encoder). The decoder may add predicted values of the samples (e.g., determined based on the intra prediction mode) of the current block to a residual of the current block to reconstruct the current block. A decoder need not receive an indication of an angular intra prediction mode from an encoder for a current block. A decoder may determine an intra prediction mode, for example, based on other criteria. While various examples herein correspond to intra prediction modes in HEVC and VVC, the methods, devices, and systems as described herein may be applied to/used for other intra prediction modes (e.g., as used in other video coding standards/formats, such as VP8, VP9, AV1, etc.).

Intra prediction may exploit correlations between spatially neighboring samples in the same picture of a video sequence to perform video compression. Inter prediction is another coding tool that may be used to perform video compression. Inter prediction may exploit correlations in the time domain between blocks of samples in different pictures of a video sequence. For example, an object may be seen across multiple pictures of a video sequence. The object may move (e.g., by some translation and/or affine motion) or remain stationary across the multiple pictures. A current block of samples in a current picture being encoded may have/be associated with a corresponding block of samples in a previously decoded picture. The corresponding block of samples may accurately predict the current block of samples. The corresponding block of samples may be displaced from the current block of samples, for example, due to movement of the object, represented in both blocks, across the respective pictures of the blocks. The previously decoded picture may be a reference picture. The corresponding block of samples in the reference picture may be a reference block for motion compensated prediction. An encoder may use a block matching technique to estimate the displacement (or motion) of the object and/or to determine the reference block in the reference picture.

An encoder may determine a difference between a current block and a prediction for a current block. An encoder may determine a difference, for example, based on/after determining/generating a prediction for a current block (e.g., using inter prediction). The difference may be a prediction error and/or as a residual. The encoder may store and/or send (e.g., signal), in/via a bitstream, the prediction error and/or other related prediction information. The prediction error and/or other related prediction information may be used for decoding and/or other forms of consumption. A decoder may decode the current block by predicting the samples of the current block (e.g., by using the related prediction information) and combining the predicted samples with the prediction error.

Figure 13A:
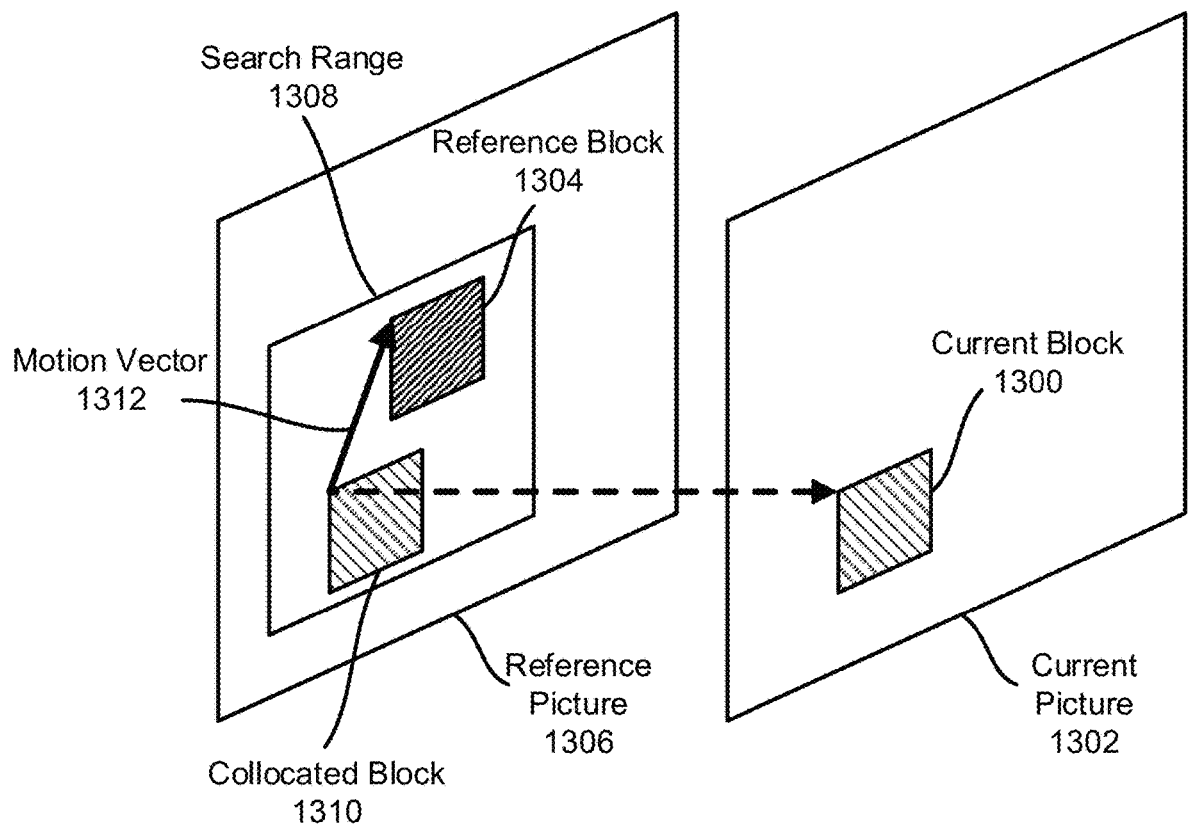
FIG. 13A shows an example of inter prediction.

FIG. 13A shows an example of inter prediction. The inter prediction may be performed for a current block 1300 in a current picture 1302 being encoded. An encoder (e.g., the encoder 200 as shown in FIG. 2) may perform inter prediction to determine and/or generate a reference block 1304 in a reference picture 1306. The reference block 1304 may be used to predict the current block 1300. Reference pictures (e.g., the reference picture 1306) may be prior decoded pictures available at the encoder and/or a decoder. Availability of a prior decoded picture may depend/be based on whether the prior decoded picture is available in a decoded picture buffer, at the time, the current block 1300 is being encoded and/or decoded. The encoder may search the one or more reference pictures 1306 for a block that is similar (or substantially similar) to the current block 1300. The encoder may determine the best matching block from the blocks tested during the searching process. The best matching block may be a reference block 1304. The encoder may determine that the reference block 1304 is the best matching reference block based on one or more cost criteria. The one or more cost criteria may comprise a rate-distortion criterion (e.g., Lagrangian rate-distortion cost). The one or more cost criteria may be based on a difference (e.g., SSD, SAD, and/or SATD) between prediction samples of the reference block 1304 and original samples of the current block 1300.

The encoder may search for the reference block 1304 within a reference region (e.g., a search range 1308). The reference region (e.g., a search range 1308) may be positioned around a collocated position (or block) 1310, of the current block 1300, in the reference picture 1306. The collocated block 1310 may have a same position in the reference picture 1306 as the current block 1300 in the current picture 1302. The reference region (e.g., a search range 1308) may at least partially extend outside of the reference picture 1306. Constant boundary extension may be used, for example, if the reference region (e.g., a search range 1308) extends outside of the reference picture 1306. The constant boundary extension may be used such that values of the samples in a row or a column of reference picture 1306, immediately adjacent to a portion of the reference region (e.g., a search range 1308) extending outside of the reference picture 1306, may be used for sample locations outside of the reference picture 1306. A subset of potential positions, or all potential positions, within the reference region (e.g., a search range 1308) may be searched for the reference block 1304. The encoder may utilize one or more search implementations to determine and/or generate the reference block 1304. For example, the encoder may determine a set of candidate search positions based on motion information of neighboring blocks (e.g., a motion vector 1312) to the current block 1300.

One or more reference pictures may be searched by the encoder during inter prediction to determine and/or generate the best matching reference block. The reference pictures searched by the encoder may be included in (e.g., added to) one or more reference picture lists. For example, in HEVC and VVC (and/or in one or more other communication protocols), two reference picture lists may be used (e.g., a reference picture list 0 and a reference picture list 1). A reference picture list may include one or more pictures. The reference picture 1306 of the reference block 1304 may be indicated by a reference index pointing into a reference picture list comprising the reference picture 1306.

Figure 13B:
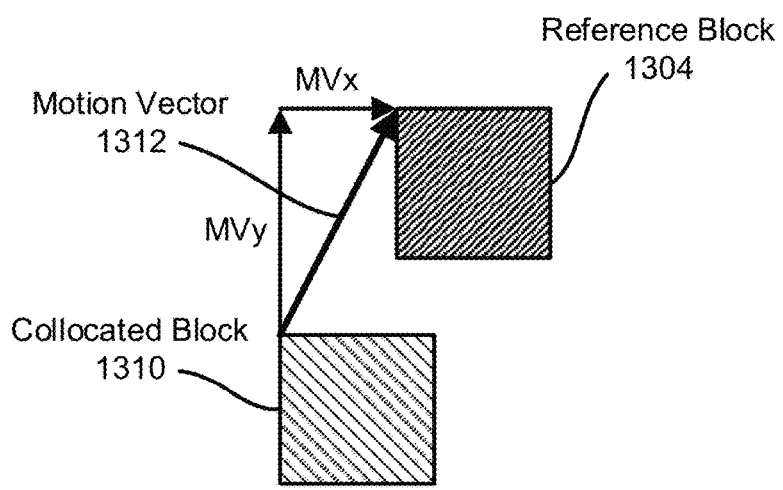
FIG. 13B shows an example motion vector.

FIG. 13B shows an example motion vector. A displacement between the reference block 1304 and the current block 1300 may be interpreted as an estimate of the motion between the reference block 1304 and the current block 1300 across their respective pictures. The displacement may be represented by a motion vector 1312. For example, the motion vector 1312 may be indicated by a horizontal component ($MV_x$) and a vertical component ($MV_y$) relative to the position of the current block 1300. A motion vector (e.g., the motion vector 1312) may have fractional or integer resolution. A motion vector with fractional resolution may point between two samples in a reference picture to provide a better estimation of the motion of the current block 1300. For example, a motion vector may have ½, ¼, ⅛, 1/16, 1/32, or any other fractional sample resolution. Interpolation between the two samples at integer positions may be used to generate a reference block and its corresponding samples at fractional positions, for example, if a motion vector points to a non-integer sample value in the reference picture. The interpolation may be performed by a filter with two or more taps.

The encoder may determine a difference (e.g., a corresponding sample-by-sample difference) between the reference block 1304 and the current block 1300. The encoder may determine the difference between the reference block 1304 and the current block 1300, for example, based on/after the reference block 1304 is determined and/or generated, using inter prediction, for the current block 1300. The difference may be a prediction error and/or a residual. The encoder may store and/or send (e.g., signal), in/via a bitstream, the prediction error and/or related motion information. The prediction error and/or the related motion information may be used for decoding (e.g., decoding the current block 1300) and/or other forms of consumption. The motion information may comprise the motion vector 1312 and/or a reference indicator/index. The reference indicator may indicate the reference picture 1306 in a reference picture list. The motion information may comprise an indication of the motion vector 1312 and/or an indication of the reference index. The reference index may indicate reference picture 1306 in the reference picture list. A decoder may decode the current block 1300 by determining and/or generating the reference block 1304. The decoder may determine and/or generate the reference block 1304, for example, based on the prediction error and/or the related motion information. The reference block 1304 may correspond to/form (e.g., be considered as) a prediction of the current block 1300. The decoder may decode the current block 1300 based on combining the prediction with the prediction error.

Inter prediction, as shown in FIG. 13A, may be performed using one reference picture 1306 as a source of a prediction for the current block 1300. Inter prediction based on a prediction of a current block using a single picture may be referred to as uni-prediction.

Inter prediction of a current block, using bi-prediction, may be based on two pictures. Bi-prediction may be useful, for example, if a video sequence comprises fast motion, camera panning, zooming, and/or scene changes. Bi-prediction may be useful to capture fade outs of one scene or fade outs from one scene to another, where two pictures may effectively be displayed simultaneously with different levels of intensity.

One or both of uni-prediction and bi-prediction may be available/used for performing inter prediction (e.g., at an encoder and/or at a decoder). Performing a specific type of inter prediction (e.g., uni-prediction and/or bi-prediction) may depend on a slice type of current block. For example, for P slices, only uni-prediction may be available/used for performing inter prediction. For B slices, either uni-prediction or bi-prediction may be available/used for performing inter prediction. An encoder may determine and/or generate a reference block, for predicting a current block, from a reference picture list 0, for example, if the encoder is using uni-prediction. An encoder may determine and/or generate a first reference block, for predicting a current block, from a reference picture list 0 and determine and/or generate a second reference block, for predicting the current block, from a reference picture list 1, for example, if the encoder is using bi-prediction.

Figure 14:
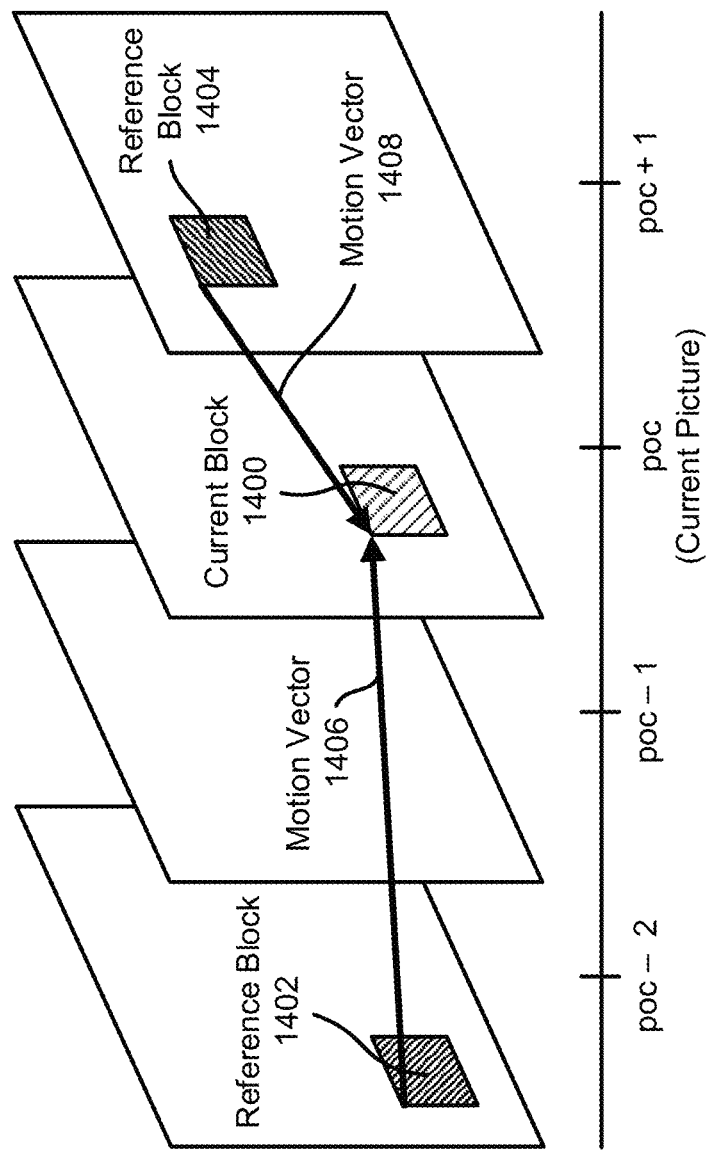
FIG. 14 shows an example of bi-prediction.

FIG. 14 shows an example of bi-prediction. Two reference blocks 1402 and 1404 may be used to predict a current block 1400. The reference block 1402 may be in a reference picture of one of reference picture list 0 or reference picture list 1. The reference block 1404 may be in a reference picture of another one of reference picture list 0 or reference picture list 1. As shown in FIG. 14, the reference block 1402 may be in a first picture that precedes (e.g., in time) a current picture of the current block 1400, and the reference block 1404 may be in a second picture that succeeds (e.g., in time) the current picture of the current block 1400. The first picture may precede the current picture in terms of a picture order count (POC). The second picture may succeed the current picture in terms of the POC. The reference pictures may both precede or both succeed the current picture in terms of POC. A POC may be/indicate an order in which pictures are output (e.g., from a decoded picture buffer). A POC may be/indicate an order in which pictures are generally intended to be displayed. Pictures that are output may not necessarily be displayed but may undergo different processing and/or consumption (e.g., transcoding). The two reference blocks determined and/or generated using/for bi-prediction may correspond to (e.g., be comprised in) a same reference picture. The reference picture may be included in both the reference picture list 0 and the reference picture list 1, for example, if the two reference blocks correspond to the same reference picture.

A configurable weight and/or offset value may be applied to one or more inter prediction reference blocks. An encoder may enable the use of weighted prediction using a flag in a picture parameter set (PPS). The encoder may send/signal the weight and/or offset parameters in a slice segment header for the current block 1400. Different weight and/or offset parameters may be sent/signaled for luma and/or chroma components.

The encoder may determine and/or generate the reference blocks 1402 and 1404 for the current block 1400 using inter prediction. The encoder may determine a difference between the current block 1400 and each of the reference blocks 1402 and 1404. The differences may be prediction errors or residuals. The encoder may store and/or send/signal, in/via a bitstream, the prediction errors and/or their respective related motion information. The prediction errors and their respective related motion information may be used for decoding and/or other forms of consumption. The motion information for the reference block 1402 may comprise a motion vector 1406 and/or a reference indicator/index. The reference indicator may indicate a reference picture, of the reference block 1402, in a reference picture list. The motion information for the reference block 1402 may comprise an indication of the motion vector 1406 and/or an indication of the reference index. The reference index may indicate the reference picture, of the reference block 1402, in the reference picture list.

The motion information for the reference block 1404 may comprise a motion vector 1408 and/or a reference index/indicator. The reference indicator may indicate a reference picture, of the reference block 1408, in a reference picture list. The motion information for the reference block 1404 may comprise an indication of motion vector 1408 and/or an indication of the reference index. The reference index may indicate the reference picture, of the reference block 1404, in the reference picture list.

A decoder may decode the current block 1400 by determining and/or generating the reference blocks 1402 and 1404. The decoder may determine and/or generate the reference blocks 1402 and 1404, for example, based on the prediction errors and/or the respective related motion information for the reference blocks 1402 and 1404. The reference blocks 1402 and 1404 may correspond to/form (e.g., be considered as) the predictions of the current block 1400. The decoder may decode the current block 1400 based on combining the predictions with the prediction errors.

Motion information may be predictively coded, for example, before being stored and/or sent/signaled in/via a bit stream (e.g., in HEVC, VVC, and/or other video coding standards/formats/protocols). The motion information for a current block may be predictively coded based on motion information of one or more blocks neighboring the current block. The motion information of the neighboring block(s) may often correlate with the motion information of the current block because the motion of an object represented in the current block is often the same as (or similar to) the motion of objects in the neighboring block(s). Motion information prediction techniques may comprise advanced motion vector prediction (AMVP) and/or inter prediction block merging.

An encoder (e.g., the encoder 200 as shown in FIG. 2), may code a motion vector. The encoder may code the motion vector (e.g., using AMVP) as a difference between a motion vector of a current block being coded and a motion vector predictor (MVP). An encoder may determine/select the MVP from a list of candidate MVPs. The candidate MVPs may be/correspond to previously decoded motion vectors of neighboring blocks in the current picture of the current block, and/or blocks at or near the collocated position of the current block in other reference pictures. The encoder and/or a decoder may generate and/or determine the list of candidate MVPs.

The encoder may determine/select an MVP from the list of candidate MVPs. The encoder may send/signal, in/via a bitstream, an indication of the selected MVP and/or a motion vector difference (MVD). The encoder may indicate the selected MVP in the bitstream using an index/indicator. The index may indicate the selected MVP in the list of candidate MVPs. The MVD may be determined/calculated based on a difference between the motion vector of the current block and the selected MVP. For example, for a motion vector that indicates a position (e.g., represented by a horizontal component ($MV_x$) and a vertical component ($MV_y$)) relative to a position of the current block being coded, the MVD may be represented by two components $MVD_x$ and $MVD_y$. $MVD_x$ and $MVD_y$ may be determined/calculated as:

$$MVD_x = MV_x - MVP_x, \quad (15)$$

$$MVD_y = MV_y - MVP_y. \quad (16)$$

$MVD_x$ and $MVD_y$ may respectively represent horizontal and vertical components of the MVD. $MVP_x$ and $MVP_y$ may respectively represent horizontal and vertical components of the MVP. A decoder (e.g., the decoder 300 as shown in FIG. 3) may decode the motion vector by adding the MVD to the MVP indicated in/via the bitstream. The decoder may decode the current block by determining and/or generating the reference block. The decoder may determine and/or generate the reference block, for example, based on the decoded motion vector. The reference block may correspond to/form (e.g., be considered as) the prediction of the current block. The decoder may decode the current block by combining the prediction with the prediction error.

The list of candidate MVPs (e.g., in HEVC, VVC, and/or one or more other communication protocols), for AMVP, may comprise two or more candidates (e.g., candidates A and B). Candidates A and B may comprise: up to two (or any other quantity of) spatial candidate MVPs determined/derived from five (or any other quantity of) spatial neighboring blocks of a current block being coded; one (or any other quantity of) temporal candidate MVP determined/derived from two (or any other quantity of) temporal, co-located blocks (e.g., if both of the two spatial candidate MVPs are not available or are identical); and/or zero motion vector candidate MVPs (e.g., if one or both of the spatial candidate MVPs or temporal candidate MVPs are not available). Other quantities of spatial candidate MVPs, spatial neighboring blocks, temporal candidate MVPs, and/or temporal, co-located blocks may be used for the list of candidate MVPs.

Figure 15A:
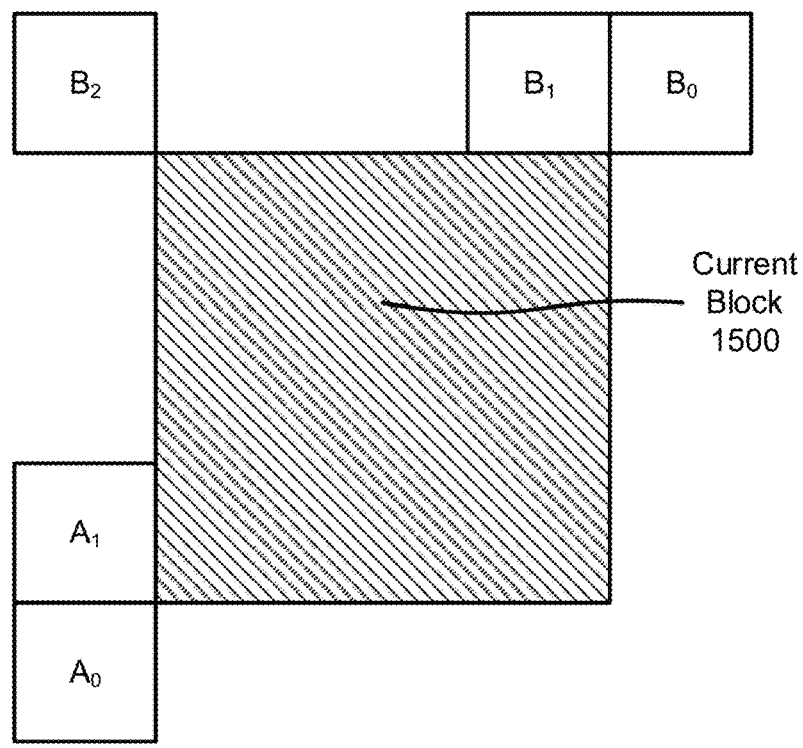
FIG. 15A shows example spatial candidate neighboring blocks for a current block.
Figure 15B:
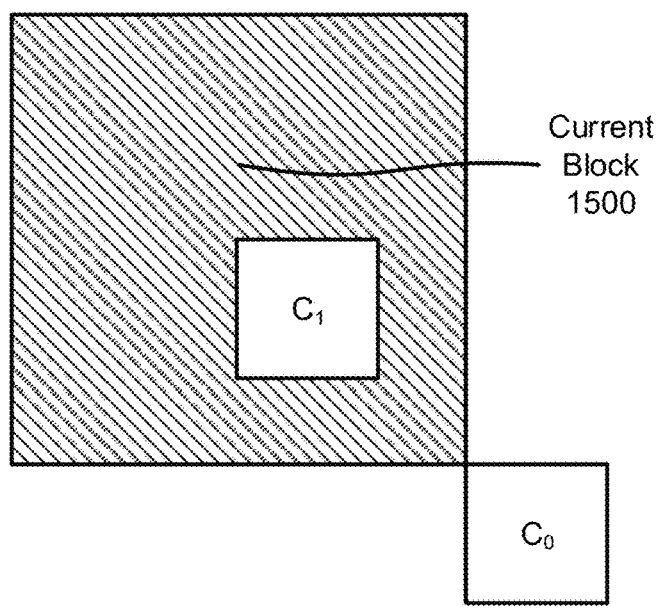
FIG. 15B shows example temporal, co-located blocks for a current block.

FIG. 15A shows spatial candidate neighboring blocks for a current block. For example, five (or any other quantity of) spatial candidate neighboring blocks may be located relative to a current block 1500 being encoded. The five spatial candidate neighboring blocks may be $A_0, A_1, B_0, B_1$, and $B_2$. FIG. 15B shows temporal, co-located blocks for the current block. For example, two (or any other quantity of) temporal, co-located blocks may be located relative to the current block 1500. The two temporal, co-located blocks may be $C_0$ and $C_1$. The two temporal, co-located blocks may be in one or more reference pictures that may be different from the current picture of the current block 1500.

An encoder (e.g., the encoder 200 as shown in FIG. 2) may code a motion vector using inter prediction block merging (e.g., a merge mode). The encoder (e.g., using merge mode) may reuse the same motion information of a neighboring block (e.g., one of neighboring blocks $A_0, A_1, B_0, B_1$, and $B_2$) for inter prediction of a current block. The encoder (e.g., using merge mode) may reuse the same motion information of a temporal, co-located block (e.g., one of temporal, co-located blocks $C_0$ and $C_1$) for inter prediction of a current block. An MVD need not be sent (e.g., indicated, signaled) for the current block because the same motion information as that of a neighboring block or a temporal, co-located block may be used for the current block (e.g., at the encoder and/or a decoder). A signaling overhead for sending/signaling the motion information of the current block may be reduced because the MVD need not be indicated for the current block. The encoder and/or the decoder may generate a candidate list of motion information from neighboring blocks or temporal, co-located blocks of the current block (e.g., in a manner similar to AMVP). The encoder may determine to use (e.g., inherit) motion information, of one neighboring block or one temporal, co-located block in the candidate list, for predicting motion information of the current block being coded. The encoder may signal/send, in/via a bit stream, an indication of the determined motion information from the candidate list. For example, the encoder may signal/send an indicator/index. The index may indicate the determined motion information in the list of candidate motion information. The encoder may signal/send the index to indicate the determined motion information.

A list of candidate motion information for merge mode (e.g., in HEVC, VVC, or any other coding formats/standards/protocols) may comprise: up to four (or any other quantity of) spatial merge candidates derived/determined from five (or any other quantity of) spatial neighboring blocks (e.g., as shown in FIG. 15A); one (or any other quantity of) temporal merge candidate derived from two (or any other quantity of) temporal, co-located blocks (e.g., as shown in FIG. 15B); and/or additional merge candidates comprising bi-predictive candidates and zero motion vector candidates. The spatial neighboring blocks and the temporal, co-located blocks used for merge mode may be the same as the spatial neighboring blocks and the temporal, co-located blocks used for AMVP.

Inter prediction may be performed in other ways and variants than those described herein. For example, motion information prediction techniques other than AMVP and merge mode may be used. While various examples herein correspond to inter prediction modes, such as used in HEVC and VVC, the methods, devices, and systems as described herein may be applied to/used for other inter prediction modes (e.g., as used for other video coding standards/formats such as VP8, VP9, AV1, etc.). History based motion vector prediction (HMVP), combined intra/inter prediction mode (CIIP), and/or merge mode with motion vector difference (MMVD) (e.g., as described in VVC) may be performed/used and are within the scope of the present disclosure.

Block matching may be used (e.g., in inter prediction) to determine a reference block in a different picture than that of a current block being encoded. Block matching may be used to determine a reference block in a same picture as that of a current block being encoded. The reference block, in a same picture as that of the current block, as determined using block matching may often not accurately predict the current block (e.g., for camera captured videos). Prediction accuracy for screen content videos may not be similarly impacted, for example, if a reference block in the same picture as that of the current block is used for encoding. Screen content videos may comprise, for example, computer generated text, graphics, animation, etc. Screen content videos may comprise (e.g., may often comprise) repeated patterns (e.g., repeated patterns of text and/or graphics) within the same picture. Using a reference block (e.g., as determined using block matching), in a same picture as that of a current block being encoded, may provide efficient compression for screen content videos.

A prediction technique may be used (e.g., in HEVC, VVC, and/or any other coding standards/formats/protocols) to exploit correlation between blocks of samples within a same picture (e.g., of screen content videos). The prediction technique may be intra block copy (IBC) or current picture referencing (CPR). An encoder may apply/use a block matching technique (e.g., similar to inter prediction) to determine a displacement vector (e.g., a block vector (BV)). The BV may indicate a relative position of a reference block (e.g., in accordance with intra block compensated prediction), that best matches the current block, from a position of the current block. For example, the relative position of the reference block may be a relative position of a top-left corner (or any other point/sample) of the reference block. The BV may indicate a relative displacement from the current block to the reference block that best matches the current block. The encoder may determine the best matching reference block from blocks tested during a searching process (e.g., in a manner similar to that used for inter prediction). The encoder may determine that a reference block is the best matching reference block based on one or more cost criteria. The one or more cost criteria may comprise a rate-distortion criterion (e.g., Lagrangian rate-distortion cost). The one or more cost criteria may be based on, for example, one or more differences (e.g., an SSD, an SAD, an SATD, and/or a difference determined based on a hash function) between the prediction samples of the reference block and the original samples of the current block. A reference block may correspond to/comprise prior decoded blocks of samples of the current picture. The reference block may comprise decoded blocks of samples of the current picture prior to being processed by in-loop filtering operations (e.g., deblocking and/or SAO filtering).

FIG. 16 shows an example of IBC for encoding. The example IBC shown in FIG. 16 may correspond to screen content. The rectangular portions/sections with arrows beginning at their boundaries may be the current blocks being encoded. The rectangular portions/sections that the arrows point to may be the reference blocks for predicting the current blocks.

A reference block may be determined and/or generated, for a current block, for IBC. The encoder may determine a difference (e.g., a corresponding sample-by-sample difference) between the reference block and the current block. The difference may be a prediction error or residual. The encoder may store and/or send/signal, in/via a bitstream the prediction error and/or related prediction information. The prediction error and/or the related prediction information may be used for decoding and/or other forms of consumption. The prediction information may comprise a BV. The prediction information may comprise an indication of the BV. A decoder (e.g., the decoder 300 as shown in FIG. 3), may decode the current block by determining and/or generating the reference block. The decoder may determine and/or generate the current block, for example, based on the prediction information (e.g., the BV). The reference block may correspond to/form (e.g., be considered as) the prediction of the current block. The decoder may decode the current block by combining the prediction with the prediction error.

A BV may be predictively coded (e.g., in HEVC, VVC, and/or any other coding standards/formats/protocols) before being stored and/or sent/signaled in/via a bit stream. The BV for a current block may be predictively coded based on a BV of one or more blocks neighboring the current block. For example, an encoder may predictively code a BV using the merge mode (e.g., in a manner similar to as described herein for inter prediction), AMVP (e.g., as described herein for inter prediction), or a technique similar to AMVP. The technique similar to AMVP may be BV prediction and difference coding (or AMVP for IBC).

An encoder (e.g., the encoder 200 as shown in FIG. 2) performing BV prediction and coding may code a BV as a difference between the BV of a current block being coded and a block vector predictor (BVP). An encoder may select/determine the BVP from a list of candidate BVPs. The candidate BVPs may comprise/correspond to previously decoded BVs of neighboring blocks in the current picture of the current block. The encoder and/or a decoder may generate or determine the list of candidate BVPs.

The encoder may send/signal, in/via a bitstream, an indication of the selected BVP and a block vector difference (BVD). The encoder may indicate the selected BVP in the bitstream using an index/indicator. The index may indicate the selected BVP in the list of candidate BVPs. The BVD may be determined/calculated based on a difference between a BV of the current block and the selected BVP. For example, for a BV that indicates a position (e.g., represented by a horizontal component ($BV_x$) and a vertical component ($BV_y$)) relative to a position of the current block being coded, the BVD may represented by two components $BVD_x$ and $BVD_y$. $BVD_x$ and $BVD_y$ may be determined/calculated as:

$$BVD_x = BV_x - BVP_x, \quad (17)$$

$$BVD_y = BV_y - BVP_y. \quad (18)$$

$BVD_x$ and $BVD_y$ may respectively represent horizontal and vertical components of the BVD. $BVP_x$ and $BVP_y$ may respectively represent horizontal and vertical components of the BVP. A decoder (e.g., the decoder 300 as shown in FIG. 3), may decode the BV by adding the BVD to the BVP indicated in/via the bitstream. The decoder may decode the current block by determining and/or generating the reference block. The decoder may determine and/or generate the reference block, for example, based on the decoded BV. The reference block may correspond to/form (e.g., be considered as) the prediction of the current block. The decoder may decode the current block by combining the prediction with the prediction error.

A same BV as that of a neighboring block may be used for the current block and a BVD need not be separately signaled/sent for the current block, such as in the merge mode. A BVP (in the candidate BVPs), which may correspond to a decoded BV of the neighboring block, may itself be used as a BV for the current block. Not sending the BVD may reduce the signaling overhead.

A list of candidate BVPs (e.g., in HEVC, VVC, and/or any other coding standard/format/protocol) may comprise two (or more) candidates. The candidates may comprise candidates A and B. Candidates A and B may comprise: up to two (or any other quantity of) spatial candidate BVPs determined/derived from five (or any other quantity of) spatial neighboring blocks of a current block being encoded; and/or one or more of last two (or any other quantity of) coded BVs (e.g., if spatial neighboring candidates are not available). Spatial neighboring candidates may not be available, for example, if neighboring blocks are encoded using intra prediction or inter prediction. Locations of the spatial candidate neighboring blocks, relative to a current block, being encoded using IBC may be illustrated in a manner similar to spatial candidate neighboring blocks used for coding motion vectors in inter prediction (e.g., as shown in FIG. 15A). For example, five spatial candidate neighboring blocks for IBC may be respectively denoted $A_0$, $A_1$, $B_0$, $B_1$, and $B_2$.

An encoder (e.g., the encoder 200 as shown in FIG. 2) and/or a decoder (e.g., the decoder 300 as shown in FIG. 3) may use intra prediction to generate a prediction of a current block being encoded. Intra prediction may generate a prediction signal based on already reconstructed samples of the same frame of the current block. The prediction signal may be generated by intra prediction methods (e.g., an angular intra prediction mode, a DC prediction mode, and/or a planar mode).

Intra prediction modes may be designed using data-driven methods (e.g., matrix-based intra prediction (MIP) modes). Intra prediction modes designed using data driven methods may be integrated into any coding standard, format, and/or protocol (e.g., in HEVC, VVC, and/or other video coding standards/formats/protocols). The MIP modes may be considered for inclusion into an enhanced compression model (ECM) software algorithm. The ECM may be currently under coordinated exploration study by the Joint Video Exploration Team (JVET) of ITU-T Video Coding Experts Group (VCEG) and/or ISO/IEC MPEG as a potential enhanced video coding technology beyond the capabilities of VVC.

Figure 17:
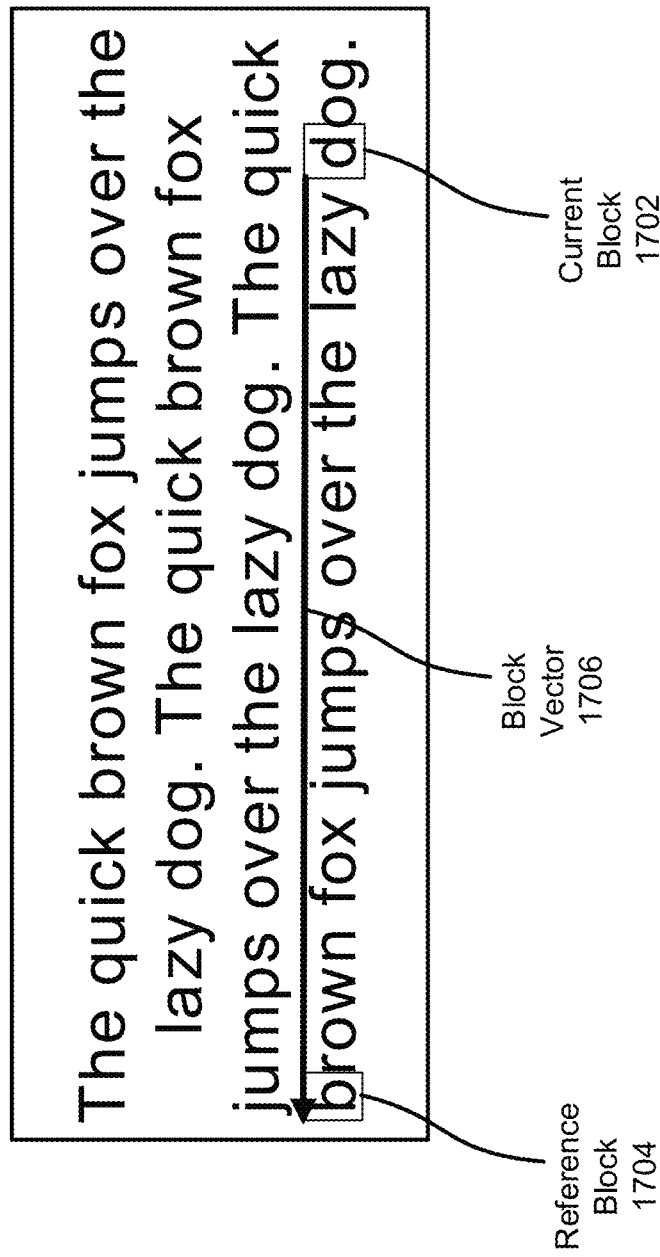
FIG. 17 shows an example of RRIBC used for screen content.

FIG. 17 shows an example of RRIBC used for screen content. FIG. 17 shows an example of RRIBC mode used for screen content to utilize symmetry within text regions to increase efficiency for coding video content. The encoder may determine that a reference block 1704 is the best matching reference block for a current block 1702, similar to an encoder described herein with respect to FIG. 16 (e.g., encoder 114 of FIG. 1). The encoder may determine that a reference block 1704 is the best matching reference block for a current block 1702, for example, based on using horizontal flipping. The encoder may determine, for example, that a reference block 1704, based on using horizontal flipping, is the best matching reference block for a current block 1702. The encoder may select reference block 1704 as the "best" matching reference block. The encoder may select reference block 1704 as the "best" matching reference block, for example, based on one or more cost criteria. The cost criteria may include, for example, a rate-distortion criterion, such as described herein. The one or more cost criteria may be used with respect to reference block 1704, having been flipped in the horizontal direction relative to current block 1702. Reference block 1704 may be located in a reference region that is in horizontal alignment with current block 1702, for example, for flipping in the horizontal direction, such as described herein. A block vector 1706 may be represented as only a horizontal component (BVx) of BV 1706. The block vector 1706 may indicate a displacement between current block 1702 and reference block 1704. A block vector 1706 may be represented as only a horizontal component (BVx) of BV 1706, for example, due to constraints on possible locations of reference blocks. A block vector 1706 may be represented as only a horizontal component (BVx) of BV 1706, for example because the vertical component of BV 1706 will be equal to 0 if horizontal flipping is indicated/used.

In at least some technologies, a BV for a current block coded using IBC may be constrained to indicate a relative displacement from the current block to a reference block within an IBC reference region. A BVP used to predictively code a BV may be similarly constrained. This is because a BVP may be derived from a BV of a spatially neighboring block of the current block or a prior coded BV, such as described herein. A BVD may be determined as a difference between the BV and the BVP. A BVD may be determined as a difference between the BV and the BVP, for example, based on the BVP. This BVD may be encoded and transmitted along with an indication of the selected BVP in a bitstream to enable decoding of the current block, such as described herein. A reference block (to be flipped in a direction relative to the current block) may be constrained to (e.g., selected from) an RRIBC reference region. A reference block (to be flipped in a direction relative to the current block) may be constrained to an RRIBC reference region, for example, an RRIBC reference region corresponding to the direction that is a subset or within the IBC reference region. The BVP may not accurately predict the BV. The BVP may not accurately predict the BV because, for example, the BVP used to predictively code a BV for a current block may not be constrained to indicate a relative displacement from the current block to a reference block within the RRIBC region (e.g., such as for the BV of the reference block). Failing to accurately predict the BV may likely increase the number of bits needed to transmit a BVD between the BV and BVP.

Improvements described herein include advantages such as adjusting a BVP to provide a more accurate prediction of a BV determined using an RRIBC mode. A reference region (e.g., an RRIBC reference region) corresponding to a direction for flipping may be determined, for example, based on the RRIBC mode being indicated in a direction for flipping a reference block relative to a current block. The reference region may indicate a region within a picture frame from which the reference block may be selected (e.g., based on flipping). Additionally or alternatively, the reference region corresponding to the flipping direction may be used with respect to a BVP to determine whether the BVP should be replaced with an adjusted BVP. The BVP may be replaced with an adjusted BVP that is within the reference region. The BVP may be replaced with an adjusted BVP that is within the reference region, for example, based on the determination that the BVP is outside of the reference region (e.g., points to or indicates a position that is outside of the reference region). The adjusted BVP may be used to determine (e.g., by a decoder) or predict (e.g., by an encoder) the BV for the current block. By constraining the BVP to within the same reference region as the reference block, the BVD that is generated may also be similarly constrained to the same reference region. The BVD may be limited to a maximum value corresponding to a width or length of the reference region. The BVD may be limited to a maximum value corresponding to a width or length of the reference region, for example, depending on the flipping direction. Because the BVD may be limited due to constraining the BVP, the BVD may be encoded in less bits than if the BVP were constrained to the larger IBC reference region. Reduction of the number of bins that are required to encode a BVD may lead to the decrease of a total number of bits in a bitstream, and thus, the same quality of decoded picture may be achieved with smaller bitrate of a compressed stream. Compression performance may be increased when the number of bins that are needed to encode a BVD is reduced. Shorter codewords (e.g., that correspond to shorter BVD lengths) may be processed by arithmetic decoder faster and thus average decoding runtime may be slightly reduced.

Figure 18:
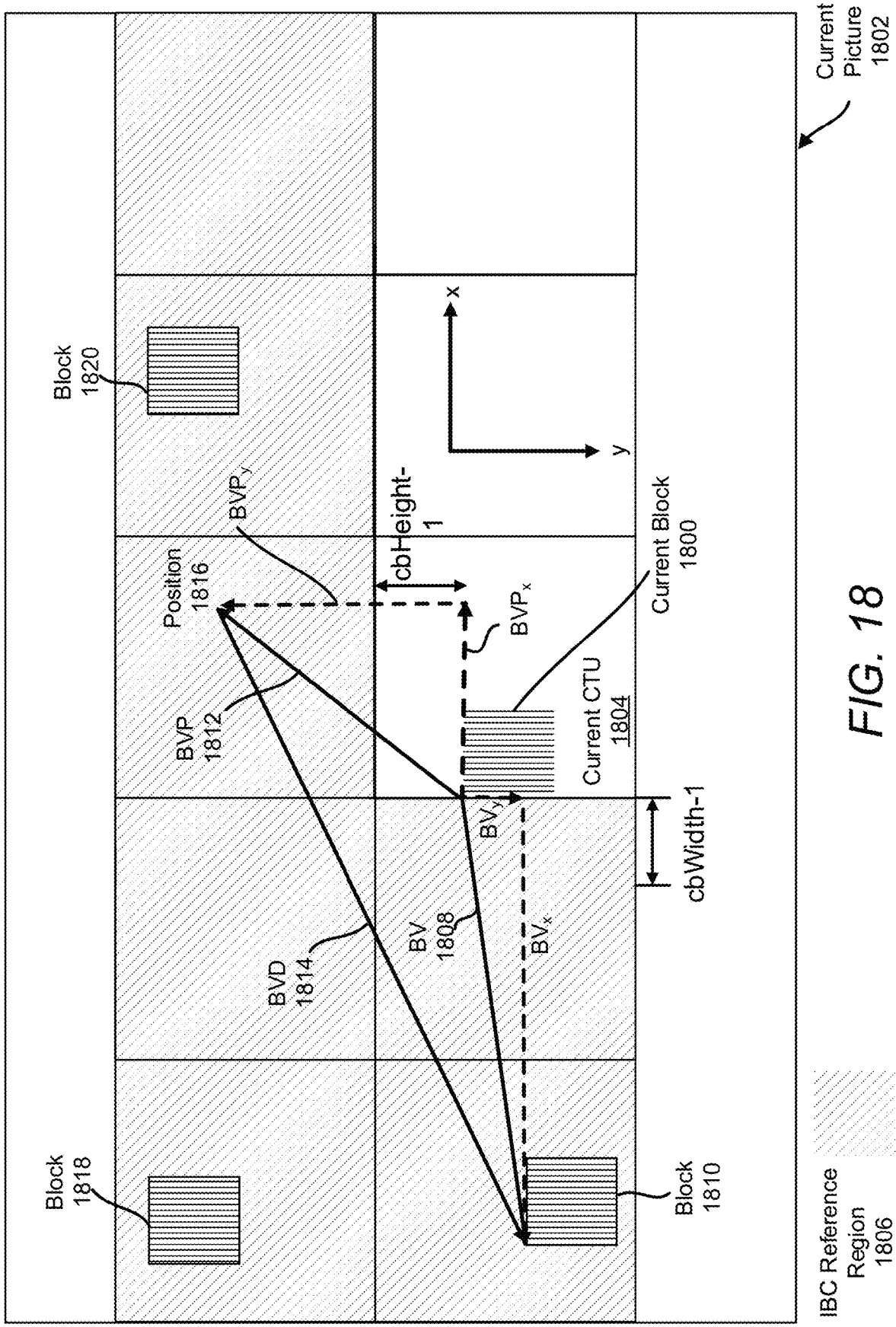
FIG. 18 shows an example IBC coding.

FIG. 18 shows an example IBC coding. An encoder, such as encoder 200 in FIG. 2, may use an IBC mode to code a current block 1800 in a current picture (or portion of a current picture) 1802. Current block 1800 may be a coding block (CB) within a coding tree unit (CTU) 1804. IBC searches for a reference block in the same, current picture as the current block. As a result, for example, only part of the current picture may be available for searching for a reference block in IBC (e.g., only the part of the current picture that has been decoded prior to the encoding of the current block). This may ensure the encoding and decoding systems can produce identical results but may limit the IBC reference region.

Blocks may be scanned from left-to-right, top-to-bottom using a z-scan to form the sequence order for encoding/decoding, for example, in HEVC, VVC, and other video compression standards. CTUs to the left and above current CTU 1804 may be encoded/decoded prior to current CTU 1804 and current block 1800, for example, based on the z-scan. CTUs may be represented by the large, square tiles as shown, for example, in FIG. 18. The samples of these CTUs (shown with hatching, for example, in FIG. 18) may form an exemplary IBC reference region 1806 for determining a reference block to predict current block 1800. In at least some video encoders and decoders, a different sequence order for encoding/decoding may be used. The different sequence order for encoding/decoding may influence IBC reference region 1806 accordingly.

In addition to the encoding/decoding sequence order, one or more additional reference region constraints may be placed on IBC reference region 1806. IBC reference region 1806 may be constrained, for example, based on a limited memory for storing reference samples. IBC reference region 1806 may be constrained to CTUs, for example, based on a parallel processing approach. The parallel processing approach may include, for example, tiles or wavefront parallel processing (WPP). Tiles may be used as part of a picture partitioning process for flexibly subdividing a picture into rectangular regions of CTUs such that coding dependencies between CTUs of different tiles may not be allowed. WPP may be similarly used as part of a picture partitioning process for partitioning a picture into CTU rows such that dependencies between CTUs of different partitions may not be allowed. These tools may enable parallel processing of the picture partitions.

As described herein, reference to a position of a block may refer to the position of the block's top-left sample. In at least some technologies, the position of a block may be determined by the position of another sample in the block. The position of a sample in a picture may be indicated by a sample number in the horizontal direction (given by the variable x) and a sample number in the vertical direction (given by the variable y) relative to the origin ((x, y)=(0,0)) of the picture coordinate system in the top left corner of the picture. The position of a sample in a picture may be indicated by a sample number in the horizontal direction (given by the variable x) and a sample number in the vertical direction (given by the variable y) relative to the top left sample of a block (e.g., a CTU) in which the sample is located. The positive direction may be to the right, for example, in the horizontal x direction. As x increases, the sample location may move farther right in the positive, horizontal direction. The positive direction may be down, for example, in the vertical y direction. As y increases, the sample location may move farther down in the positive, vertical direction.

The encoder may use a block matching technique to determine a block vector (BV) 1808 that indicates the relative displacement from current block 1800 to a reference block shown as block 1810 (or intra block compensated prediction) within IBC reference region 1806 that "best matches" current block 1800. Block 1810 may have been determined, for example, as the reference block from IBC reference region 1806 as being a better match than other blocks (e.g., block 1818 and/or block 1820, etc.) within IBC reference region 1806. IBC reference region 1806 may be a constraint placed on BV 1808. BV 1808 may be constrained by IBC reference region 1806 to indicate a displacement from current block 1800 to a reference block (e.g., shown as block 1810) that is within IBC reference region 1806. The encoder may determine the best matching reference block as block 1810 from blocks tested, such as blocks 1818 and 1820, within IBC reference region 1806. The encoder may determine the best matching reference block as block 1810 from blocks tested such as blocks 1818 and 1820, within IBC reference region 1806, for example, if a searching process occurs. The encoder may determine that a reference block is the best matching reference block, for example, based on one or more cost criteria. The one or more cost criteria may include, for example, a rate-distortion criterion (e.g., Lagrangian rate-distortion cost). The one or more cost criteria may be based on, for example, a difference between the prediction samples of the reference block and the original samples of the current block. This difference may include, for example, a sum of squared differences (SSD), a sum of absolute differences (SAD), a sum of absolute transformed differences (SATD), and/or a difference determined based on a hash function. Reference block 1810 may comprise decoded (or reconstructed) samples of current picture 1802. Reference block 1810 may comprise decoded (or reconstructed) samples of current picture 1802, for example, if being processed by in-loop filtering operations. The in-loop filtering operations may include, for example, deblocking or sample adaptive offset (SAO) filtering.

The encoder may determine or use a difference (e.g., a corresponding sample-by-sample difference) between current block 1800 and reference block 1810. The encoder may determine or use a difference (e.g., a corresponding sample-by-sample difference) between current block 1800 and reference block 1810, for example, if reference block 1810 is determined and/or generated for current block 1800 using IBC. The difference may be referred to as a prediction error or residual. The encoder may store and/or signal in a bitstream the prediction error and the related prediction information for decoding.

The prediction information may include BV 1808. The prediction information may include an indication of BV 1808. BV 1808 may be predictively coded. BV 1808 may be predictively coded, for example, in HEVC, VVC, and/or other video compression schemes. BV 1808 may be predictively coded, for example, before being stored or signaled in a bit stream. BV 1808 for current block 1800 may be predictively coded using a similar technique for inter prediction. BV 1808 for current block 1800 may be predictively coded using, for example, a technique similar to advanced motion vector prediction (AMVP). This technique may be referred to as BV prediction and difference coding. The encoder may code BV 1808 as a difference between BV 1808 and a BV predictor (BVP) 1812, for example, using the BV prediction and difference coding technique. The encoder may select BVP 1812 from a list of candidate BVPs. BVP 1812 may point to a position 1816 within IBV reference region 1806. The candidate BVPs may come from previously decoded BVs of neighboring blocks of current block 1800 or from other sources. A null BVP candidate (e.g., with an x-component and y-component with zero magnitude) may be added to the list of candidate BVPs, for example, if a BV from a neighboring block of current block 1800 is not available. The encoder and/or decoder may generate or determine the list of candidate BVPs.

The encoder may determine a BV difference (BVD) 1814, for example, based on (e.g., after) the encoder selecting BVP 1812 from the list of candidate BVPs. BVD 1814 may be calculated based on the difference between BV 1808 and BVP 1812. For example, BVD 1814 may be represented by two directional components calculated according to equations (21) and (22) below, which are reproduced below:

$$BVD_x = BVx - BVP_x \quad (21)$$

$$BVD_y = BVy - BVP_y \quad (22)$$

In Equation 21 and Equation 22, BVDx and BVDy respectively represent the horizontal and vertical components of BVD 1814, BVx and BVy respectively represent the horizontal and vertical components of BV 1808, and BVPx and BVPy respectively represent the horizontal and vertical components of BVP 1812. The horizontal x-axis and vertical y-axis are indicated in the lower right hand corner of current picture 1802 for reference purposes. The x-axis may increase from left to right, and/or the y-axis may increase from top to bottom, for example, as described herein with respect to FIG. 18.

The encoder may signal the prediction error, an indication of the selected BVP 1812 (e.g., via an index pointing into the list of candidate BVPs), and/or the separate components of BVD 1814 given by equations (21) and (22). The encoder may signal, in a bitstream, the prediction error, the indication of the selected BVP 1812, and/or the separate components of BVD 1814. A decoder, such as decoder 300 described herein, may decode BV 1808. The decoder may decode BV 1808, for example, by adding corresponding components of BVD 1814 to corresponding components of BVP 1812. The decoder may decode current block 1800, for example, by determining and/or generating reference block 1810 using the decoded BV and combining the prediction with the prediction error received in the bitstream. Determining and/or generating reference block 1810 may form the prediction of current block 1800.

Figure 19:
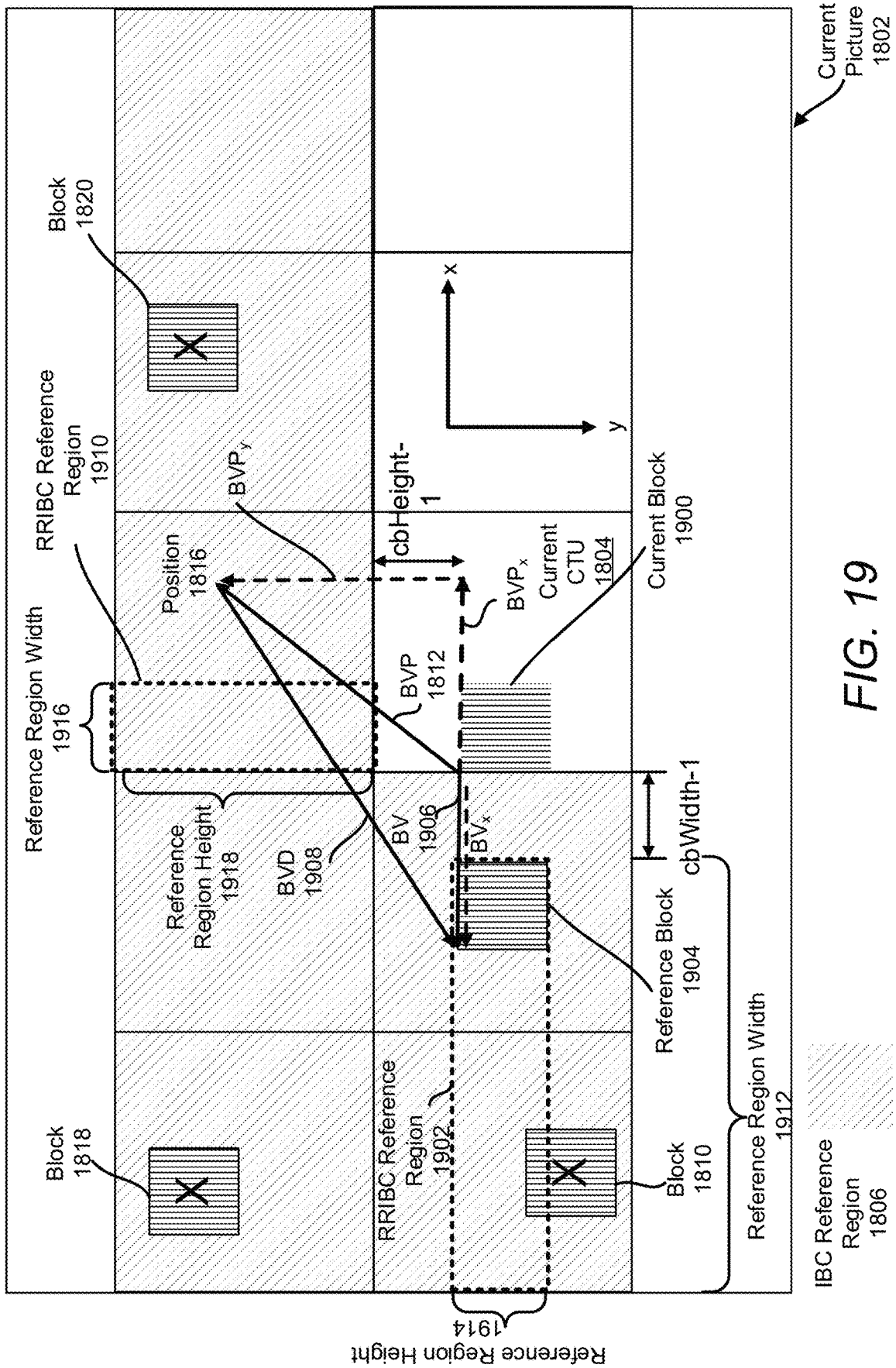
FIG. 19 shows an example RRIBC coding.

FIG. 19 shows an example RRIBC coding. FIG. 19 shows current picture 1802 with IBC reference region 1806 (e.g., such as described herein with respect to FIG. 18). FIG. 19 shows current block 1900 (within current CTU 1804) to be RRIBC coded. The encoder may determine a reference region corresponding to the direction for flipping. The encoder may determine a reference region corresponding to the direction for flipping, for example, based on the RRIBC mode and a direction for flipping a reference block relative to current block 1900. The reference region may be a rectangular reference region. The reference region may be in alignment with the direction for flipping.

RRIBC reference region 1902 may be determined as a rectangular region having a reference region width 1912 and a reference region height 1914, for example, if the direction for flipping is a horizontal direction. Reference region width 1912 may be a difference between a left boundary (e.g., leftmost) of IBC reference region 1806 and a position of current block 1900 (e.g., top left most sample) offset by a width (cbWidth) of current block 1900 to the left. The left boundary (e.g., leftmost) of IBC reference region 1806 may have an x coordinate of 0. Reference region height 1914 may be the same as a height (cbHeight) of current block 1900. RRIBC reference region 1902 (applicable for flipping in the horizontal direction) may have: an upper boundary and a lower boundary that correspond to those of current block 1900; a right boundary defined by an offset of cbWidth to a left boundary of current block 1900; and/or a left boundary that correspond to that of IBC reference region 1806.

RRIBC reference region 1910 may be determined as a rectangular region having a reference region width 1916 and a reference region height 1918, for example, if the direction for flipping is a vertical direction. Reference region width 1916 may be the same as cbWidth of current block 1900. Reference region height 1918 may be a difference between a top boundary (e.g., top most) of IBC reference region 1806 and a position of current block 1900 (e.g., top left most sample) offset by a cbHeight of current block 1900 above. The top boundary (e.g., top most) of IBC reference region 1806 may have a y coordinate of 0. RRIBC reference region 1910 (applicable for flipping in the vertical direction) may have: a left boundary and a right boundary that correspond to those of current block 1900; a lower boundary defined by an offset of cbHeight above an upper boundary of current block 1900; and/or a top boundary that correspond to that of IBC reference region 1806.

The reference region may be defined as being offset from current block 1900 (e.g., a position of the top left sample of current block 1900) in an x direction (e.g., a horizontal direction) and in a y direction (e.g., a vertical direction). RRIBC reference region 1902 may be indicated by an offset from current block 1900 in the x direction by −cbWidth and in the y direction by 0, for example, if flipping in a horizonal direction (i.e., horizonal flipping). RRIBC reference region 1910 may be indicated by an offset from current block 1900 in the x direction by 0 and in the y direction by −cbHeight, for example, if flipping in the vertical direction (i.e., vertical flipping). Other directions for flipping may be considered, for example, by defining the reference region as an offset in two directions (or similarly an offset vector). Directions may be extended beyond horizontal and vertical flipping to consider flipping relative to current block 1900 at an angle. An offset having the same non-zero magnitude in the x direction and in the y direction may indicate, for example, flipping at a diagonal relative to current block 1900.

The reference region (e.g., corresponding to flipping) may constrain/limit a location of a block from which a reference block may be determined. For horizontal flipping, for example, blocks such as blocks 1810, 1818, and 1820 (marked by an 'X') may not be valid and may not be searched for determining a reference block flipped with respect to current block 1900. A reference block 1904 may be determined from within RRIBC reference region 1914. RRIBC reference region 1914 may be a subset of IBC reference region 1806. Reference block 1904 may be determined, for example, in a manner similar to how reference block 1810 was determined, as explained herein with respect to FIG. 18. Reference block 1904 may be determined, for example, from reference region 1902 (instead of IBC reference region 1806). Reference block 1904 may be flipped in the direction (e.g., horizontal) corresponding to reference region 1902. Reference block 1904 may be flipped in the direction (e.g., horizontal) corresponding to reference region 1902, for example, before being compared with current block 1900. A reference block may be determined within RRIBC reference region 1910 that corresponds to the vertical flipping direction, for example, if the direction for flipping is vertical.

The encoder may select BVP 1812 from a list of candidate BVPs. The encoder may select BVP 1812 from a list of candidate BVPs, for example, as described herein with respect to FIG. 18 and FIG. 19. BVP 1812 may point to position 1816 within IBC reference region 1806. BV 1906 may indicate a displacement from current block 1900 to determined/selected reference block 1904 and a BVD 1908 may be calculated, for example, based on a difference between BV 1906 and BVP 1812. BV 1906 may indicate a displacement from current block 1900 to determined/selected reference block 1904 in a manner similar to how reference block 1810 may be indicated by BV 1808, as described herein. BVD 1908 may be calculated based on a difference between BV 1906 and BVP 1812 in a manner similar to how BVD 1814 may be calculated from BV 1808 and BVP 1812 according to equations (21) and (22), as described herein. The BV may have a component that is equal to 0, for example, because an RRIBC reference region may correspond to a flipping direction. For example, for horizontal flipping, BV 1906 may have a non-zero horizontal component (BVx) and a vertical component (BVy) that is 0 (not shown). Because BVPs, such as BVP 1812, may be determined from previously coded blocks, the BVPs may point to (e.g., indicate) a position that is outside of the RRIBC reference region corresponding to the flipping direction. BVD 1908 may be determined and encoded/decoded and/or may be large and require a larger number of bits to encode. BVD 1908 may be adjusted to constrain the maximum possible value of BVD. BVD 1908 may be adjusted to constrain the maximum possible value of BVD, for example, to take advantage of the constraints (e.g., reference region) placed on reference blocks for RRIBC coding current block 1900. Adjusting BVD 1908 to constrain the maximum possible value of BVD may lead to fewer bits being needed to code BVDs.

Figure 20:
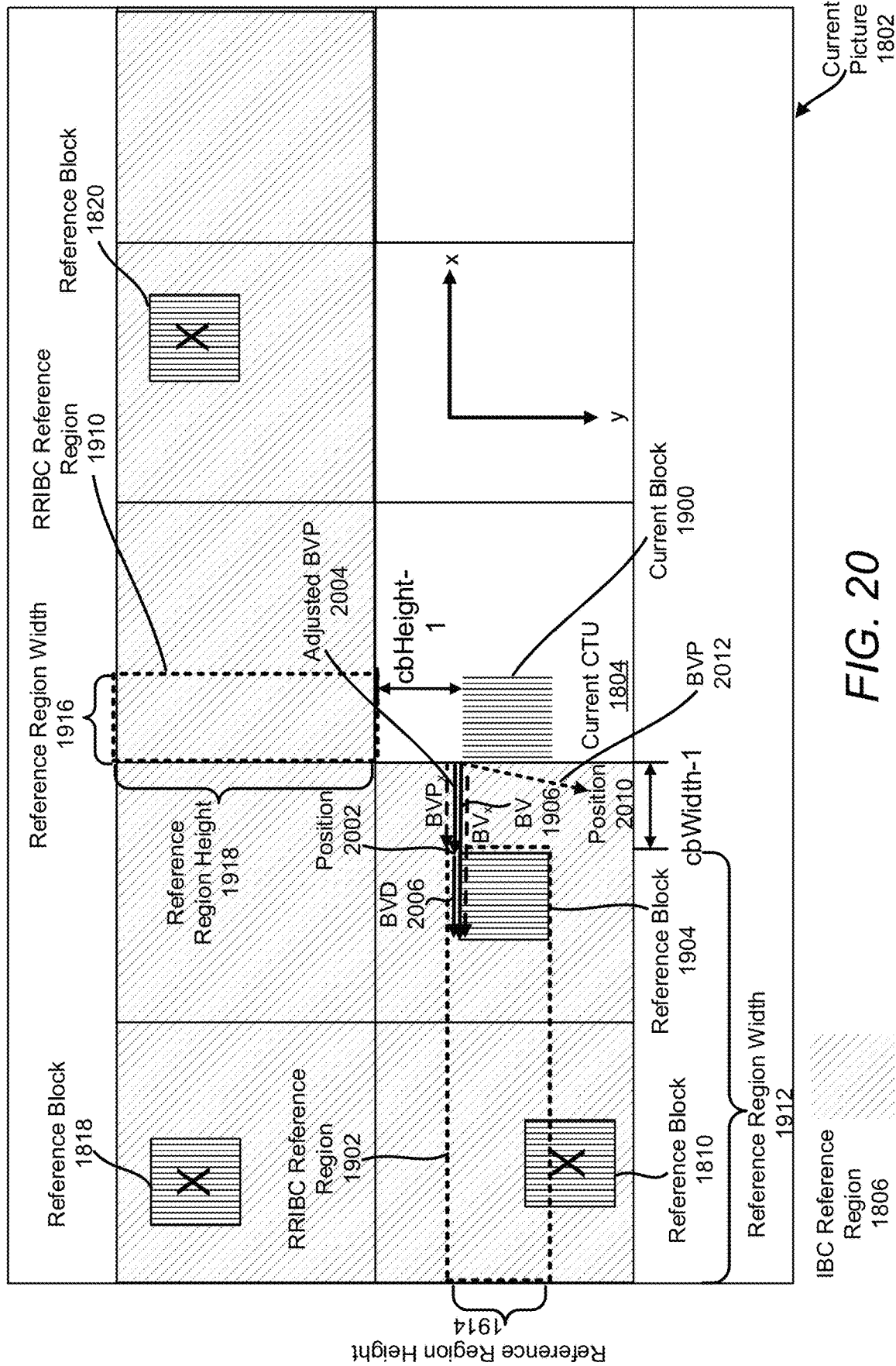
FIG. 20 shows an example adjusted BVP for RRIBC coding.

FIG. 20 shows an example adjusted BVP for RRIBC coding. FIG. 20 shows, for RRIBC mode, replacing BVP 1812 with an adjusted BVP 2004 to limit BVD size that, as described herein, may increase efficiency in coding BVDs. FIG. 20 shows current picture 1802 with IBC reference region 1806. As described herein, FIG. 19 shows current block 1900 (within current CTU 1804) to be RRIBC coded. RRIBC reference region 1902 may be determined to correspond to flipping reference block 1904 relative to current 1900 in a horizontal direction (e.g., such as described herein with respect to FIG. 19). BV 1906 indicates a displacement from current block 1900 to reference block 1904 (within RRIBC 1902) (e.g., such as described herein with respect to FIG. 19). The encoder may replace BVP 1812 with, for example, an adjusted BVP 2004 that indicates a displacement from the position of current block 1900 to a position within RRIBC reference region 1902. The encoder may replace BVP 1812 with an adjusted BVP 2004, for example, based on determining that BVP 1812 points to (e.g., indicates) a position that is outside of RRIBC reference region 1902.

A component of a BVP may be selected, for example, based on the RRIBC mode and the direction for flipping. The encoder may determine whether the component is within a projection of the reference region onto a component aligned with the selected component. The selected component may correspond to the flipping direction. A horizontal component (BVx) of BVP 1812 may be selected, for example, based on the selected component corresponding to the horizontal flipping. BVPx may indicate a displacement to a position not within RRIBC reference region 1902 projected onto the x axis (e.g., corresponding to a horizontal direction).

To determine whether the BVP is outside of RRIBC reference region 1902 (e.g., points to or indicates a position that is outside of RRIBC reference region) and/or if it should be adjusted, the encoder may select the BVP component that is aligned with the flipping direction. To determine whether the BVP is outside of RRIBC reference region 1902 (e.g., points to or indicates a position that is outside of RRIBC reference region) and/or if it should be adjusted, the encoder may select the BVP component that is aligned with the flipping direction, for example, if the direction for flipping is horizontal or vertical. The other component(s) of BVP that do not align with the flipping direction may be ignored, omitted, and/or set to 0. The encoder may select the horizontal component of BVP, for example, if the flipping direction is horizontal. The encoder may select the vertical component of BVP, for example, if the flipping direction is vertical. To determine whether the BVP points to (e.g., indicates) a position that is outside of the reference region, a sum of the selected component and a dimension (cbDimension) of the current block, may be determined to be greater than zero, and/or the dimension is aligned with the selected component. The dimension of the current block may be selected as cbWidth (which is in a horizontal direction), for example, if the flipping direction is horizontal. The dimension of the current block may be selected as cbHeight (which is in a vertical direction), for example, if the flipping direction is vertical. The selected component may be replaced with an adjusted component to generate an adjusted BVP. The selected component may be replaced with an adjusted component to generate an adjusted BVP, for example, based on determining whether the BVP points to (e.g., indicates) a position that is outside of the reference region.

The BVPy component of BVP 1812 may be ignored (or not selected or set to 0). BVP 1812 may be replaced with adjusted BVP 2004 having a BVPx component equal to −cbWidth and without a BVPy component (e.g., set to 0). BVP 1812 may be replaced with adjusted BVP 2004 having a BVPx component equal to −cbWidth and without a BVPy component (e.g., set to 0), for example, based on determining that a sum of BVPx of BVP 1812 and cbWidth is greater than 0 (e.g., BVPx points to the right of the right boundary of RRIBC 1902). Adjusted BVP 2004 may point to position 2002, which may be within RRIBC reference region 1902. The maximum value of BVD may be limited to a length of the reference region, for example, by constraining BVPs to within a reference region corresponding to the flipping direction. For horizonal flipping, possible BVD values may be limited to a maximum of reference region width 1912. BVD 2006 may be calculated based on a difference between BV 1906 and adjusted BVP 2004 (e.g., such as described herein with respect to FIGS. 18 and/or 19). BVD 2006 may be limited to a maximum of reference region width 912 whereas a horizontal component (BVx) of BVD 1908 may be much larger depending on the size of IBC reference region 1806.

A BVP 2012 that points to position 2010 (which is to the left of the right boundary of RRIBC 1902) may be replaced by adjusted BVP 2004. The examples described herein may be similarly used if RRIBC reference region 1910 is determined for vertical flipping. A vertical component of BVP 2012 may be selected based on the vertical flipping and the horizontal component of BVP 2012 may not be selected, for example, if current block 1900 were to be coded in RRIBC based on vertical flipping and BVP 2012 was selected. BVP 2012 (e.g., the vertical component of BVP 2012) may be replaced with an adjusted BVP with a vertical component equal to, e.g., −cbHeight, for example, based on a sum of the vertical component of BVP 2012 and cbHeight being greater than 0.

IBC reference region 1806 was provided by way of example and not limitation, as described herein with respect to FIGS. 18-20. The methods described herein with respect to FIGS. 18-20 may be used based on IBC reference regions different than IBC reference region 1806, as would be appreciated by persons of ordinary skill in the art based on the teachings herein. IBC reference region 1806, as described herein, for example, with respect to FIGS. 18-20, may be replaced by an IBC reference region determined based on a different set of IBC reference region constraints. In addition to being constrained to a reconstructed part of current picture 1802 and potentially to a particular wavefront parallel processing (WPP) partition or tile partition (e.g., such as described herein with respect to FIG. 18), IBC reference region 1806 may be further constrained, for example, to include a number of decoded or reconstructed samples that may be stored in a limited size IBC reference sample memory. The size of the IBC reference sample memory may be limited. The size of the IBC reference sample memory may be limited, for example, based on being implemented on-chip with the encoder or decoder. The IBC reference region may be increased in size by using a larger size IBC reference sample memory off-chip from the encoder or decoder. Such an approach may have its own drawbacks, for example, increased off-chip memory bandwidth requirements and increased delay in writing and reading samples in the IBC reference region to and from the IBC reference sample memory. A reference region for RRIBC may be along a flipping direction for a current block and may be (or very likely to be) smaller than the IBC reference region (e.g., such as described herein with respect to FIGS. 20, 21A, and 21B). This may cause BVD to be potentially larger as the IBC region increases in size. As described herein, the BVD may indicate a difference between a BV of a reference block and a selected BVP. By implementing the BVP adjustment for RRIBC, for example, such as described herein with respect to FIG. 20, the size of the IBC reference region may not impact how efficiently BVD can be coded.

Using a limited size IBC reference sample memory, the IBC reference region may be constrained to: a reconstructed part of the current CTU; and/or one or more reconstructed CTUs to the left of the current CTU not including a portion, of a left most one of the one or more reconstructed CTUs, collocated with either the reconstructed part of the current CTU or a virtual pipeline data unit (VPDU) in which the current block being coded is located. Blocks of samples in different CTUs may be collocated. Blocks of samples in different CTUs may be collocated, for example, based on having a same size and CTU offset. A CTU offset of a block may be the offset of the block's top-left corner relative to the top-left corner of the CTU in which the block is located.

The IBC reference region may not include the portion, of the left most one of the more reconstructed CTUs, that is collocated with the reconstructed part of the current CTU. The IBC reference region may not include the portion that is collocated with the reconstructed part of the current CTU, for example, because the IBC reference sample memory may be implemented similar to a circular buffer. The IBC reference sample memory may store reconstructed reference samples corresponding to one or more CTUs. Reconstructed reference samples of the current CTU may replace the reconstructed reference samples of a CTU stored in the IBC reference sample memory that are located, within a picture or frame, farthest to the left of the current CTU, for example, based on (e.g., after or in response to) the IBC reference sample memory being filled. The samples of the CTU stored in the IBC reference sample memory that are located, within a picture or frame, farthest to the left of the current CTU may correspond to the oldest data in the IBC reference sample memory. Such an update mechanism may allow some of the reconstructed reference samples from the left most CTU to remain stored in the IBC reference sample memory. Such an update mechanism may allow some of the reconstructed reference samples from the left most CTU to remain stored in the IBC reference sample me, for example, if processing the current CTU occurs. The remaining reference samples of the left most CTU stored in the IBC reference sample memory may be used for predicting the current block in the current CTU.

In at least some technologies, a CTU may not be processed all at the same time. The CTU may be divided into VPDUs for processing by a pipeline stage. A VPDU may comprise a sample region size, for example, a 4×4 region of samples, a 16×16 region of samples, a 32×32 region of samples, a 64×64 region of samples, a 128×128 region of samples, and/or some other sample region size. As described herein, a size of a VPDU may be determined based on a minimum of a maximum VPDU size (e.g., a 64×64 region of samples) and a size (e.g., a width or height) of a current CTU. The portion of the left most one of the one or more reconstructed CTUs, that is collocated with the VPDU in which the block being coded is located, may be further excluded from the IBC reference region (e.g., such as described herein). By excluding this region of the left most one of the one or more reconstructed CTUs from the IBC reference region, the corresponding portion of the IBC reference sample memory used to store reconstructed reference samples from this region may be used to store samples within the region of the current CTU corresponding to the VPDU, which may avoid certain complexities in design. The complexities that may be avoided include hardware design complexities, for example, in the input/output operations for an external memory (e.g., Random Access Memory (RAM)). Additionally, access to reconstructed samples from some internal (on-chip) buffers may be faster than accessing the same amount of data from the external memory. Also, better utilization of an internal buffer may reduce the number of external (RAM) memory access operations and therefore increase decoding speeds while also reducing power consumption.

The number of reconstructed CTUs to the left of the current CTU included in the IBC reference region may be determined. The number of reconstructed CTUs to the left of the current CTU included in the IBC reference region may be determined, for example, based on the number of reconstructed reference samples the IBC reference sample memory may store and/or the size of the CTUs in the current picture. The number of reconstructed CTUs to the left of the current CTU included in the IBC reference region may be determined, for example, based on the number of reconstructed reference samples the IBC reference sample memory may store divided by the size of a CTU in the current picture. For an IBC reference sample memory that may store 128×128 reconstructed reference samples for the IBC reference region and a CTU size of 128×128 samples, the number of reconstructed CTUs to the left of the current CTU included in the IBC reference region may be equal to (128×128)/(128×128) or 1 CTU. For a memory that may store 128×128 reconstructed reference samples for the IBC reference region and a CTU size of 64×64 samples, the number of reconstructed CTUs to the left of the current CTU included in the IBC reference region may be equal to (128×128)/(64×64) or 4 CTUs.

Figure 21A:
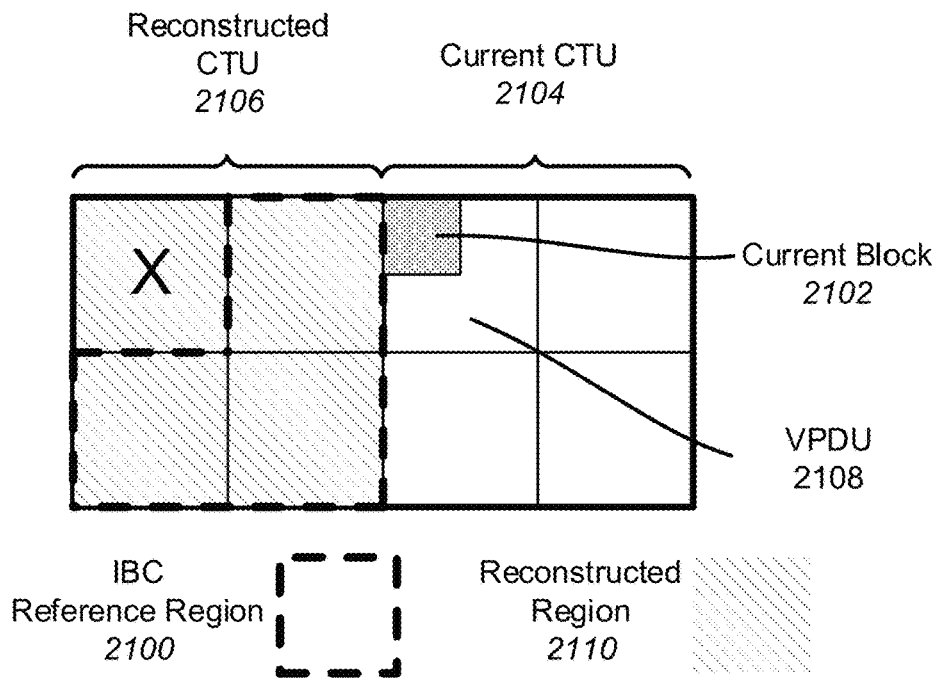
FIG. 21A shows an example IBC reference region determined based on an IBC reference sample memory size and a CTU size.

FIG. 21A shows an example IBC reference region determined based on an IBC reference sample memory size and a CTU size. The example IBC reference region may be determined, for example, based on an IBC reference sample memory size of 128×128 samples and a CTU size of 128×128 samples. FIG. 21A shows an example IBC reference region 2100. Based on an IBC reference sample memory size of 128×128 samples and a CTU size of 128×128 samples, the number of reconstructed CTUs to the left of the current CTU included in the IBC reference region may be equal to (128×128)/(128×128) or 1 CTU.

FIG. 21A shows a current block 2102 within a current CTU 2104. Current block 2102 may be the first block coded in current CTU 2104 and may be coded using IBC mode, such as RRIBC mode. A block may be coded using IBC mode by determining a "best matching" reference block within an IBC reference region (e.g., such as described herein with respect to FIG. 18). A "best matching" reference block may be selected within an RRIBC reference region corresponding to a direction for flipping, for example, if the block is coded using RRIBC mode (e.g., such as described herein with respect to FIGS. 19 and 20). The reference block may be selected from a union (or overlap) between the IBC reference region and the RRIBC reference region.

IBC reference region 2100 may be constrained to: a reconstructed part of current CTU 2104; and/or the single, reconstructed CTU 2106 to the left of current CTU 2104 not including a portion, of reconstructed CTU 2106, collocated with either the reconstructed part of current CTU 2104 or a virtual pipeline data unit (VPDU) 2108 in which current block 2102 is located. CTUs may be divided into 4 VPDUs of size 64×64 samples. IBC reference region 2100 for current block 2102 may include reconstructed region 2110 (shown with hatching) except the 64×64 region of reconstructed CTU 2106 collocated with VPDU 2108. This collocated region is marked with an "X", as shown in FIG. 21A. For different size CTUs, the IBC reference region may include a different number of CTUs to the left of current CTU 2102 than the single, reconstructed CTU 2106. For CTU sizes of 64×64, for example, the IBC reference region may include 4 CTUs to the left of current CTU 2102 based on the number of reconstructed reference samples the IBC reference sample memory may store divided by the size of the CTUs in the current picture.

Figure 21B:
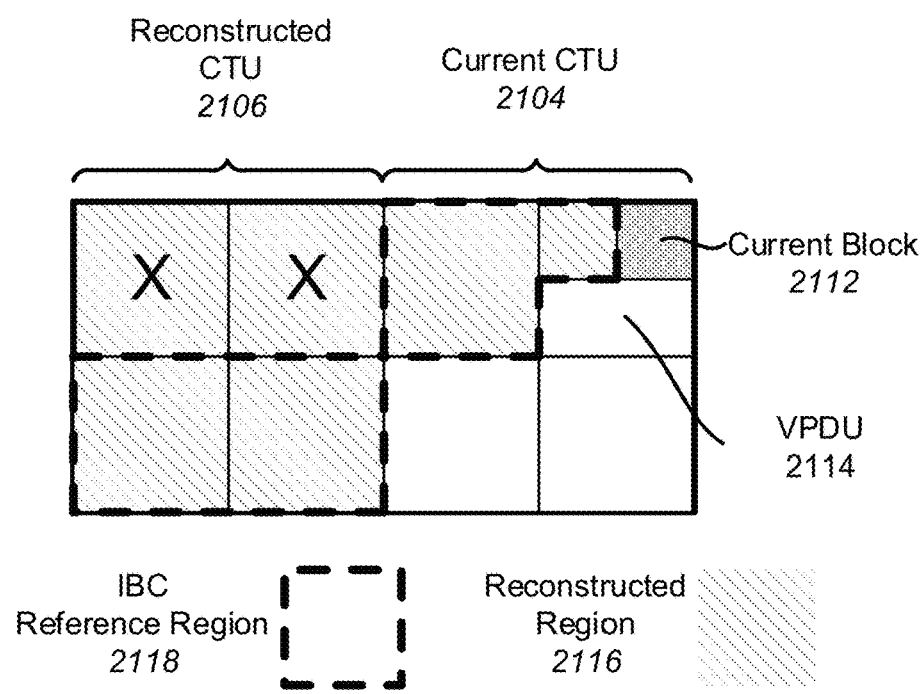
FIG. 21B shows an example IBC reference region determined based on an IBC reference sample memory size and a CTU size.

FIG. 21B shows an example IBC reference region determined based on an IBC reference sample memory size and a CTU size. The example IBC reference region may be determined, for example, based on an IBC reference sample memory size of 128×128 samples and a CTU size of 128×128 samples. FIG. 21B continues with the example described herein with respect to FIG. 21A for a later coded block in current CTU 2104. The later coded block is labeled as current block 2112 and may be coded using IBC mode, such as RRIBC mode (e.g., such as described herein with respect to FIG. 18), by determining a "best matching" reference block within an IBC reference region. A "best matching" reference block may be selected within an RRIBC reference region corresponding to a direction for flipping, for example, if the block is coded using RRIBC mode (e.g., such as described herein with respect to FIGS. 19 and 20). The reference block may be selected from a union (or overlap) between the IBC reference region and the RRIBC reference region. IBC reference region 2118 for current block 2112 may be constrained to: a reconstructed part of current CTU 2104; and/or the reconstructed CTU 2106 not including a portion, of reconstructed CTU 2106, collocated with either the reconstructed part of current CTU 2104 or a virtual pipeline data unit (VPDU) 2114 in which current block 2112 is located. Current CTU 2104 may be divided into 4 VPDUs of size 64×64 samples (e.g., such as described with respect to FIG. 21A). IBC reference region 2118 for current block 2112 may include reconstructed region 2116 (shown with hatching) except the part of CTU 2106 collocated with either the reconstructed part of current CTU 2104 or VPDU 2114. These collocated regions are each marked with an "X", as shown in FIG. 21B.

Figure 22A:
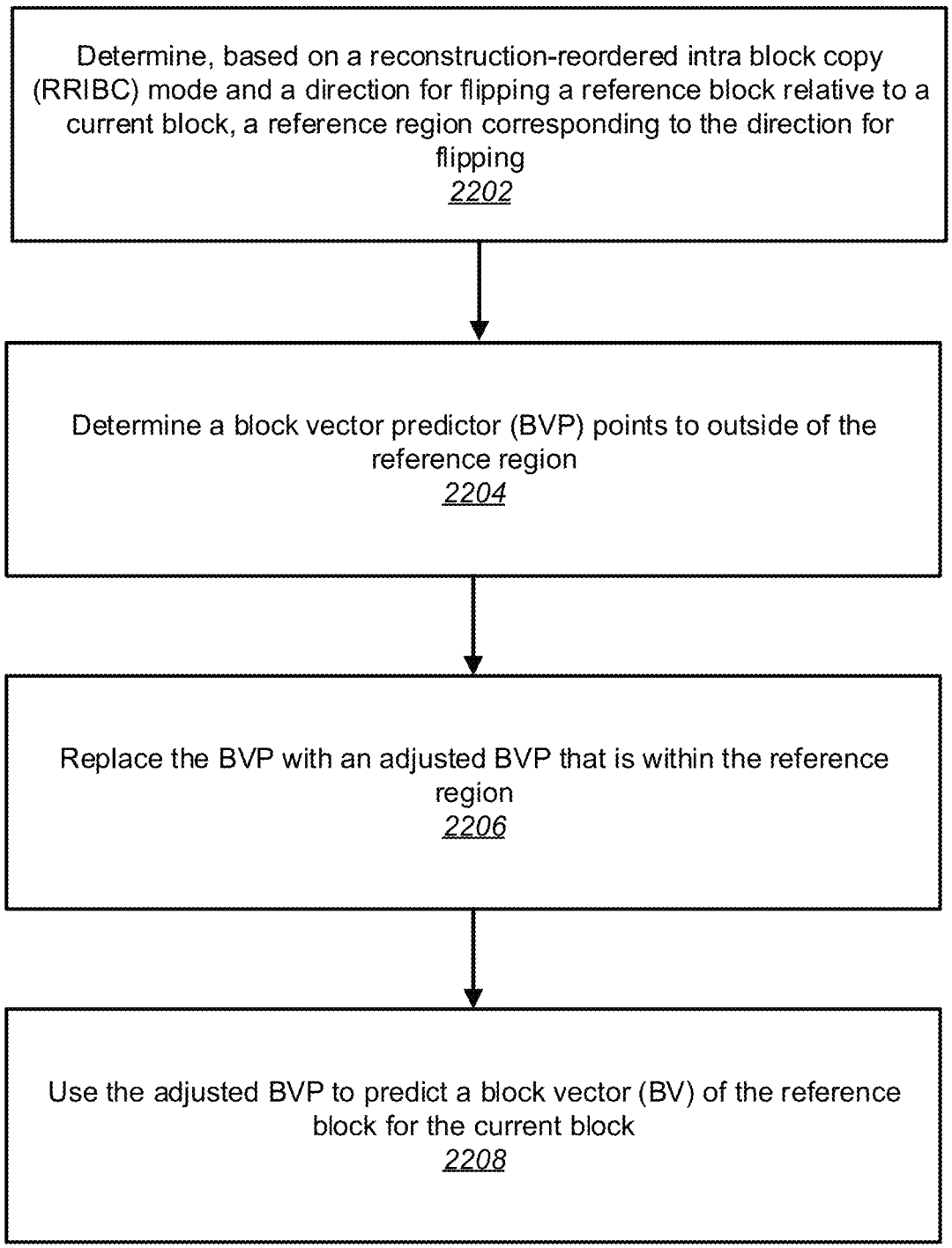
FIG. 22A shows an example method for replacing a BVP with an adjusted BVP for RRIBC at an encoder.

FIG. 22A shows an example method for replacing a BVP with an adjusted BVP for RRIBC at an encoder. FIG. 22 shows a flowchart 2200A. One or more steps of the example flowchart 2200A may be performed by an encoder, such as encoder 200 shown in FIG. 2.

At step 2202, based on a reconstruction-reordered intra block copy (RRIBC) mode and/or a direction for flipping a reference block relative to a current block, a reference region corresponding to the direction for flipping may be determined. The reference region may be determined, for example, based on the RRIBC mode and a direction for flipping a reference block relative to current block. An encoder may replace a BVP with an adjusted BVP, for example, based on determining that the BVP points to (e.g., indicates) a position that is outside of an RRIBC reference region.

The adjusted BVP may indicate a displacement from the current block to a position in the reference region, which may be a rectangular reference region. For example, if the direction for flipping is horizontal: an upper boundary and a lower boundary that correspond to those of the current block; a right boundary defined by an offset of a width (cbWidth) of the current block to a left boundary of the current block; and a left boundary that correspond to that of an IBC reference region; and For example, if the direction for flipping is vertical: a left boundary and a right boundary that correspond to those of the current block; a lower boundary defined by an offset of a height (cbHeight) of the current block above an upper boundary of the current block; and an upper boundary that correspond to that of an IBC reference region.

The reference block may be selected from within the reference region for RRIBC. The reference region may be a rectangular region that includes a reference width and a reference height. For example, if the selected component is a horizontal component of the BVP: a horizontal component of a block vector difference (BVD), between the BV and the BVP, has a maximum possible value equal to the reference width. For example, if the selected component is a vertical component of the BVP: a vertical component of BVD has a maximum possible value equal to the reference height.

At step 2204, a block vector predictor (BVP) may be determined to point to (e.g., indicate) a position that is outside of the reference region. A component of the BVP may be selected, for example, based on the RRIBC mode. The component may be selected as being in the flipping direction. The determining that the BVP points to (e.g., indicate) a position that is outside of the reference region may be based on a sum, of the selected component and a dimension (cbDimension) of the current block, being greater than zero, and/or the dimension may be aligned with the selected component (e.g., such as described herein with respect to FIG. 20).

The selecting of the component may be based on the RRIBC mode being indicated and a direction for flipping the reference block relative to the current block. The selected component may be in alignment with the direction for flipping. The selected component of the BVP may be one of: a horizontal component of the BVP if the direction is horizontal; and/or a vertical component of the BVP if the direction is vertical.

The dimension of the current block that is summed with the selected component may be one of: a width (cbWidth) of the current block if the selected component is a horizontal component of the BVP; and a height (cbHeight) of the current block if the selected component is a vertical component of the BVP. The BV of the reference block may be determined and/or predicted without using a non-selected component of the BVP.

At step 2206, the BVP may be replaced with an adjusted BVP that is within the reference region. The adjusted BVP may be determined based on the determining that the BVP points to (e.g., indicate) a position that is outside of the reference region at 2204. The selected component may be replaced with an adjusted component to generate the adjusted BVP, for example, if a component of BVP is selected at 2204.

The adjusted component to replace the selected component may be equal to −cbDimension, for example, if a component of the BVP is selected (e.g., at step 2204). For example, if the selected component is a horizontal component of the BVP: the dimension of the current block is a width (cbWidth) of the current block; and the adjusted component is equal to −cbWidth (e.g., minus the width). For example, if the selected component is a vertical component of the BVP: the dimension of the current block is a height (cbHeight) of the current block; and the adjusted component is equal to −cbHeight (e.g., minus the height).

At step 2208, the adjusted BVP may be used to predict a BV for the current block. Using the adjusted BVP may include calculating a block vector difference (BVD) as a difference between the BV and the adjusted BVP (e.g., such as described herein with respect to FIGS. 17-20). The BVD may include only a component in a direction aligned with the selected component, for example, if a component of BVP is selected (e.g., based on the RRIBC mode and the direction for flipping). A residual between the current block and the reference block flipped with respect to the current block may be calculated. The reference block may be determined, for example, based on the calculated residual.

Using the adjusted BVP may comprise selecting an adjusted BVP candidate, as the adjusted BVP, from a list of candidate BVPs. The adjusted BVP candidate may be selected, for example, based on the adjusted component and an index of the adjusted BVP candidate in the list. The adjusted BVP may be selected as the BVP. The adjusted BVP may be selected as the BVP, for example based on BVD calculated for each of the candidate BVPs in the list. Additionally or alternative, the adjusted BVP may be selected as the BVP, for example based on indexes of the candidate BVPs.

The adjusted BVP may be selected as having a smallest cost among costs calculated for the candidate BVPs, respectively. A cost for a candidate BVP may be calculated. A cost for a candidate BVP may be calculated, for example, based on combining a cost of encoding an index corresponding to the candidate BVP and a cost of encoding a BVD corresponding to the candidate BVP. Selecting based on the adjusted component comprises determining a component of a block vector difference (BVD) that indicates a displacement from the current block to the reference block, wherein the displacement is along a direction aligned with the selected component. The adjusted BVP candidate may be selected without using one or more other components, not aligned with the selected component, of the adjusted BVP candidate. The adjusted BVP candidate may be selected, for example, based on one or more other components, not aligned with the selected component, of the adjusted BVP candidate being set to zero. The list of candidate BVPs may comprise a list of components, of BVPs, aligned with the selected component. A plurality of BVP candidates comprising the BVP candidate may be determined. The adjusted BVP candidate may be added to the list of candidate BVPs for determining or predicting the BV of the reference block, for example, based on the replacing the selected component with the adjusted component to generate the adjusted BVP.

The example flowchart 2200A may comprise the step of signaling an indication of the one of the adjusted BVP candidates, as the adjusted BVP, in a bitstream. The example flowchart 2200A may comprise the step of receiving, in a bitstream, an indication of a selected one of the adjusted BVP candidates to be used as the adjusted BVP.

Figure 22B:
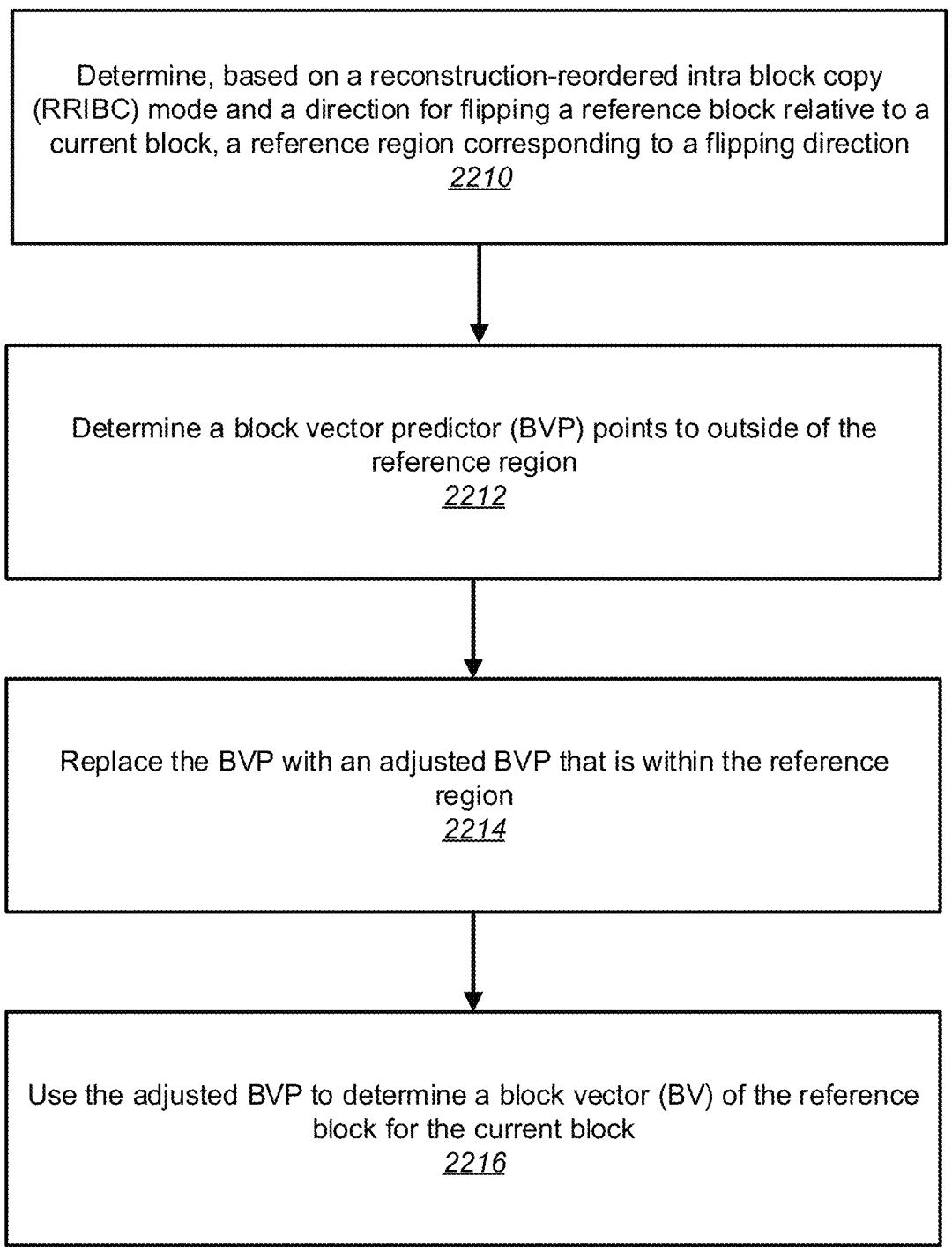
FIG. 22B shows an example method for replacing a BVP with an adjusted BVP for RRIBC at a decoder.

FIG. 22B shows an example method for replacing a BVP with an adjusted BVP for RRIBC at a decoder. FIG. 22B shows a flowchart 2200B. One or more steps of the example flowchart 2200B may be performed by a decoder, such as decoder 300 shown in FIG. 3.

At step 2210, based on a reconstruction-reordered intra block copy (RRIBC) mode and/or a direction for flipping a reference block relative to a current block, a reference region corresponding to the direction for flipping may be determined. The reference region may be determined, for example, based on the RRIBC mode and a direction for flipping a reference block relative to current block. A decoder may replace a BVP with an adjusted BVP, for example, based on determining that the BVP points to (e.g., indicates) a position that is outside of an RRIBC reference region.

The adjusted BVP may indicate a displacement from the current block to a position in the reference region, which may be a rectangular reference region. For example, if the direction for flipping is horizontal: an upper boundary and a lower boundary that correspond to those of the current block; a right boundary defined by an offset of a width (cbWidth) of the current block to a left boundary of the current block; and a left boundary that correspond to that of an IBC reference region. For example, if the direction for flipping is vertical: a left boundary and a right boundary that correspond to those of the current block; a lower boundary defined by an offset of a height (cbHeight) of the current block above an upper boundary of the current block; and an upper boundary that correspond to that of an IBC reference region.

The reference block may be selected from within the reference region for RRIBC. The reference region may be a rectangular region that includes a reference width and a reference height. For example, if the selected component is a horizontal component of the BVP: a horizontal component of a block vector difference (BVD), between the BV and the BVP, has a maximum possible value equal to the reference width. For example, if the selected component is a vertical component of the BVP: a vertical component of BVD has a maximum possible value equal to the reference height.

At step 2212, a block vector predictor (BVP) may be determined to point to (e.g., indicate) a position that is outside of the reference region. A component of the BVP may be selected, for example, based on the RRIBC mode. The component may be selected as being in the flipping direction. The determining that the BVP points to (e.g., indicate) a position that is outside of the reference region may be based on a sum, of the selected component and a dimension (cbDimension) of the current block, being greater than zero, and/or the dimension may be aligned with the selected component (e.g., such as described herein with respect to FIG. 20).

The selecting of the component may be based on the RRIBC mode being indicated and a direction for flipping the reference block relative to the current block. The selected component may be in alignment with the direction for flipping. The selected component of the BVP may be one of: a horizontal component of the BVP if the direction is horizontal; and/or a vertical component of the BVP if the direction is vertical.

The dimension of the current block that is summed with the selected component may be one of: a width (cbWidth) of the current block if the selected component is a horizontal component of the BVP; and a height (cbHeight) of the current block if the selected component is a vertical component of the BVP. The BV of the reference block may be determined and/or predicted without using a non-selected component of the BVP.

At step 2214, the BVP may be replaced with an adjusted BVP that is within the reference region. The adjusted BVP may be determined based on the determining that the BVP points to (e.g., indicate) a position that is outside of the reference region at 2204. The selected component may be replaced with an adjusted component to generate the adjusted BVP, for example, if a component of BVP is selected at 2204.

The adjusted component to replace the selected component may be equal to −cbDimension, for example, if a component of the BVP is selected (e.g., at step 2204). For example, if the selected component is a horizontal component of the BVP: the dimension of the current block is a width (cbWidth) of the current block; and the adjusted component is equal to −cbWidth. For example, if the selected component is a vertical component of the BVP: the dimension of the current block is a height (cbHeight) of the current block; and the adjusted component is equal to −cbHeight.

At step 2216, the adjusted BVP may be used to determine a BV for the current block. Using the adjusted BVP may include calculating a block vector difference (BVD) as a difference between the BV and the adjusted BVP (e.g., such as described herein with respect to FIGS. 17-20). The BVD may include only a component in a direction aligned with the selected component, for example, if a component of BVP is selected (e.g., based on the RRIBC mode and the direction for flipping). A residual between the current block and the reference block flipped with respect to the current block may be calculated. The reference block may be determined, for example, based on the calculated residual.

Using the adjusted BVP may comprise selecting an adjusted BVP candidate, as the adjusted BVP, from a list of candidate BVPs. The adjusted BVP candidate may be selected, for example, based on the adjusted component and an index of the adjusted BVP candidate in the list. The adjusted BVP may be selected as the BVP. The adjusted BVP may be selected as the BVP, for example based on BVD calculated for each of the candidate BVPs in the list. Additionally or alternative, the adjusted BVP may be selected as the BVP, for example based on indexes of the candidate BVPs.

The adjusted BVP may be selected as having a smallest cost among costs calculated for the candidate BVPs, respectively. A cost for a candidate BVP may be calculated. A cost for a candidate BVP may be calculated, for example, based on combining a cost of encoding/decoding an index corresponding to the candidate BVP and a cost of encoding/decoding a BVD corresponding to the candidate BVP. Selecting based on the adjusted component comprises determining a component of a block vector difference (BVD) that indicates a displacement from the current block to the reference block, wherein the displacement is along a direction aligned with the selected component. The adjusted BVP candidate may be selected without using one or more other components, not aligned with the selected component, of the adjusted BVP candidate. The adjusted BVP candidate may be selected, for example, based on one or more other components, not aligned with the selected component, of the adjusted BVP candidate being set to zero. The list of candidate BVPs may comprise a list of components, of BVPs, aligned with the selected component. A plurality of BVP candidates comprising the BVP candidate may be determined. The adjusted BVP candidate may be added to the list of candidate BVPs for determining or predicting the BV of the reference block, for example, based on the replacing the selected component with the adjusted component to generate the adjusted BVP.

The example flowchart 2200B may comprise the step of signaling an indication of the one of the adjusted BVP candidates, as the adjusted BVP, in a bitstream. The example flowchart 2200B may comprise the step of receiving, in a bitstream, an indication of a selected one of the adjusted BVP candidates to be used as the adjusted BVP.

Figure 23:
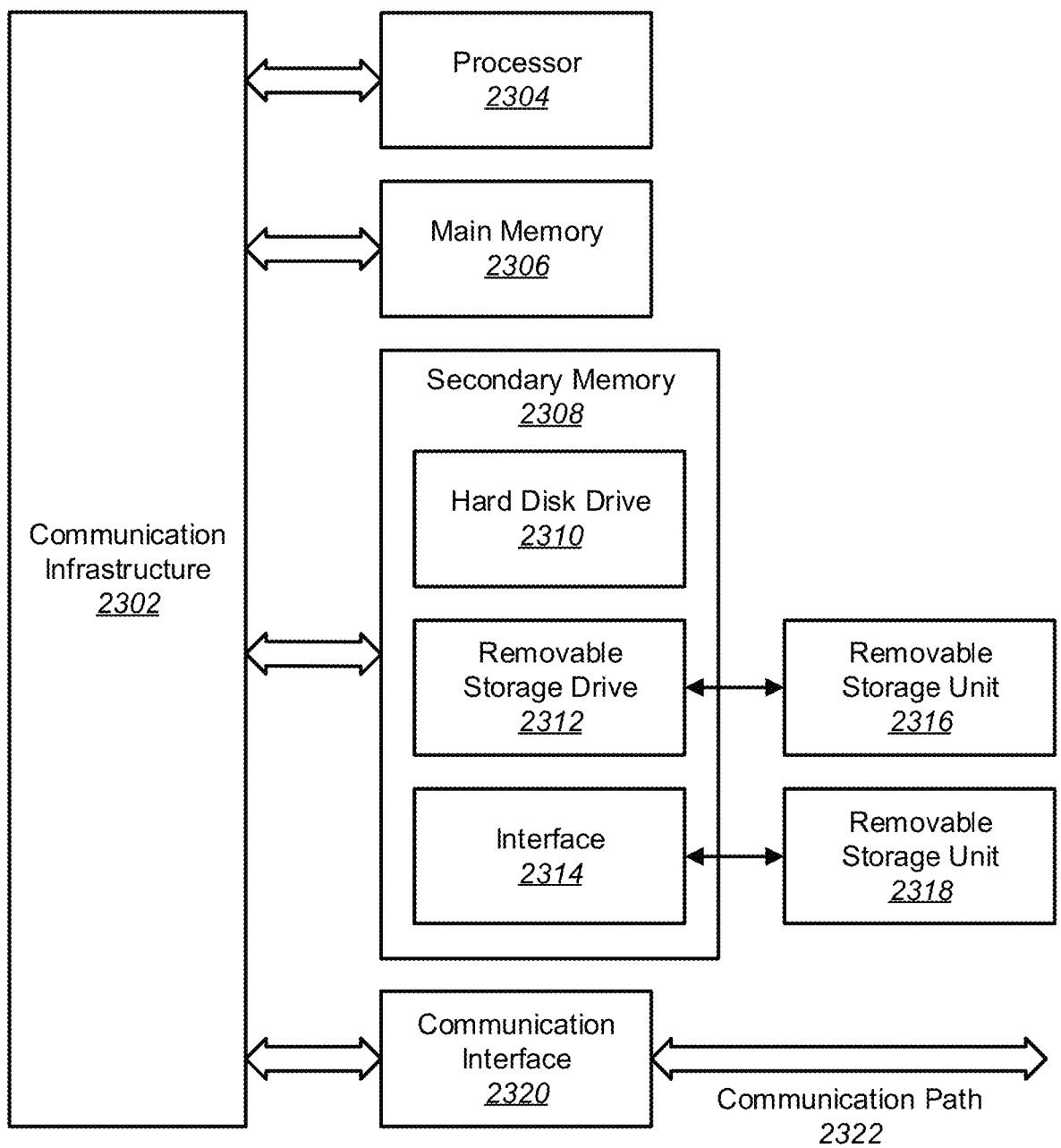
FIG. 23 shows a block diagram of an example computer system in which embodiments of the present disclosure may be implemented.

FIG. 23 shows an example computer system in which examples of the present disclosure may be implemented. For example, the example computer system 2300 shown in FIG. 23 may implement one or more of the methods described herein. For example, various devices and/or systems described herein (e.g., in FIGS. 1, 2, and 3) may be implemented in the form of one or more computer systems 2300. Furthermore, each of the steps of the flowcharts depicted in this disclosure may be implemented on one or more computer systems 2300.

The computer system 2300 may comprise one or more processors, such as a processor 2304. The processor 2304 may be a special purpose processor, a general purpose processor, a microprocessor, and/or a digital signal processor. The processor 2304 may be connected to a communication infrastructure 2302 (for example, a bus or network). The computer system 2300 may also comprise a main memory 2306 (e.g., a random access memory (RAM)), and/or a secondary memory 2308.

The secondary memory 2308 may comprise a hard disk drive 2310 and/or a removable storage drive 2312 (e.g., a magnetic tape drive, an optical disk drive, and/or the like). The removable storage drive 2312 may read from and/or write to a removable storage unit 2316. The removable storage unit 2316 may comprise a magnetic tape, optical disk, and/or the like. The removable storage unit 2316 may be read by and/or may be written to the removable storage drive 2312. The removable storage unit 2316 may comprise a computer usable storage medium having stored therein computer software and/or data.

The secondary memory 2308 may comprise other similar means for allowing computer programs or other instructions to be loaded into the computer system 2300. Such means may include a removable storage unit 2318 and/or an interface 2314. Examples of such means may comprise a program cartridge and/or cartridge interface (such as in video game devices), a removable memory chip (such as an erasable programmable read-only memory (EPROM) or a programmable read-only memory (PROM)) and associated socket, a thumb drive and USB port, and/or other removable storage units 2318 and interfaces 2314 which may allow software and/or data to be transferred from the removable storage unit 2318 to the computer system 2300.

The computer system 2300 may also comprise a communications interface 2320. The communications interface 2320 may allow software and data to be transferred between the computer system 2300 and external devices. Examples of the communications interface 2320 may include a modem, a network interface (e.g., an Ethernet card), a communications port, etc. Software and/or data transferred via the communications interface 2320 may be in the form of signals which may be electronic, electromagnetic, optical, and/or other signals capable of being received by the communications interface 2320. The signals may be provided to the communications interface 2320 via a communications path 2322. The communications path 2322 may carry signals and may be implemented using wire or cable, fiber optics, a phone line, a cellular phone link, an RF link, and/or any other communications channel(s).

A computer program medium and/or a computer readable medium may be used to refer to tangible storage media, such as removable storage units 2316 and 2318 or a hard disk installed in the hard disk drive 2310. The computer program products may be means for providing software to the computer system 2300. The computer programs (which may also be called computer control logic) may be stored in the main memory 2306 and/or the secondary memory 2308. The computer programs may be received via the communications interface 2320. Such computer programs, when executed, may enable the computer system 2300 to implement the present disclosure as discussed herein. In particular, the computer programs, when executed, may enable the processor 2304 to implement the processes of the present disclosure, such as any of the methods described herein. Accordingly, such computer programs may represent controllers of the computer system 2300.

Figure 24:
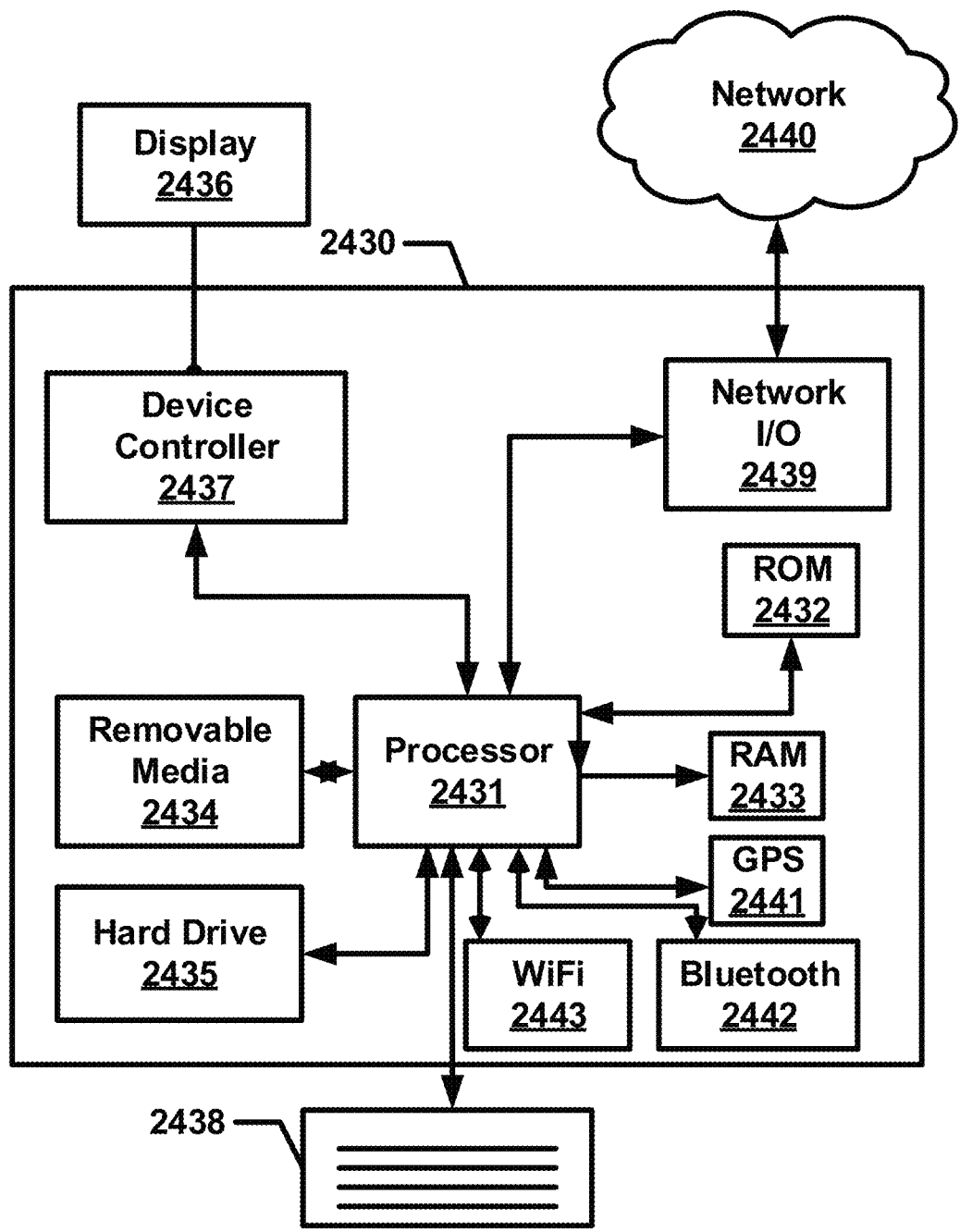
FIG. 24 shows example elements of a computing device that may be used to implement any of the various devices described herein.

FIG. 24 shows example elements of a computing device that may be used to implement any of the various devices described herein, including, for example, a source device (e.g., 102), an encoder (e.g., 200), a destination device (e.g., 106), a decoder (e.g., 300), and/or any computing device described herein. The computing device 2430 may include one or more processors 2431, which may execute instructions stored in the random-access memory (RAM) 2433, the removable media 2434 (such as a Universal Serial Bus (USB) drive, compact disk (CD) or digital versatile disk (DVD), or floppy disk drive), or any other desired storage medium. Instructions may also be stored in an attached (or internal) hard drive 2435. The computing device 2430 may also include a security processor (not shown), which may execute instructions of one or more computer programs to monitor the processes executing on the processor 2431 and any process that requests access to any hardware and/or software components of the computing device 2430 (e.g., ROM 2432, RAM 2433, the removable media 2434, the hard drive 2435, the device controller 2437, a network interface 2439, a GPS 2441, a Bluetooth interface 2442, a WiFi interface 2443, etc.). The computing device 2430 may include one or more output devices, such as the display 2436 (e.g., a screen, a display device, a monitor, a television, etc.), and may include one or more output device controllers 2437, such as a video processor. There may also be one or more user input devices 2438, such as a remote control, keyboard, mouse, touch screen, microphone, etc. The computing device 2430 may also include one or more network interfaces, such as a network interface 2439, which may be a wired interface, a wireless interface, or a combination of the two. The network interface 2439 may provide an interface for the computing device 2430 to communicate with a network 2440 (e.g., a RAN, or any other network). The network interface 2439 may include a modem (e.g., a cable modem), and the external network 2440 may include communication links, an external network, an in-home network, a provider's wireless, coaxial, fiber, or hybrid fiber/coaxial distribution system (e.g., a DOCSIS network), or any other desired network. Additionally, the computing device 2430 may include a location-detecting device, such as a global positioning system (GPS) microprocessor 2441, which may be configured to receive and process global positioning signals and determine, with possible assistance from an external server and antenna, a geographic position of the computing device 2430.

The example in FIG. 24 may be a hardware configuration, although the components shown may be implemented as software as well. Modifications may be made to add, remove, combine, divide, etc. components of the computing device 2430 as desired. Additionally, the components may be implemented using basic computing devices and components, and the same components (e.g., processor 2431, ROM storage 2432, display 2436, etc.) may be used to implement any of the other computing devices and components described herein. For example, the various components described herein may be implemented using computing devices having components such as a processor executing computer-executable instructions stored on a computer-readable medium, as shown in FIG. 24. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. The computing device may determine, based on a reconstruction-reordered intra block copy (RRIBC) mode and a flipping direction for flipping a reference block relative to a current block, a reference region corresponding to the direction for flipping. The computing device may replace the BVP with an adjusted BVP that indicates a position within the reference region. The computing device may replace the BVP with the adjusted BVP based on determining that a block vector predictor (BVP), associated with the current block, indicates a position outside of the reference region. The computing device may use the adjusted BVP to determine, for the current block, a block vector (BV) of the reference block. The computing device may select, based on the RRIBC mode, a component of the BVP. The computing device may determine that a sum, of the selected component and a dimension of the current block, is greater than zero. The computing device may determine that a sum, of the selected component and a dimension of the current block, is greater than zero if the dimension is aligned with the selected component in the direction for flipping. The computing device may replace, based on the determining, the selected component with an adjusted component to determine the adjusted BVP. The computing device may determine a component of the BVP based on a dimension of the current block, wherein the component is in the direction for flipping. The computing device may use the component of the BVP to determine, for the current block, a BV of the reference block. The computing device may determine, based on the RRIBC mode and the direction for flipping, a component of the BVP. The selected component of the BVP may be one of: a horizontal component of the BVP if the direction for flipping is horizontal; or a vertical component of the BVP if the direction for flipping is vertical. The dimension of the current block may be one of a width of the current block if the selected component is a horizontal component of the BVP; or a height of the current block if the selected component is a vertical component of the BVP. The BV of the reference block may be determined or predicted without using a non-selected component of the BVP. An adjusted component of the adjusted BVP may correspond to a dimension of the current block. The reference region may be within an IBC reference region for the current block. The adjusted BVP may indicate a displacement from the current block to a position in the reference region. The reference region may comprise a rectangular reference region. Using the adjusted BVP may comprise determining a block vector difference (BVD), associated with decoding of the current block, as a difference between the BV and the adjusted BVP. Using the adjusted BVP may comprise determining, from a list of candidate BVPs, an adjusted BVP candidate as the adjusted BVP. Determining that the BVP indicates the position that is outside of the reference region may comprise determining that the component indicates a position that is outside of a range of values defining the reference region in the direction for flipping. Determining that the BVP is outside of the reference region may comprise: determining a sum, of the selected component and a dimension of the current block is greater than zero, wherein the dimension is aligned with the selected component in the direction for flipping. The selected component may be in alignment with the direction for flipping. If the selected component is a horizontal component of the BVP, the dimension of the current block may be a width of the current block, and the adjusted component may be equal to minus the width. If the selected component is a vertical component of the BVP, the dimension of the current block may be a height of the current block, and the adjusted component may be equal to minus the height. If the direction for flipping is horizontal, the reference region may comprise an upper boundary and a lower boundary that correspond to those of the current block, a right boundary defined by an offset of a width of the current block to a left boundary of the current block, and a left boundary that corresponds to that of an IBC reference region. If the direction for flipping is vertical, the reference region may comprise a left boundary and a right boundary that correspond to those of the current block, a lower boundary defined by an offset of a height of the current block above an upper boundary of the current block, and an upper boundary that corresponds to that of an IBC reference region. The reference block may be selected from within the rectangular reference region. A component of a block vector predictor may be selected based on the RRIBC mode and the direction for flipping. The reference region may comprise a reference width and a reference height. If the selected component is a horizontal component of the BVP, a horizontal component of a block vector difference (BVD), between the BV and the BVP, may have a maximum possible value equal to the reference width. If the selected component is a vertical component of the BVP, a vertical component of the BVD may have a maximum possible value equal to the reference height. A component of a BVP may be selected based on the RRIBC mode and the direction for flipping. The BVD may comprise a component (e.g., only a component) in a direction aligned with the selected component. A residual between the current block and the reference block flipped with respect to the current block may be calculated. The reference block may be determined based on the calculated residual. The adjusted BVP candidate may be selected based on the adjusted component and an index of the adjusted BVP candidate list. The adjusted BVP may be selected as the BVP based on BVD calculated for each of the candidate BVPs in the list and indexes of the candidate BVPs. The adjusted BVP may be selected as having a smallest cost among costs calculated for the candidate BVPs, respectively, wherein a cost for a candidate BVP is calculated based on combining a cost of encoding an index corresponding to the candidate BVP and a cost of encoding a BVD corresponding to the candidate BVP. The selecting may further comprise, based on the adjusted component, determining a component of a BVD that indicates a displacement from the current block to the reference block, wherein the displacement is along a direction aligned with the selected component. The adjusted BVP candidate may be selected without using one or more without using one or more other components, not aligned with the selected component, of the adjusted BVP candidate. The adjusted BVP candidate may be selected based on one or more other components, not aligned with the selected component, of the adjusted BVP candidate being set to zero. The list of candidate BVPs may comprise a list of components, of BVPs, aligned with the selected component. A plurality of BVP candidates comprising the BVP candidate may be determined. Based on the replacing, the adjusted BVP candidate may be added to the list of candidate BVPs for determining or predicting the BV of the reference block. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block. A computer-readable medium may store instructions that, when executed, cause performance of the described method, additional operations and/or include the additional elements.

A computing device may perform a method comprising multiple operations. The computing device may select, based on a reconstruction-reordered intra block copy (RRIBC) mode, a component of a block vector predictor (BVP). The computing device may determine that a sum, of the selected component and a dimension of the current block, is greater than zero, wherein the dimension is aligned with the selected component in the direction for flipping. The computing device may replace, based on the determining, the selected component with an adjusted component to generate an adjusted BVP. The computing device may use the adjusted BVP to determine, for a current block, a block vector (BV) of a reference block. The computing device may use the adjusted BVP to determine a BV of a reference block for a current block. The selecting may be based on the RRIBC mode and a direction for flipping a reference block relative to a current block, wherein the selected component may be aligned with the flipping direction. The dimension may be aligned with the selected component and aligned with the flipping direction. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block. A computer-readable medium may store instructions that, when executed, cause performance of the described method, additional operations and/or include the additional elements.

A computing device may perform a method comprising multiple operations. The computing device may determine, based on a reconstruction-reordered intra block copy (RRIBC) mode and a flipping direction for flipping a reference block relative to a current block, a dimension, of the current block, aligned with the direction for flipping. The computing device may determine a component of a block vector predictor (BVP) based on the determined dimension of the current block, wherein the component is in the direction for flipping. The computing device may use the component of the BVP to determine, for the current block, a block vector (BV) of the reference block. The computing device may determine that the BVP is outside of a reference region. A selected component of the BVP may be one of: a horizontal component of the BVP if the direction for flipping is horizontal; or a vertical component of the BVP if the direction for flipping is vertical. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block. A computer-readable medium may store instructions that, when executed, cause performance of the described method, additional operations and/or include the additional elements.

A computing device may perform a method comprising multiple operations. The computing device may determine, based on a reconstruction-reordered intra block copy (RRIBC) mode and a direction for flipping a reference block relative to a current block, a reference region corresponding to the direction for flipping. The computing device may determine that a block vector predictor (BVP) points to outside of the reference region. Based on the determining, the computing device may replace the BVP with an adjusted BVP that is within the reference region. The computing device may use the adjusted BVP to determine or predict a block vector (BV) of the reference block for the current block. A component of a block vector predictor (BVP) may be selected. A component of a block vector predictor may be selected based on the RRIBC mode and the direction for flipping. Determining the BVP is outside of the reference region may comprise determining that the component is outside of a range of values defining the reference region in the direction. Determining the BVP is outside of the reference region may comprise determining a sum, of the selected component and a dimension (cbDimension) of the current block, is greater than zero, wherein the dimension is aligned with the selected component. The selected component may be in alignment with the direction for flipping. The selected component of the BVP may be one of: a horizontal component of the BVP when the direction is horizontal and a vertical component of the BVP when the direction is vertical. The dimension of the current block may be one of: a width (cbWidth) of the current block when the selected component is a horizontal component of the BVP; and a height (cbHeight) of the current block when the selected component is a vertical component of the BVP. The BV of the reference block may be determined or predicted without using a non-selected component of the BVP. The adjusted component may be equal to −cbDimension. When the selected component is a horizontal component of the BVP, the dimension of the current block may be a width (cbWidth) of the current block; and the adjust component may be equal to −cbWidth. When the selected component is a vertical component of the BVP, the dimension of the current block may be a height (cbHeight) of the current block; and the adjust component may be equal to −cbHeight. The reference region may be within an IBC reference region for the current block. The adjusted BVP may indicate a displacement from the current block to a position in the reference region. The reference region may comprise a rectangular reference region. When the direction for flipping is horizontal, the reference region may comprise an upper boundary and a lower boundary that correspond to those of the current block, a right boundary defined by an offset of a width (cbWidth) of the current block to a left boundary of the current block, and a left boundary that correspond to that of an IBC reference region. When the direction for flipping is vertical, the reference region may comprise a left boundary and a right boundary that correspond to those of the current block, a lower boundary defined by an offset of a height (cbHeight) of the current block above an upper boundary of the current block, and an upper boundary that correspond to that of an IBC reference region. A component of a block vector predictor (BVP) may be selected. A component of a block vector predictor (BVP) may be selected based on the RRIBC mode and the direction for flipping. The reference region may comprise a reference width and a reference height. When the selected component is a horizontal component of the BVP, a horizontal component of a block vector difference (BVD), between the BV and the BVP, may have a maximum possible value equal to the reference width. When the selected component is a vertical component of the BVP, a vertical component of BVD may have a maximum possible value equal to the reference height. Using the adjusted BVP may comprise calculating a block vector difference (BVD) as a difference between the BV and the adjusted BVP. A component of a block vector predictor (BVP) may be selected. A component of a block vector predictor (BVP) may be selected based on the RRIBC mode and the direction for flipping. The BVD may comprise a component in a direction aligned with the selected component. The BVD may comprise only a component in a direction aligned with the selected component. A residual between the current block and the reference block flipped with the respect to the current block may be calculated. The reference block may be determined based on the calculated residual. Using the adjusted BVP may comprise selecting an adjusted BVP candidate, as the adjusted BVP, from a list of candidate BVPs. The adjusted BVP candidate may be selected based on the adjusted component and an index of the adjusted BVP candidate in the list. The adjusted BVP may be selected as the BVP based on BVD calculated for each of the candidate BVPs in the list and indexes of the candidate BVPs. The adjusted BVP may be selected as having a smallest cost among costs calculated for the candidate BVPs, respectively, wherein a cost for a candidate BVP may be calculated based on combining a cost of encoding an index corresponding to the candidate BVP and a cost of encoding a BVD corresponding to the candidate BVP. Selecting based on the adjusted component may comprise determining a component of a block vector difference (BVD) that indicates a displacement from the current block to the reference block, wherein the displacement may be along a direction aligned with the selected component. The adjusted BVP candidate may be selected without using one or more other components, not aligned with the selected component, of the adjusted BVP candidate. The adjusted BVP candidate may be selected further based on one or more other components, not aligned with the selected component, of the adjusted BVP candidate being set to zero. The list of candidate BVPs may comprise a list of components, of BVPs, aligned with the selected component. A plurality of BVP candidates comprising the BVP candidate may be determined. The adjusted BVP candidate may be added to the list of candidate BVPs for determining or predicting the BV of the reference block. The adjusted BVP candidate may be added to the list of candidate BVPs for determining or predicting the BV of the reference block based on the replacing. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block. A computer-readable medium may store instructions that, when executed, cause performance of the described method, additional operations and/or include the additional elements.

A computing device may perform a method comprising multiple operations. A component of a block vector predictor (BVP) may be selected. A component of a BVP may be selected based on a reconstruction-reordered intra block copy (RRIBC) mode. A sum of the selected component and a dimension (cbDimension) of the current block may be determined to be greater than zero, wherein the dimension may be aligned with the selected component. The selected component may be replaced with an adjusted component to generate an adjusted BVP. The selected component may be replaced with an adjusted component to generate an adjusted BVP based on the determining. The adjusted BVP may be used to determine or predict a block vector (BV) of a reference block for a current block. The selecting may be based on the RRIBC mode and a direction for flipping a reference block relative to a current block, wherein the selected component is aligned with the flipping direction. The dimension may be aligned with the selected component and aligned with the flipping direction. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block. A computer-readable medium may store instructions that, when executed, cause performance of the described method, additional operations and/or include the additional elements.

A computing device may perform a method comprising multiple operations. A dimension of a current block may be determined. The dimension of the current block may be determined, aligned with a direction for flipping, based on a reconstruction-reordered intra block copy (RRIBC) mode and the direction for flipping a reference block relative to the current block. A component block vector predictor (BVP) may be determined based on the determined dimension of the current block, wherein the component is in the direction. The component of the BVP may be used to determine or predict a block vector (BV) of the current reference block for the current block. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block. A computer-readable medium may store instructions that, when executed, cause performance of the described method, additional operations and/or include the additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated when its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks. Features of the disclosure may be implemented in hardware using, for example, hardware components such as application-specific integrated circuits (ASICs) and gate arrays. Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
   based on a reconstruction-reordered intra block copy (RRIBC) mode and a flipping direction for flipping a reference block relative to a current block, determining, by a computing device, a reference region corresponding to the direction for flipping;
   based on determining that a block vector predictor (BVP), associated with the current block, indicates a position outside of the reference region, replacing the BVP with an adjusted BVP that indicates a position within the reference region; and
   using the adjusted BVP to determine, for the current block, a block vector (BV) of the reference block.

2. The method of claim 1, further comprising:
   selecting, based on the RRIBC mode, a component of the BVP;
   determining that a sum, of the selected component and a dimension of the current block, is greater than zero, wherein the dimension is aligned with the selected component in the direction for flipping; and
   replacing, based on the determining, the selected component with an adjusted component to determine the adjusted BVP.

3. The method of claim 1, further comprising:
   determining a component of the BVP based on a dimension of the current block, wherein the component is in the direction for flipping; and
   using the component of the BVP to determine, for the current block, the BV of the reference block.

4. The method of claim 1, further comprising:
   determining, based on the RRIBC mode and the direction for flipping, a component of the BVP.

5. The method of claim 2, wherein the selected component of the BVP is one of:
   a horizontal component of the BVP if the direction for flipping is horizontal; or
   a vertical component of the BVP if the direction for flipping is vertical.

6. The method of claim 5, wherein the dimension of the current block is one of:
   a width of the current block if the selected component is the horizontal component of the BVP; or
   a height of the current block if the selected component is the vertical component of the BVP.

7. The method of claim 1, wherein the BV of the reference block is determined or predicted without using a non-selected component of the BVP.

8. The method of claim 1, wherein an adjusted component of the adjusted BVP corresponds to a dimension of the current block.

9. The method of claim 1, wherein the reference region is within an IBC reference region for the current block.

10. The method of claim 1, wherein the adjusted BVP indicates a displacement from the current block to a position in the reference region.

11. The method of claim 10, wherein the reference region comprises a rectangular reference region.

12. The method of claim 1, wherein using the adjusted BVP comprises:
   determining a block vector difference (BVD), associated with decoding of the current block, as a difference between the BV and the adjusted BVP.

13. The method of claim 1, wherein using the adjusted BVP comprises:
   determining, from a list of candidate BVPs, an adjusted BVP candidate as the adjusted BVP.

14. A method comprising:
   selecting, by a computing device, based on a reconstruction-reordered intra block copy (RRIBC) mode, a component of a block vector predictor (BVP);
   determining that a sum, of the selected component and a dimension of a current block, is greater than zero, wherein the dimension is aligned with the selected component in a direction for flipping;
   replacing, based on the determining, the selected component with an adjusted component to generate an adjusted BVP; and
   using the adjusted BVP to determine, for the current block, a block vector (BV) of a reference block.

15. The method of claim 14, wherein using the adjusted BVP comprises:
   determining, from a list of candidate BVPs, an adjusted BVP candidate as the adjusted BVP.

16. The method of claim 14, wherein the selecting is based on the RRIBC mode and the direction for flipping the reference block relative to the current block, wherein the selected component is aligned with the direction for flipping.

17. The method of claim 14, wherein the dimension is aligned with the selected component and aligned with the direction for flipping.

18. A method comprising:
   based on a reconstruction-reordered intra block copy (RRIBC) mode and a flipping direction for flipping a reference block relative to a current block, determining, by a computing device, a dimension, of the current block, aligned with the direction for flipping;
   determining a component of a block vector predictor (BVP) based on the determined dimension of the current block, wherein the component is in the direction for flipping; and
   using the component of the BVP to determine, for the current block, a block vector (BV) of the reference block.

19. The method of claim 18, further comprising determining that the BVP is outside of a reference region.

20. The method of claim 18, wherein the determined component of the BVP is one of:
   a horizontal component of the BVP if the direction for flipping is horizontal; or
   a vertical component of the BVP if the direction for flipping is vertical.

* * * * *